(12) United States Patent
Kramskoy et al.

(10) Patent No.: US 7,080,366 B2
(45) Date of Patent: Jul. 18, 2006

(54) DYNAMIC COMPILER AND METHOD OF COMPILING CODE TO GENERATE DOMINANT PATH AND TO HANDLE EXCEPTIONS

(75) Inventors: Jeremy Paul Kramskoy, Long Kitton (GB); William Thomas Charnell, Great Missenden (GB); Stephen Darnell, Maidenhead (GB); Blaise Abel Alec Dias, Uxbridge (GB); Philippa Joy Guthrie, Aylesbury (GB); Wayne Plummer, High Wycombe (GB); Jeremy James Sexton, Hemel Hempstead (GB); Michael John Wynn, Maidenhead (GB); Keith Rautenback, High Wycombe (GB); Stephen Paul Thomas, High Wycombe (GB)

(73) Assignee: Esmertec AG, Dubendorf (CH)

( * ) Notice: Subject to any disclaimer, the term of this patent is extended or adjusted under 35 U.S.C. 154(b) by 744 days.

(21) Appl. No.: 09/858,827

(22) Filed: May 16, 2001

(65) Prior Publication Data
US 2002/0112227 A1   Aug. 15, 2002

Related U.S. Application Data

(63) Continuation of application No. PCT/GB99/00788, filed on Mar. 16, 1999.

(30) Foreign Application Priority Data
Nov. 16, 1998 (GB) ................................. 9825102.8

(51) Int. Cl.
*G06F 9/45* (2006.01)
(52) U.S. Cl. ................. 717/148; 717/151; 717/153
(58) Field of Classification Search ......... 717/136–161
See application file for complete search history.

(56) References Cited

U.S. PATENT DOCUMENTS

| | | | |
|---|---|---|---|
| 4,675,829 A | 6/1987 | Clemenson | |
| 4,924,408 A | 5/1990 | Highland | |
| 5,210,876 A | 5/1993 | Uchida | |
| 5,301,260 A | 4/1994 | Miyashita | |
| 5,301,325 A | 4/1994 | Benson | |
| 5,339,436 A | 8/1994 | Tairaku et al. | |
| 5,367,685 A | 11/1994 | Gosling | |
| 5,428,618 A * | 6/1995 | Ueki et al. | 717/124 |
| 5,442,792 A | 8/1995 | Chun | |

(Continued)

OTHER PUBLICATIONS

Java World—Di Giorgio—Jul. 1997—Use native methods to expand the Java environment.

(Continued)

*Primary Examiner*—Kakali Chaki
*Assistant Examiner*—Lawrence J. Schrader
(74) *Attorney, Agent, or Firm*—Caesar, Rivise, Bernstein, Cohen & Pokotilow, Ltd.

(57) ABSTRACT

A dynamic compiler and method of compiling code to generate a dominate path and handle exceptions. The dynamic compiler includes an execution history recorder that is configured to record the number of times a fragment of code is interpreted. When the code is interpreted a threshold number of times, the code is queued for compilation. The execution history recorder also keeps track of where transfer of control came from and where transfer of control goes to for each fragment of code that is executed, thereby allowing for compilation of a dominant path of code. If the execution of code deviates from the dominant path of compiled code (such as when an exception occurs), a fallback interpreter is utilized to interpret the fragment of code to be executed.

6 Claims, 27 Drawing Sheets

U.S. PATENT DOCUMENTS

| | | |
|---|---|---|
| 5,450,575 A | 9/1995 | Sites |
| 5,452,457 A | 9/1995 | Alpert et al. |
| 5,469,574 A | 11/1995 | Chang et al. |
| 5,530,964 A | 6/1996 | Alpert et al. |
| 5,551,040 A | 8/1996 | Blewett |
| 5,590,329 A * | 12/1996 | Goodnow et al. .......... 717/144 |
| 5,590,332 A | 12/1996 | Baker |
| 5,598,561 A | 1/1997 | Funaki |
| 5,603,030 A | 2/1997 | Gray et al. |
| 5,613,120 A | 3/1997 | Palay et al. |
| 5,655,122 A | 8/1997 | Wu |
| 5,675,804 A | 10/1997 | Sidik et al. |
| 5,721,854 A | 2/1998 | Ebcioglu et al. |
| 5,761,513 A | 6/1998 | Yellin et al. |
| 5,764,989 A | 6/1998 | Gustafsson et al. |
| 5,815,720 A | 9/1998 | Buzbee |
| 5,835,771 A | 11/1998 | Veldhuizen |
| 5,848,274 A | 12/1998 | Hamby et al. |
| 5,857,104 A | 1/1999 | Natarjan et al. |
| 5,872,978 A | 2/1999 | Hoskins |
| 5,873,104 A | 2/1999 | Tremblay et al. |
| 6,170,083 B1 * | 1/2001 | Adl-Tabatabai ............. 717/158 |
| 6,173,276 B1 * | 1/2001 | Kant et al. .................... 706/50 |
| 6,240,548 B1 * | 5/2001 | Holzle et al. ............... 717/140 |
| 6,275,938 B1 * | 8/2001 | Bond et al. ................. 713/200 |
| 6,463,582 B1 * | 10/2002 | Lethin et al. ............... 717/158 |
| 6,735,761 B1 * | 5/2004 | Ogasawara ................. 717/140 |
| 2002/0010852 A1 * | 1/2002 | Arnold et al. ................. 713/1 |

OTHER PUBLICATIONS

Karaorman, M. et al.—jContractor: a reflective Java library to support design by contract-V 1616, Jul. 19-21, 1999, pp. 175-196,Saint-Malo, Fr.

Java Native Interface Specification—Java Native Interface Specification Release May 16, 1997, Sun Microsystems, Inc., California.

Dyadkin, L.J.—Multibox Parsers—ACM Sigplan Notices, Association for Comuting Machinery, New York, vol. 29, No. 7, Jul. 1, 1994, p. 54-60.

* cited by examiner

OUTLIERS (STUBS)
INFREQUENTLY EXECUTED

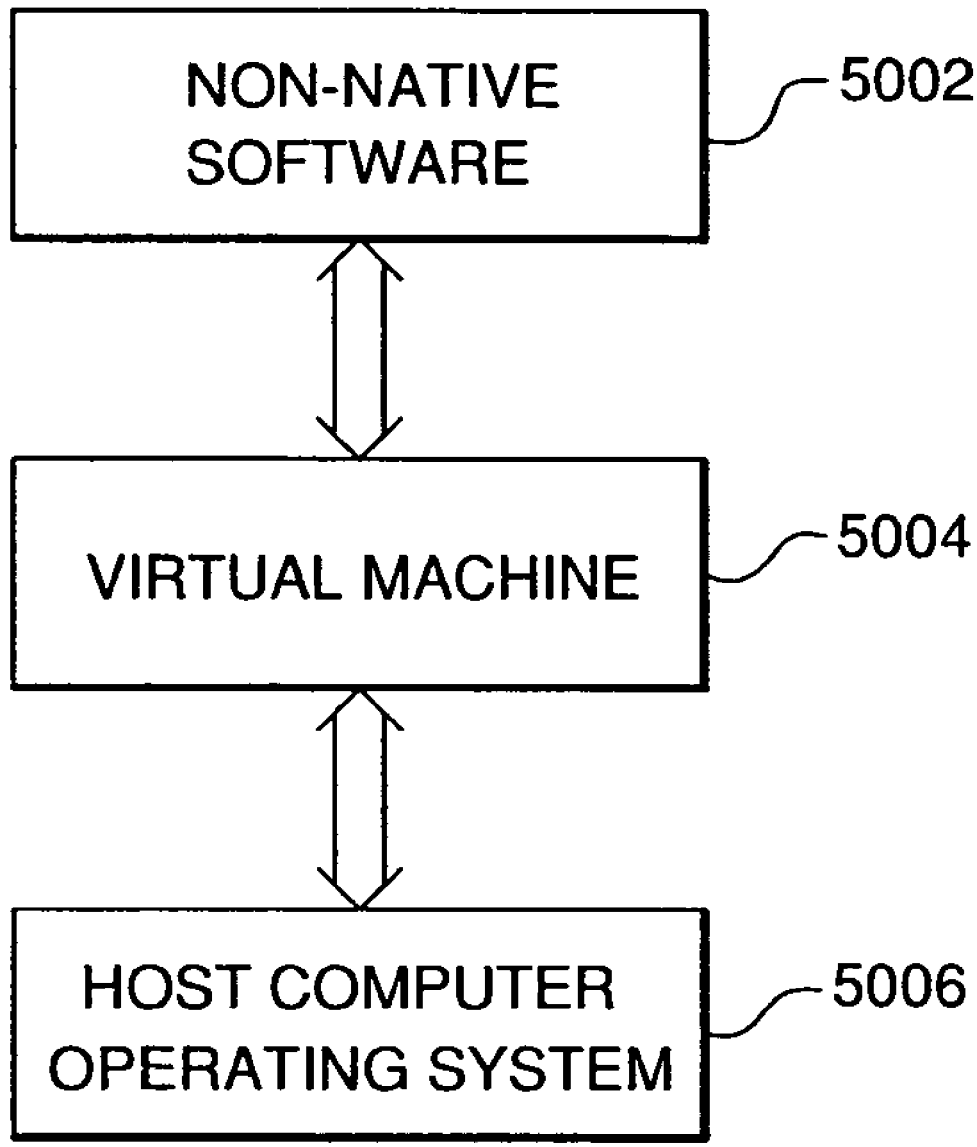
FIG. A1-1

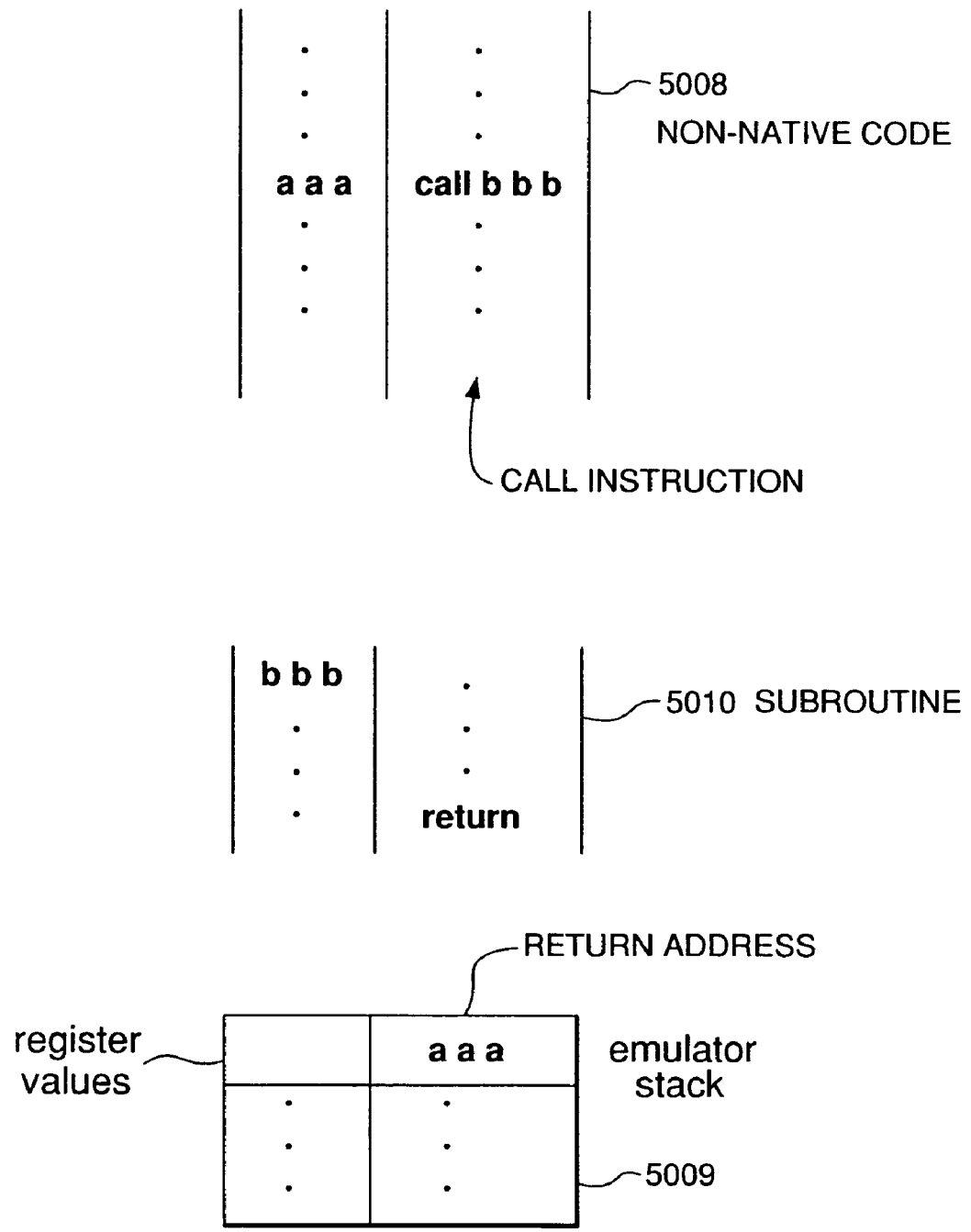
FIG. A1-2

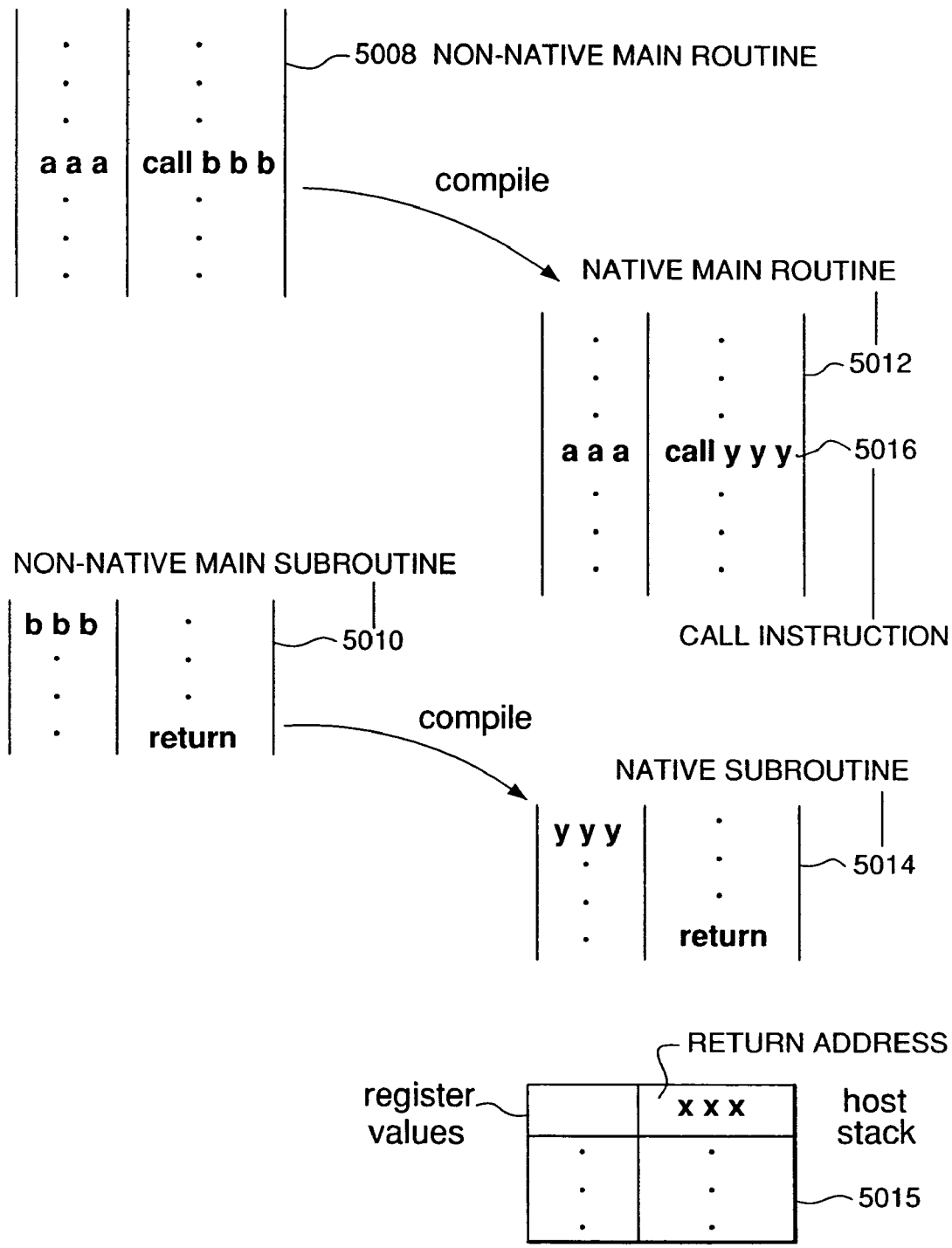
FIG. A1-3

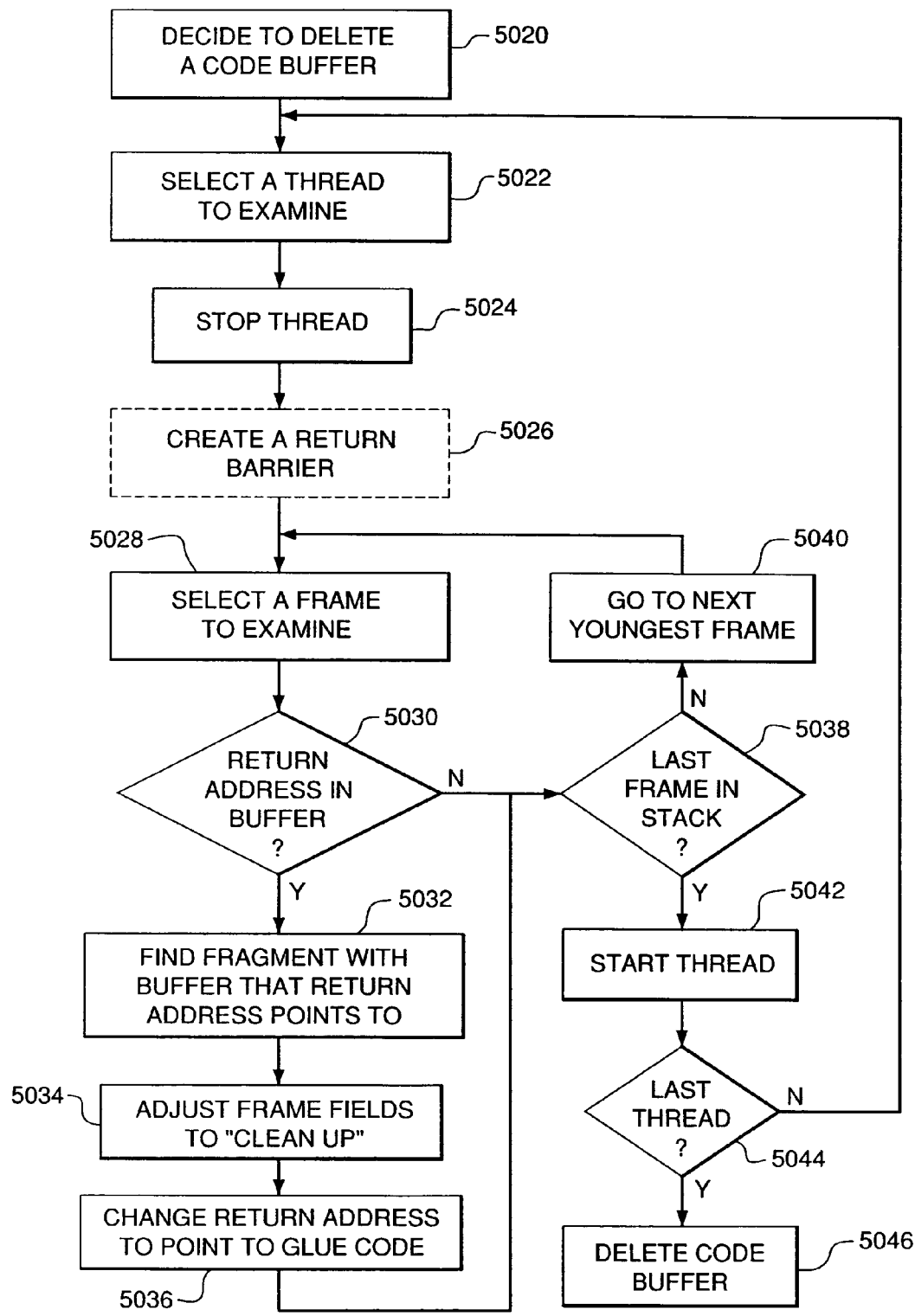
FIG. A1-4

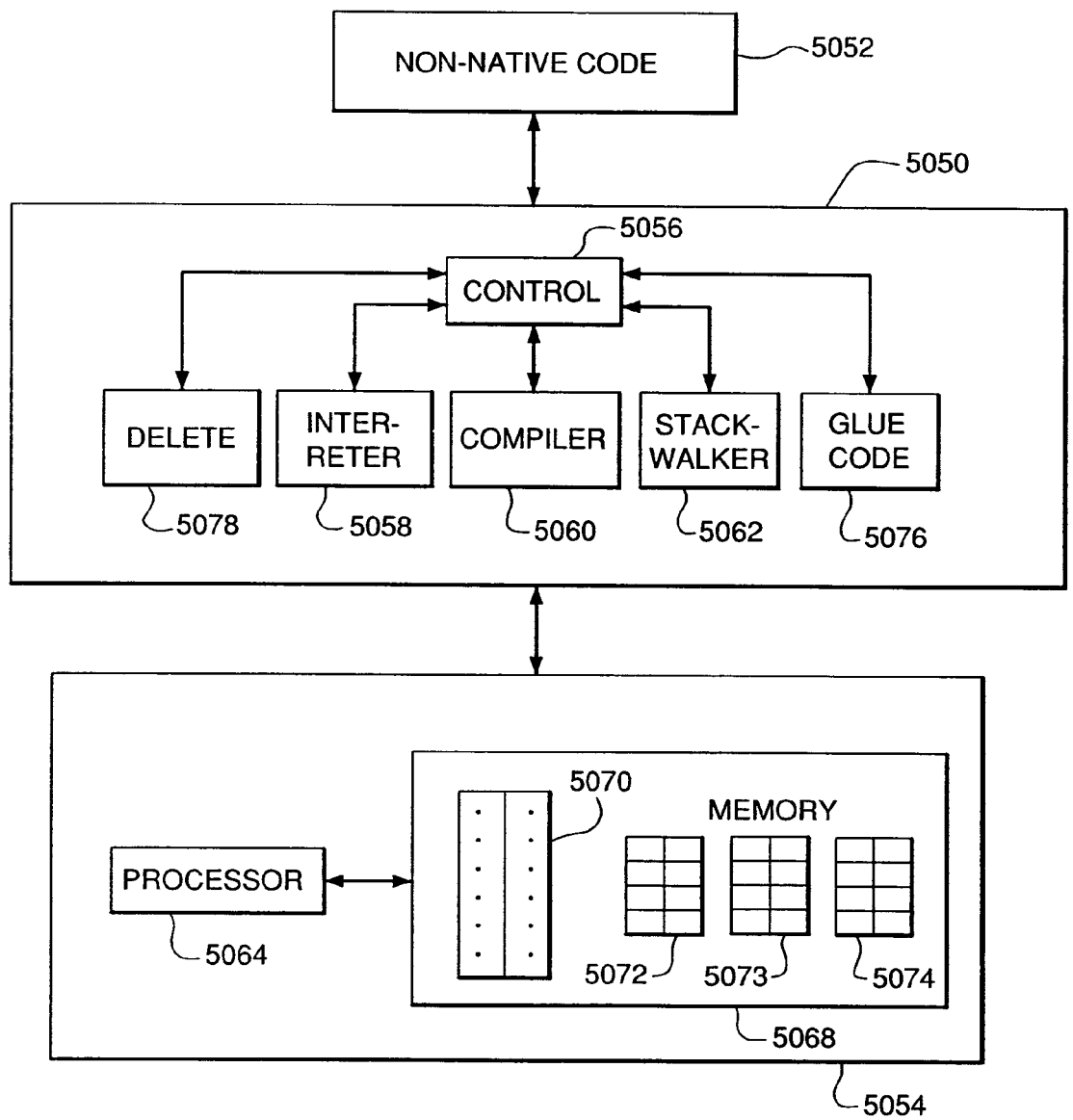
FIG. A1-5

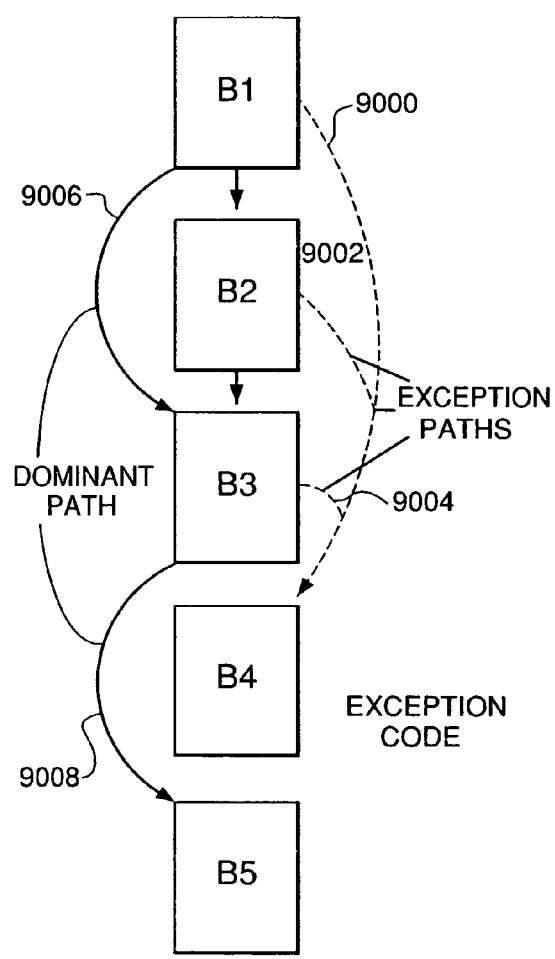
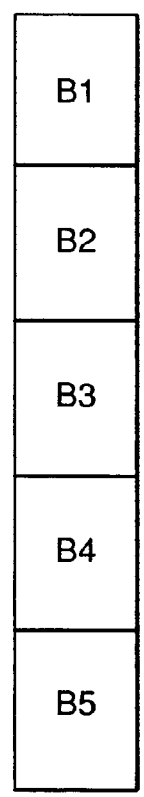
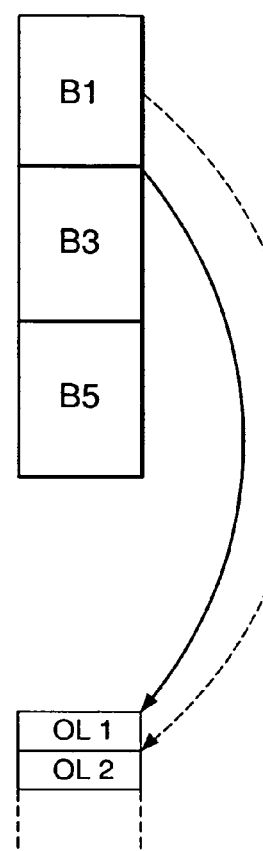
FIG. A2-1      FIG. A2-2      FIG. A2-3

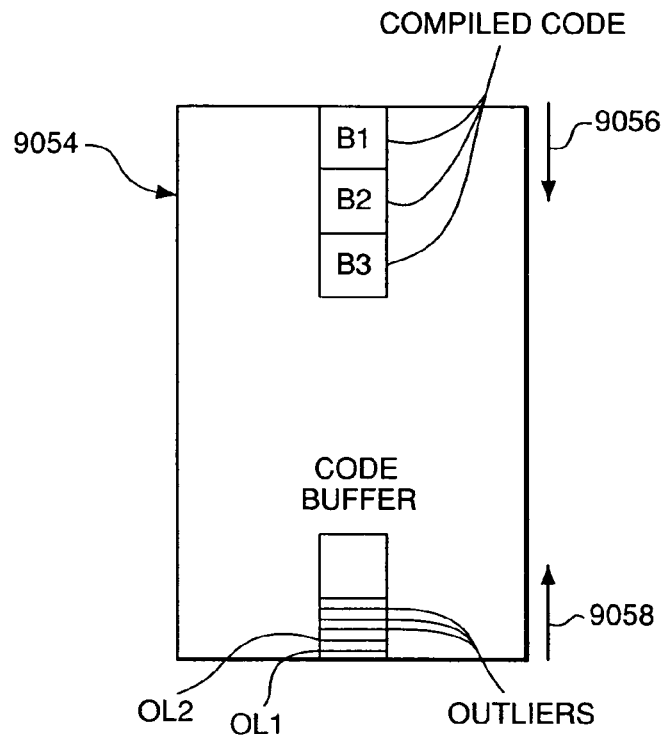
FIG. A2-4
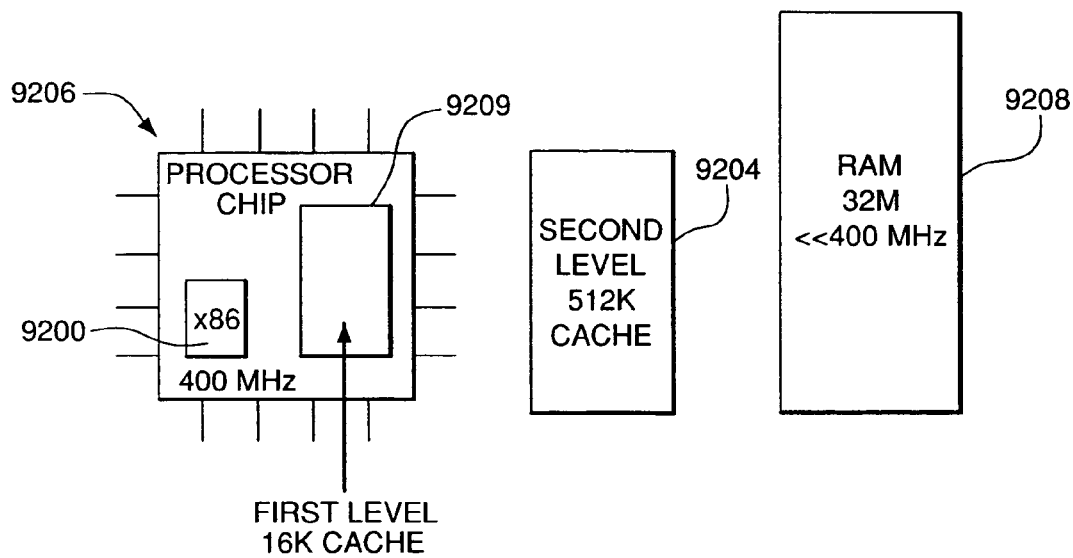
FIG. A2-5

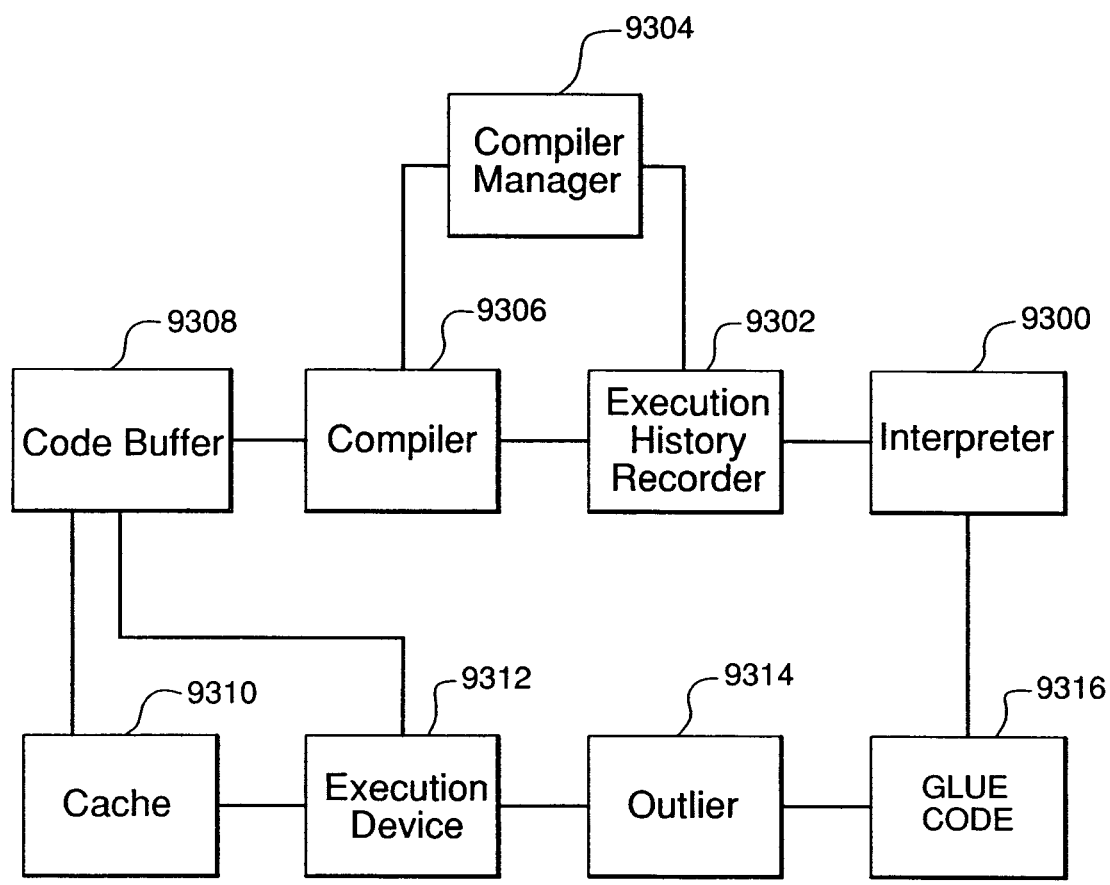
FIG. A2-6

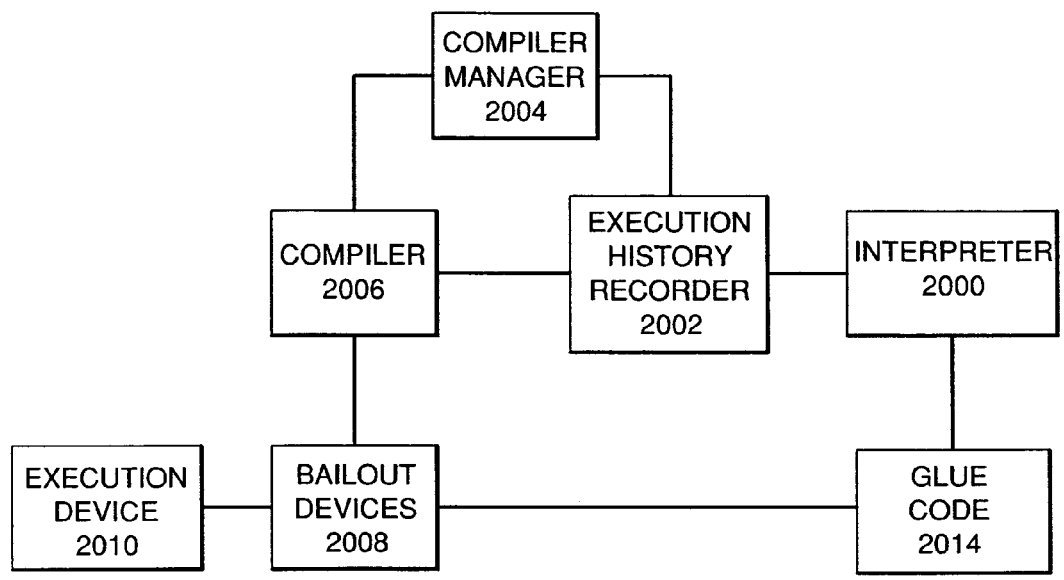
FIG. A3-1
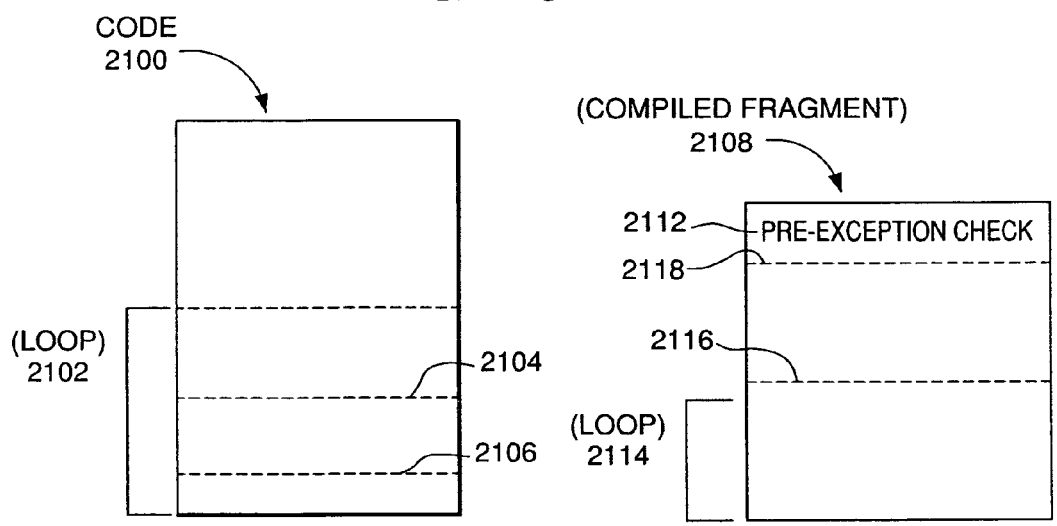
FIG. A3-2
FIG. A3-3

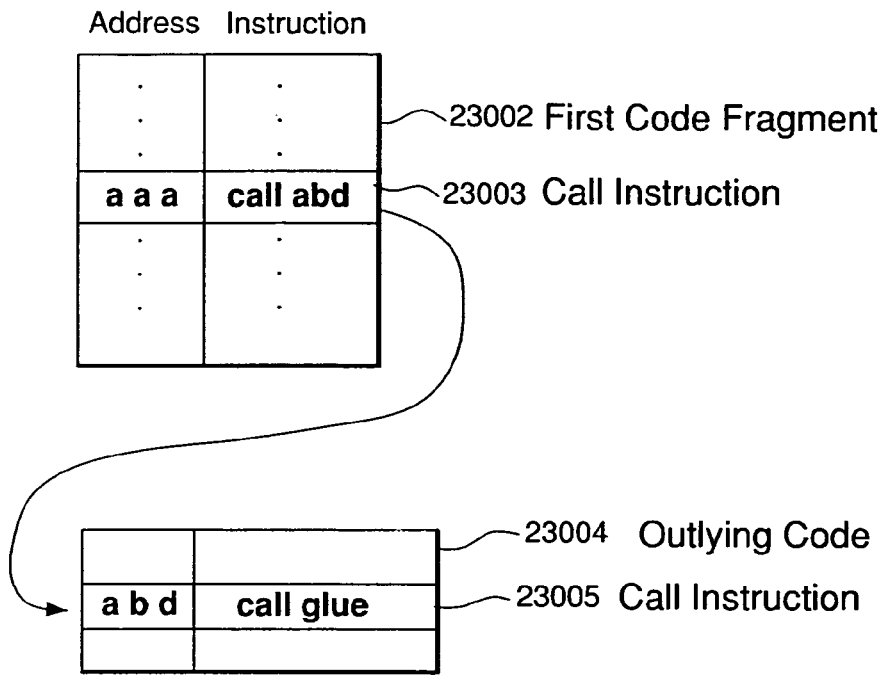
FIG. A4-1
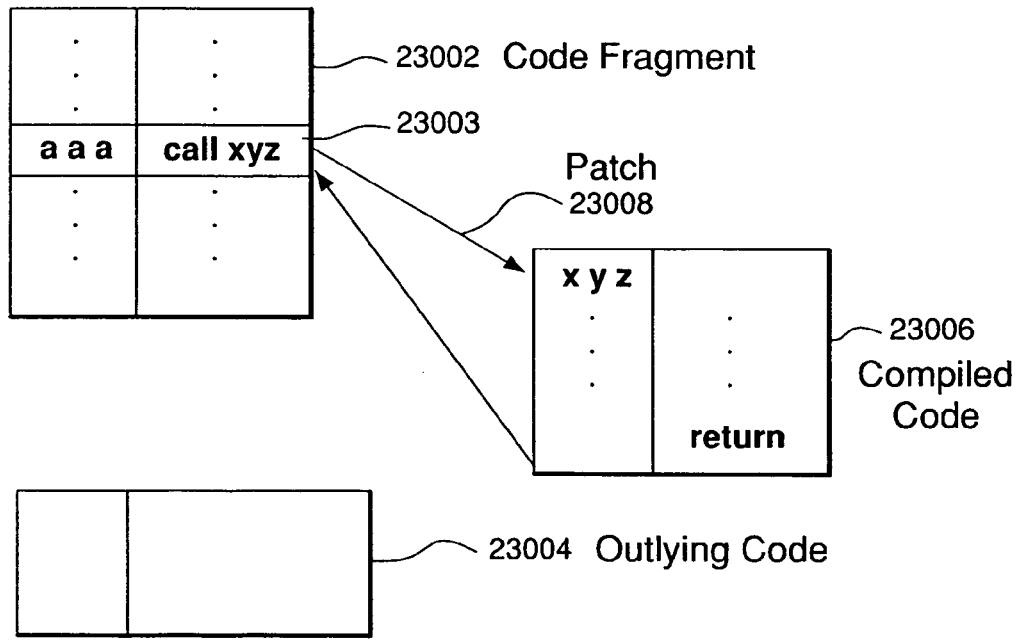
FIG. A4-2

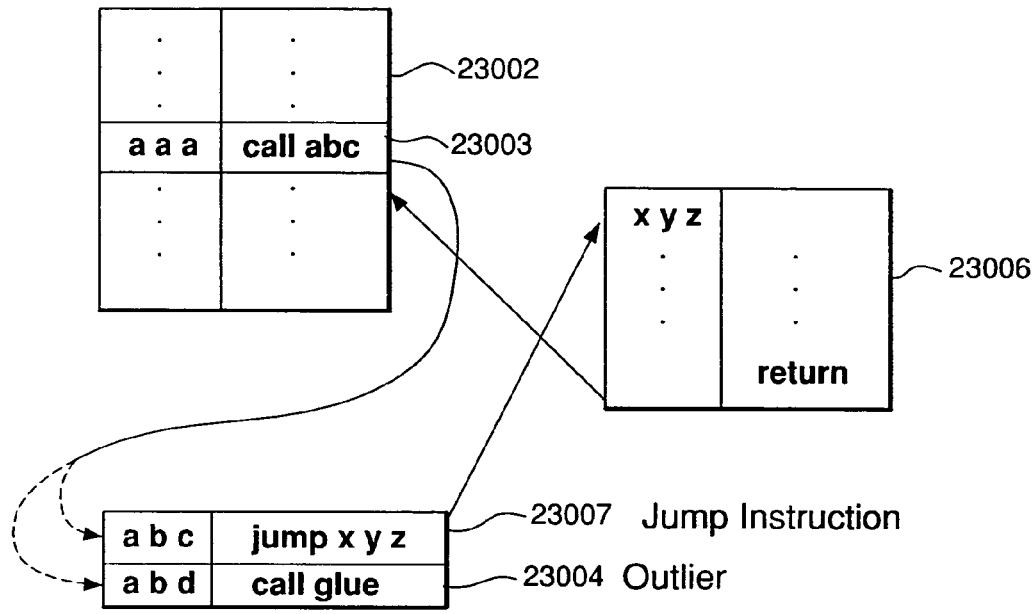
FIG. A4-3
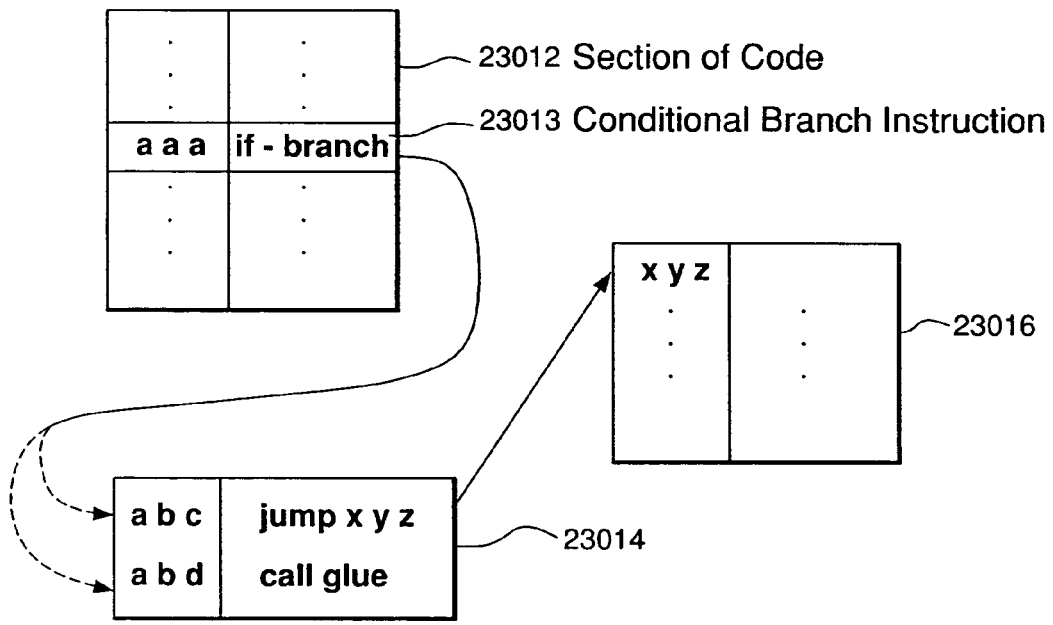
FIG. A4-4

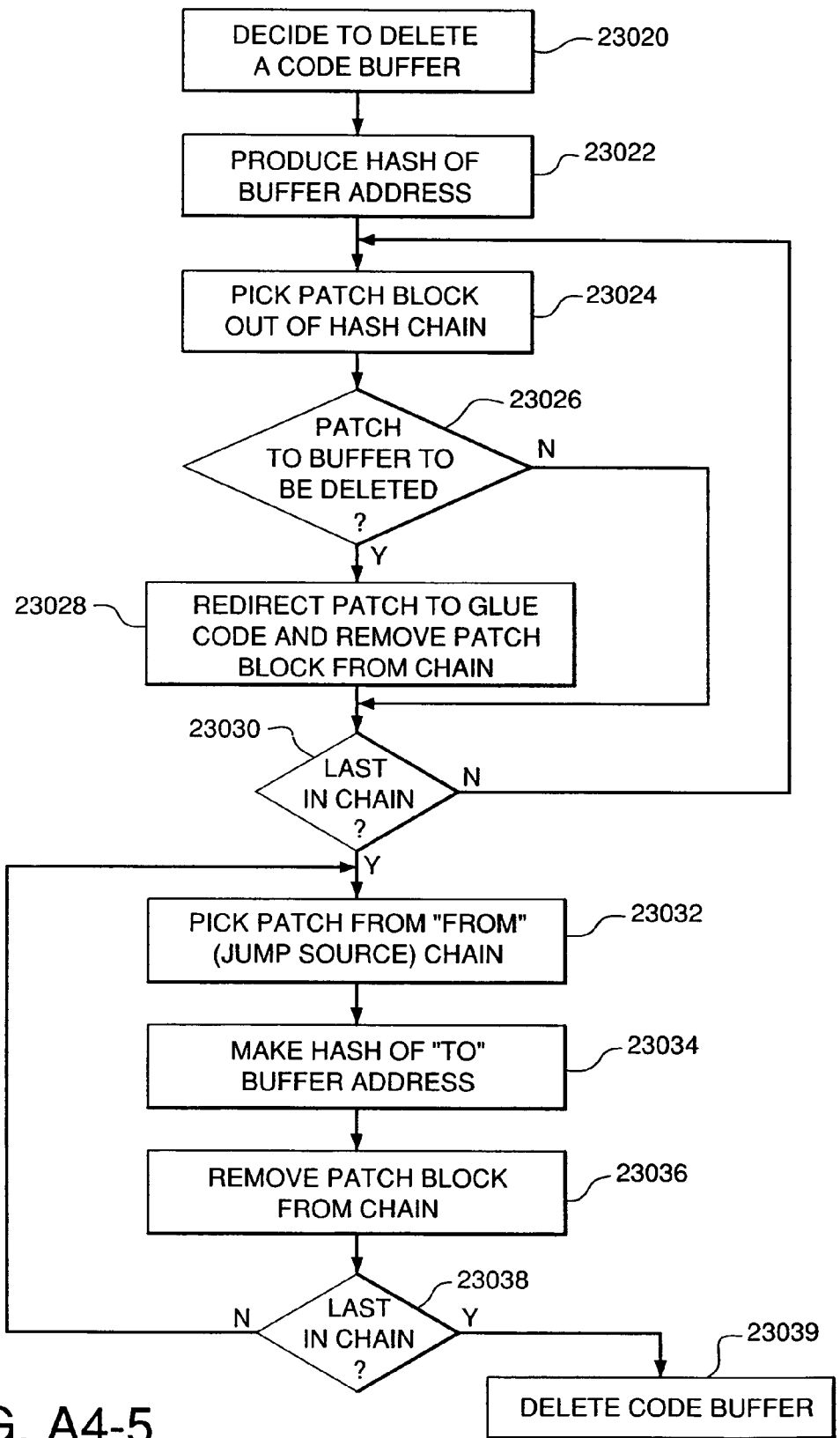
FIG. A4-5

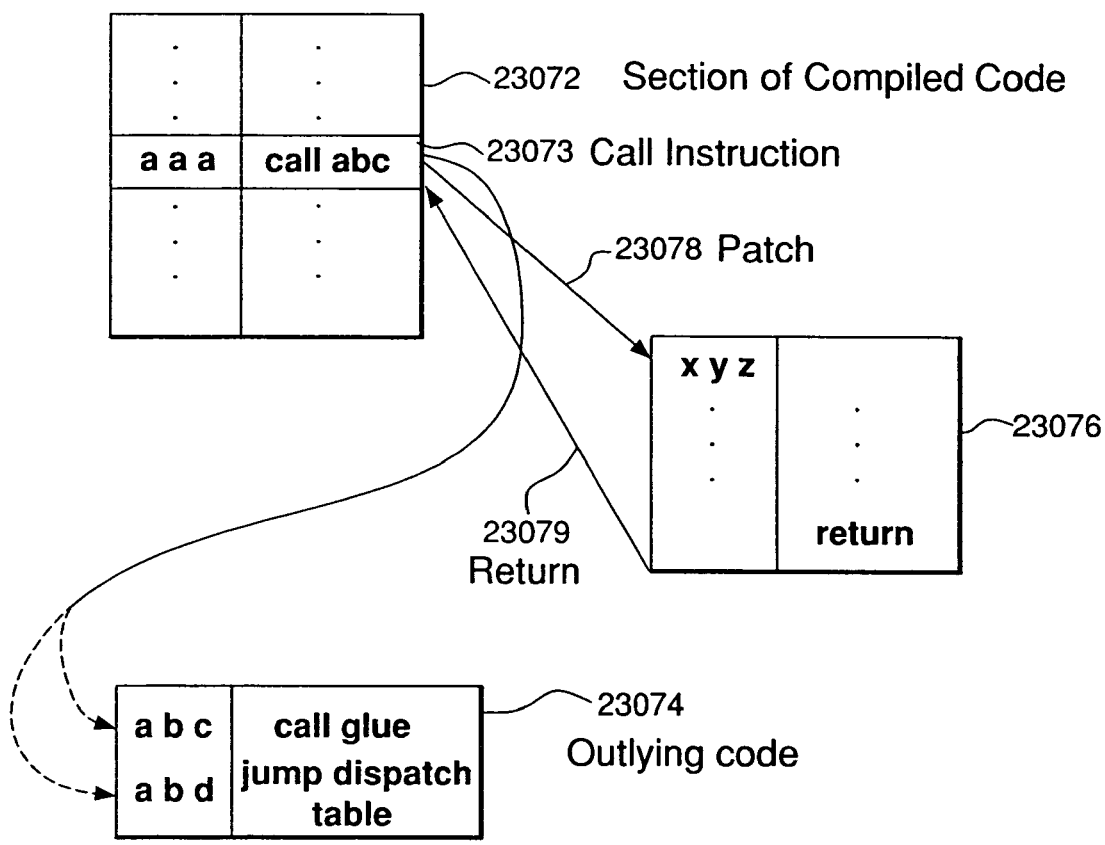
FIG. A4-6

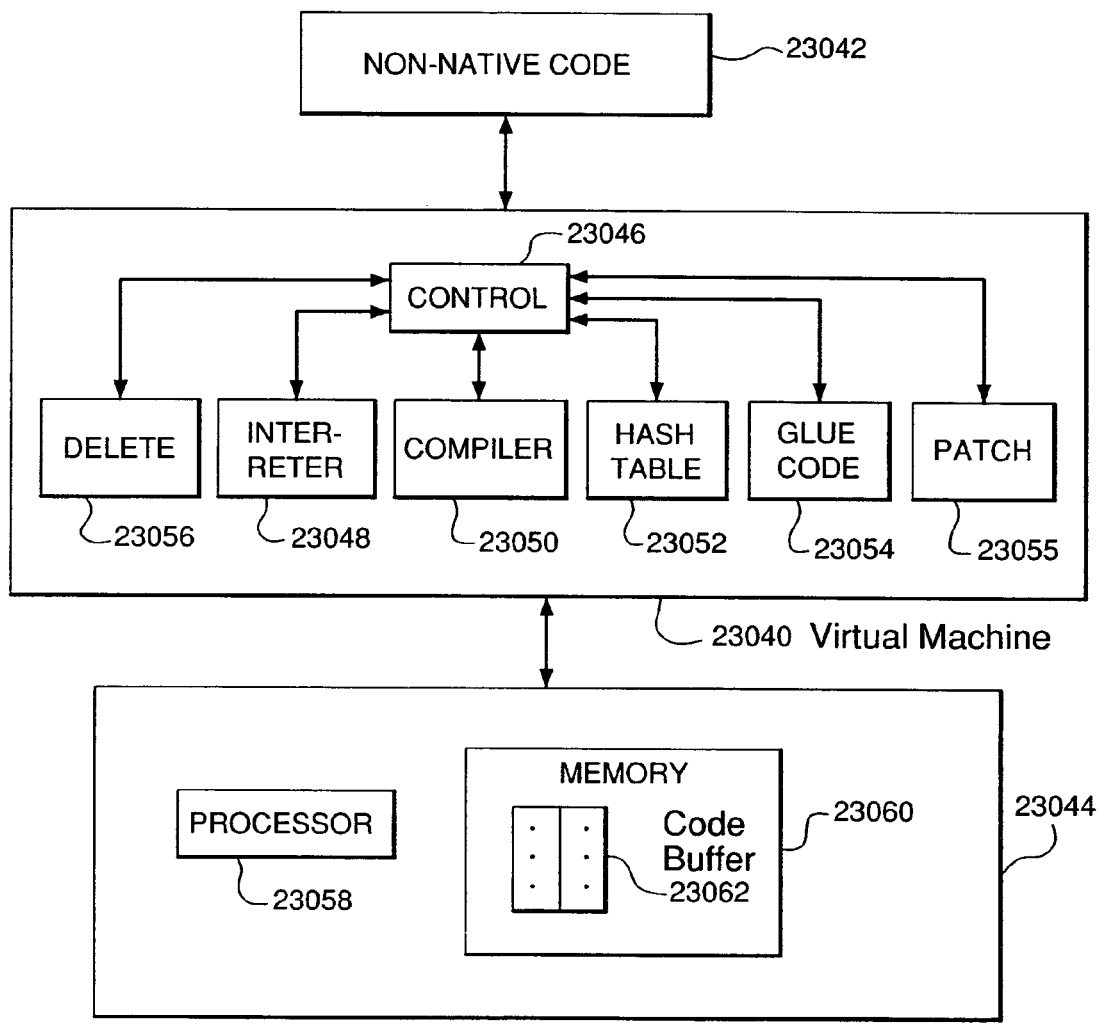
FIG. A4-7

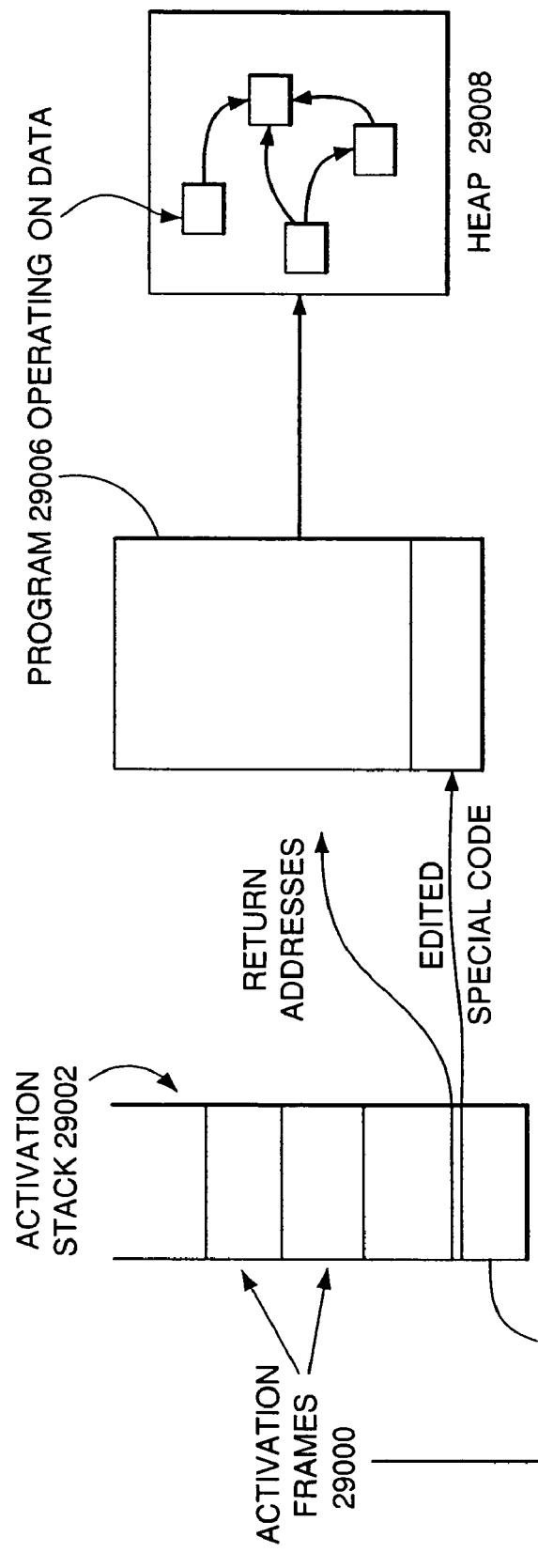
FIG. A5-1

FIG. A5-2
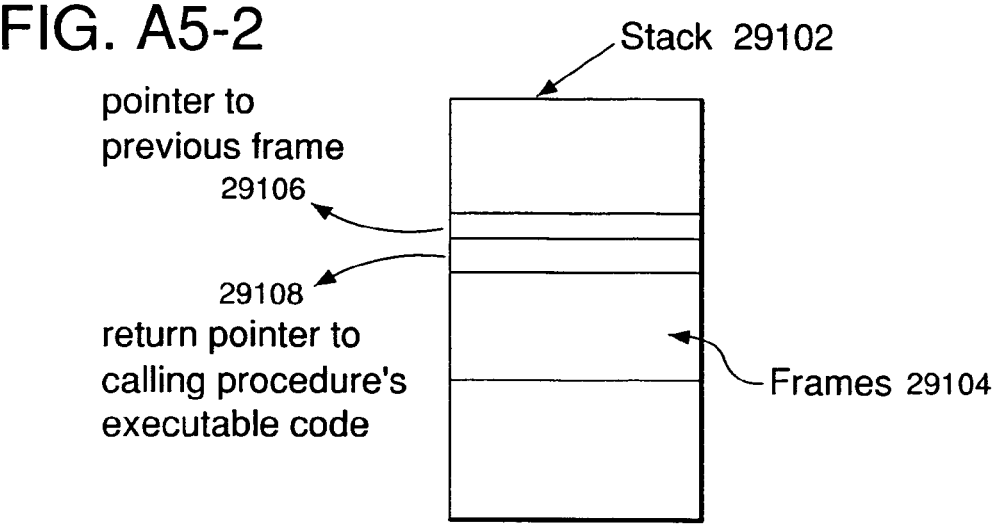
FIG. A5-3
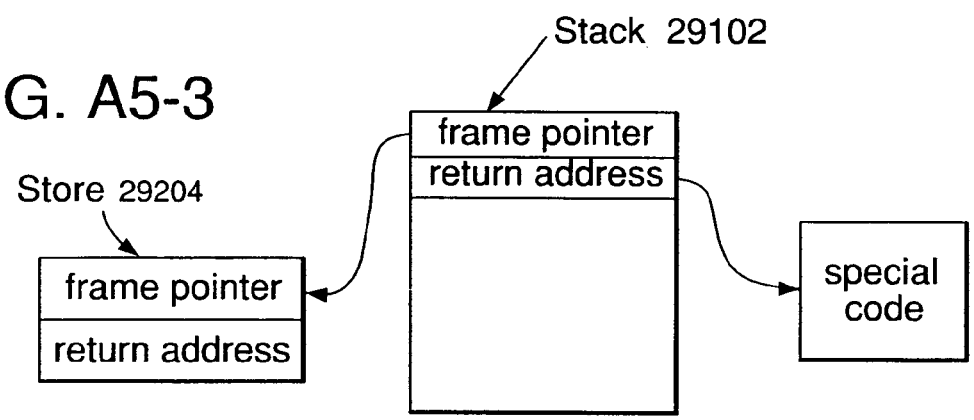
FIG. A5-4
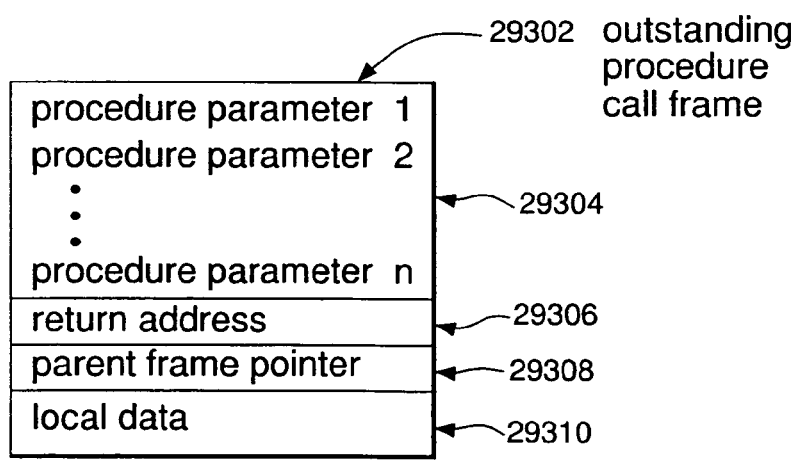

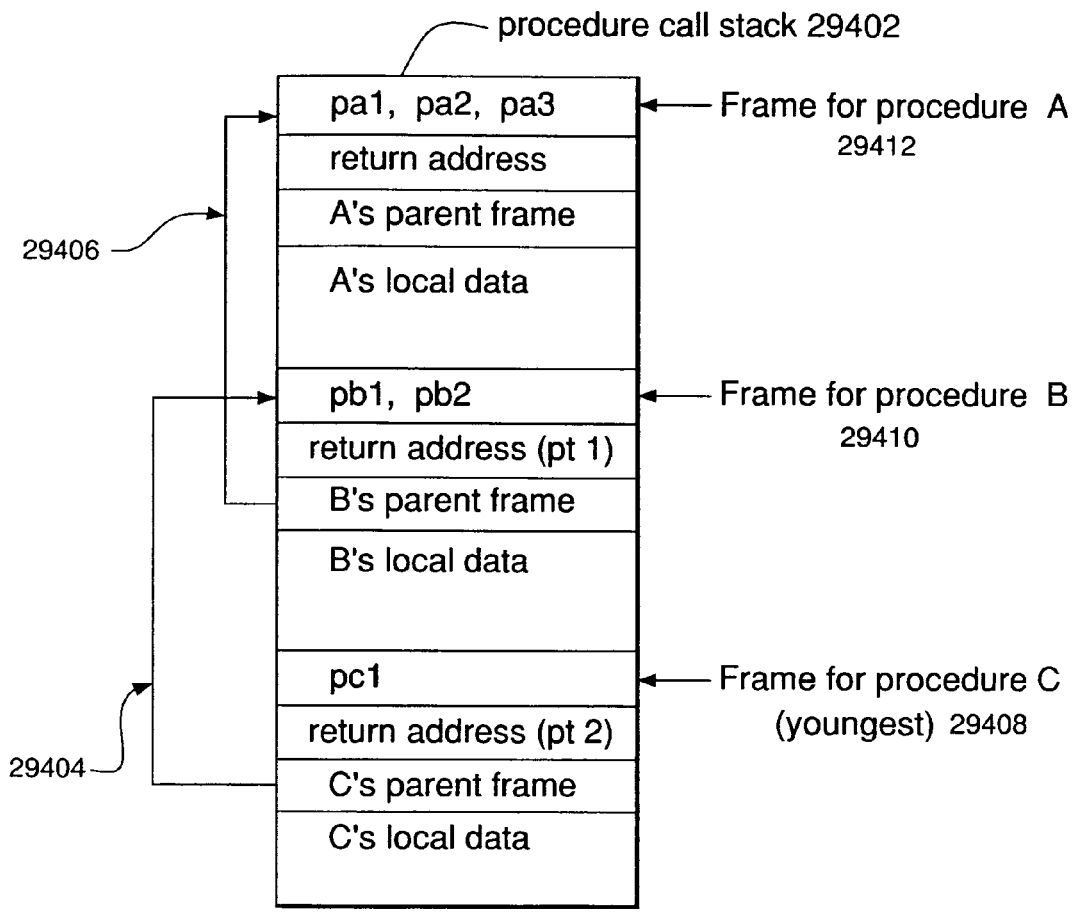
FIG. A5-5
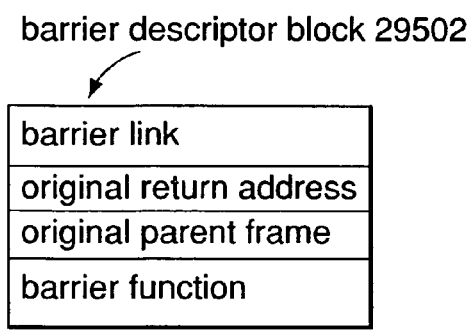
FIG. A5-6

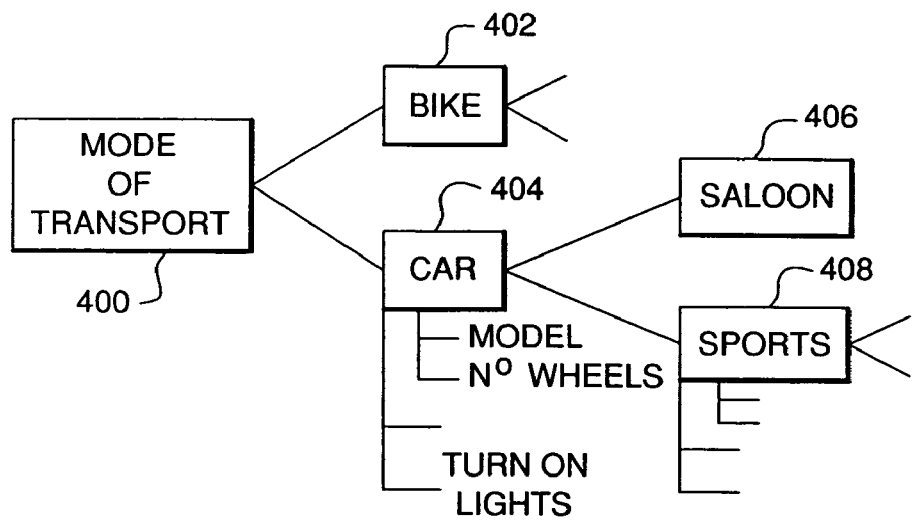
FIG. A6-1
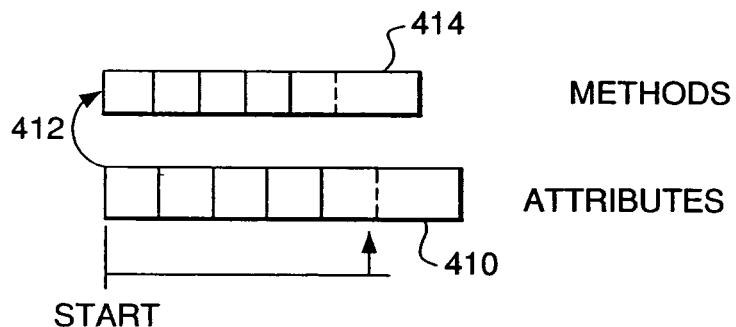
FIG. A6-2
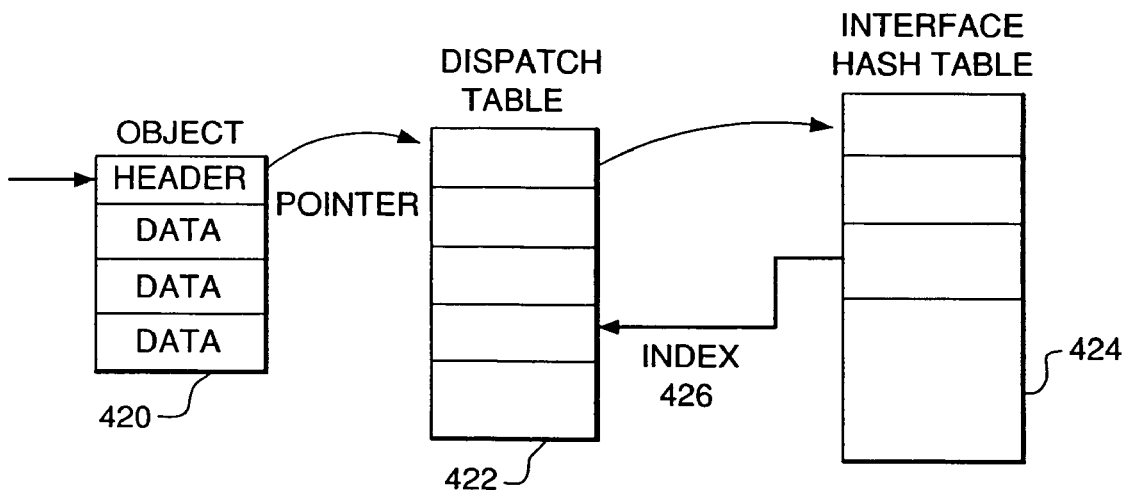
FIG. A6-3

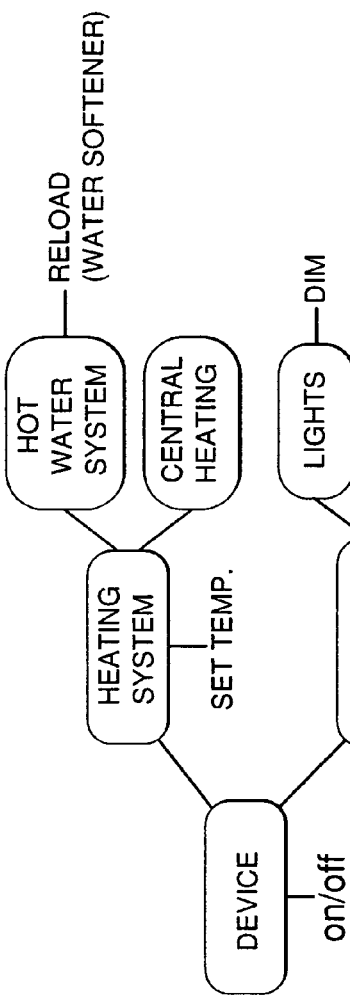
FIG. A6-4
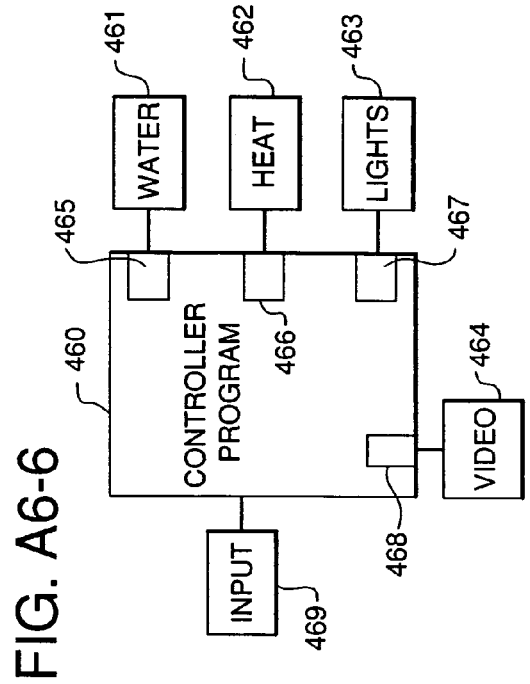
FIG. A6-6
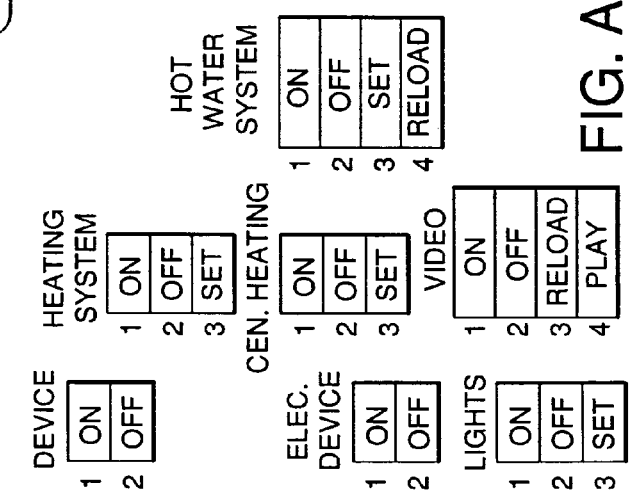
FIG. A6-5

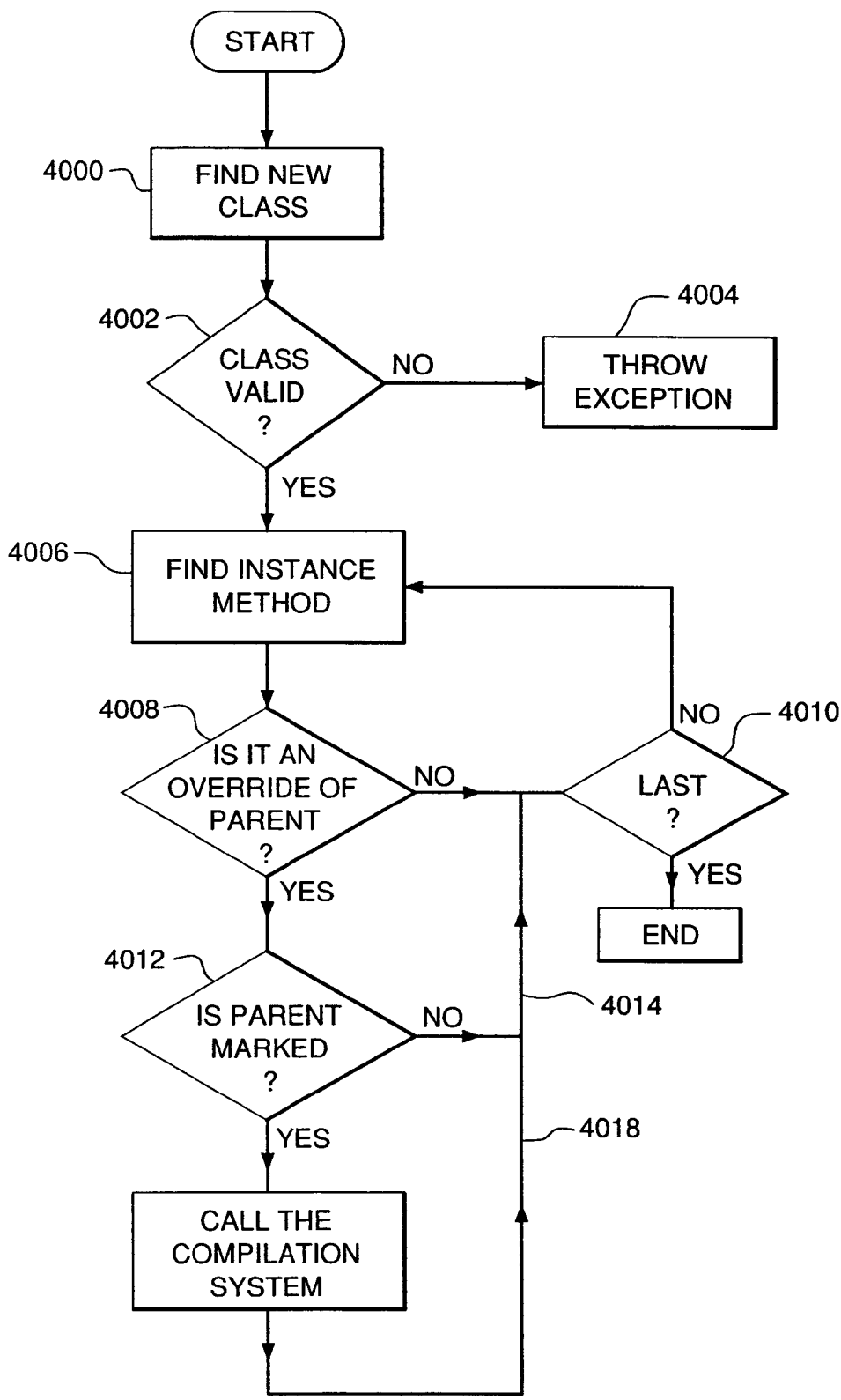
FIG. A7-1

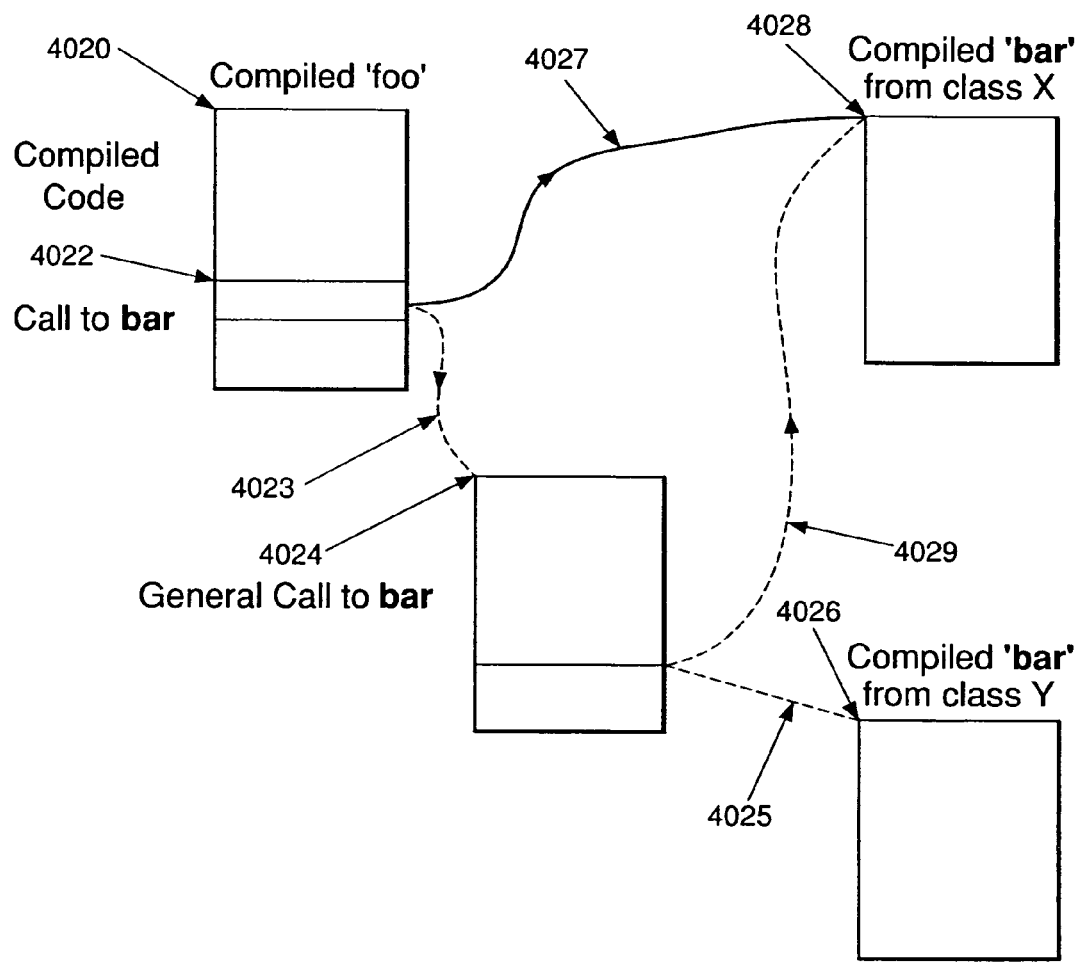
FIG. A7-2

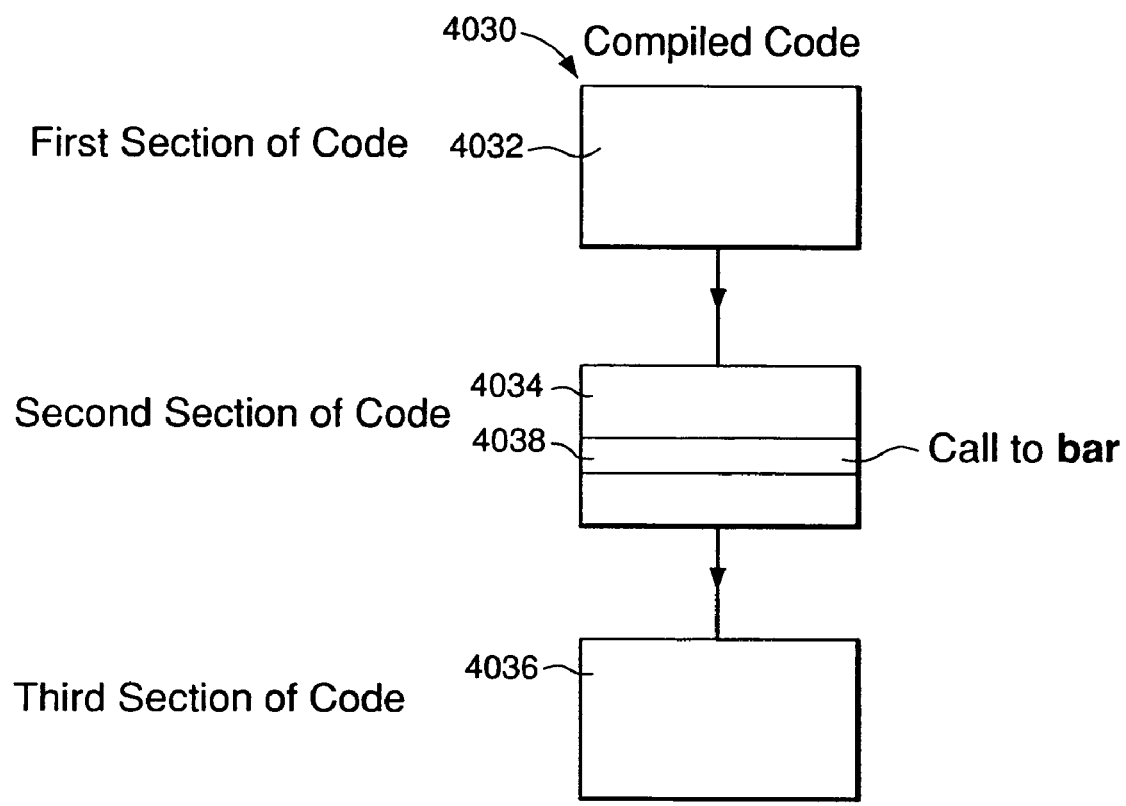
FIG. A7-3

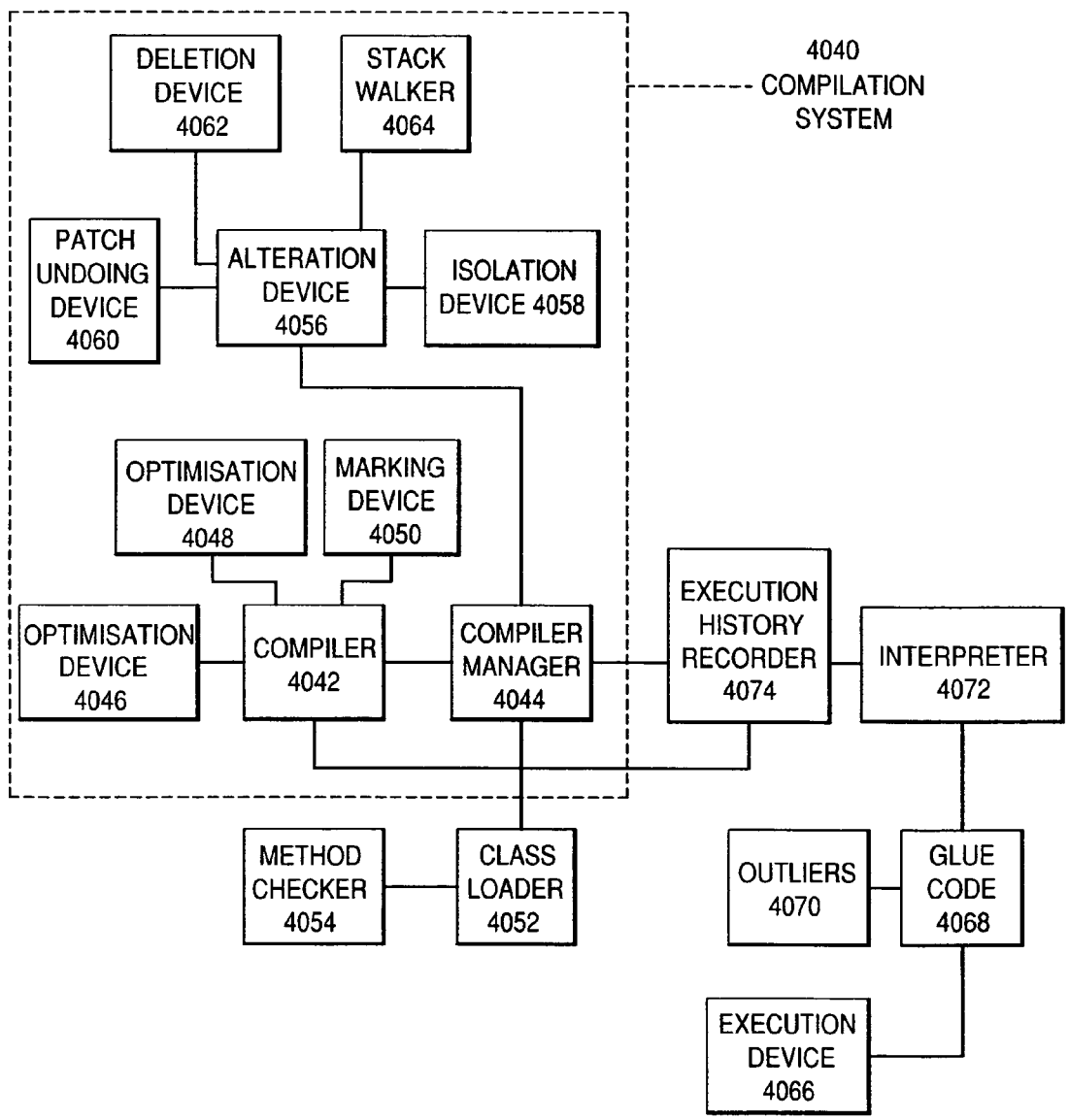
FIG. A7-4

DYNAMIC COMPILER AND METHOD OF COMPILING CODE TO GENERATE DOMINANT PATH AND TO HANDLE EXCEPTIONS

CROSS-REFERENCE TO RELATED APPLICATIONS

This is a continuation of International Application PCT/GB99/00788, filed on Mar. 16, 1999, which claims priority to U.K. Patent Application GB9825102.8, filed on Nov. 16, 1998, now abandoned and all of whose entire disclosures are incorporated by reference herein.

BACKGROUND OF THE INVENTION

1. Field of Invention

This invention relates, in it most general aspects, to a computer system and to a method of operating that system, and to improvements in the performance of various operations within such a system. It also relates to a computer-readable storage medium. The computer system may be, may include, or may be part of, a virtual machine. The computer-readable storage medium may contain executable code or other instructions for programming the computer systems/virtual machine. In particular, the invention relates to computer systems including a compiler for compiling code for execution. In a preferred embodiment, the invention relates to Dynamic Compilation of the Dominant Path.

2. Description of Related Art

In recent years, there have been developments in programming languages towards what is known as an object-oriented language. In these developments, concepts are regarded as 'objects', each carrying with it a set of data, or attributes, pertinent to that object, as well as information relating to so-called 'methods', that is functions or sub-routines, that can be performed on that object and its data. This is well known to those skilled in the art of computing and/or programming.

The advent and rapid advancement in the spread and availability of computers has led to the independent development of different types of systems, such as the IBM and IBM-compatible PC running IBM-DOS or MS-DOS or MS-Windows applications, the Apple Macintosh machines running their own Apple System operating system, or various Unix machines running their own Unix operating systems. This proliferation of independent systems has led to useful applications being available only in one format and not being capable of running on a machine for which the application was not designed.

Under such circumstances, programmers have devised software which 'emulates' the host computer's operating system so that a 'foreign' application can be made to run successfully in such a way that, as far as the user is concerned, the emulation is invisible. In other words, the user can perform all of the normal functions of say a Windows-based application on a Unix machine using a Unix-based operating system without noticing that he is doing so.

A particularly notable product of this type is that developed by Insignia Solutions of High Wycombe, GB and Santa Clara, Calif., USA and known under the name 'SoftWindows 2.0 for Powermac'. This software enables a physical Macintosh computer to emulate a PC having an Intel 80486DX processor and 80487 maths co-processor plus memory, two hard disks, IBM-style keyboard, colour display and other features normally found on recent versions of the PC-type of computer.

Furthermore, there is an ever-increasing demand by the consumer for electronics gadgetry, communications and control systems which, like computers, have developed independently of one another and have led to incompatibility between operating systems and protocols. For example, remote-control devices for video players, tape players and CD players have similar functions, analogous to 'play,' 'forward,' 'reverse,' 'pause,' etc, but the codes for transmission between the remote control, or commander, operated by the user may not be compatible either between different types of equipment made by the same manufacturer or between the same types of equipment made by different manufacturers. There would be clear benefits of having software within the equipment which can produce for example the correct 'play' code based upon a 'play' command regardless of the specific hardware used in the equipment. Such software is commonly known as a 'Virtual Machine.'

Other uses and applications are legion: for example, set-top boxes for decoding television transmissions, remote diagnostic equipment, in-car navigation systems and so-called 'Personal Digital Assistants.' Mobile telephones, for instance, can have a system upgrade downloaded to them from any service provider.

Emulation software packages tend to have certain features in common, notably that they are not general purpose but are dedicated. They are of most benefit in rapid development areas and have a distinct advantage in enabling manufacturers to cut costs. In particular, they can divorce software from the physical machine, i.e., the effect of the software in the physical machine can be altered by the emulating software without having to go into the machine's native software to implement those changes.

The specific object-oriented language used in some of the implementations described later is that known as Java (registered trade mark to Sun Microsystems Corporation). Some of the following implementations will enable Java to be used in smaller devices than is currently possible because of the improved performance and/or reduced memory footprint. Future uses projected for embedded software (virtual machines) include computers worn on the body, office equipment, household appliances, and intelligent houses and cars.

While it is recognised that there are clear advantages in the use of virtual machines, especially those using object-oriented languages, there are naturally areas where it is important and/or beneficial for some of the operations that are carried out within the system to be optimised. These may include reducing the memory requirement, increasing the speed of operation, and improving the 'transparency' of the system when embedded in another system. One of the principal aims of the inventions described herein is to provide a Virtual Machine which is optimised to work as quickly as possible within a memory constraint of, for example, less than 10, 5, 2 or even 1 Mbyte. Such a constraint is likely to be applicable, for example, to electronics gadgetry and other equipment where cost (or size) is a major constraint.

BRIEF SUMMARY OF THE INVENTION

This invention is preferably related to the optimisation of the runtime representation of object-oriented computer languages by means of runtime compilation technology and preferably to the optimisation of the runtime representation of object-oriented computer languages by means of runtime compilation technology. Aspects of the invention are related to optimised execution of virtual machines, and in particular Java virtual machines.

The invention relates in particular to trace scheduling, optimising compilers, dynamic compilation, profile guided optimisations, just in time compilers and the Java VM specification.

In some applications, for example using the Java language, code may be interpreted directly using an interpreter. The interpreter translates the code during execution and thus, the interpretation of code can be very slow. The execution of compiled code is therefore preferred since such execution is generally significantly faster than interpretation.

Standard compilers translate all of the code of an application to give a complete compiled runtime representation of the code for execution. Such standard compilation is time consuming, especially where optimisation of the compiled code is desired, and is usually carried out off-line before execution of the code.

The Just-in-Time (JIT) compiler provides on-line compilation of code. For example, using a JIT compiler, when a method is first encountered in the execution of the code, the execution is stopped and the JIT compiler compiles the whole of the method, optimising where possible. Thus the JIT compiler compiles the whole method, including parts of the method which are unlikely to be used. Such compilation wastes time in compilation and the compiled version of the code takes up space in the memory. This can present a particular problem for an embedded application where minimising the use of memory is of importance.

Generally, compilers of the runtime representation of computer languages and in particular so-called Just-in-time (JIT) compilers, compile the representation of a whole method at a time, or a larger unit (for example, a file or one of many classes at a time). Often a significant portion of an application relates to handling exceptional situations, or rarely executed code. Typically, the compiler blocks any further progress of the application until the compilation completes.

The conventional compilation approach therefore spends time compiling code which is rarely executed, and the compiled result occupies space which would have not been needed if the rarely executed code were not present. Optimisation opportunities are often reduced by having to cater for control paths through the rarely executed code.

Offline compilers which use profile input from a previous run of the application can often optimise the frequently executed paths of an application to mitigate the latter problem. However they still must compile every path through the application, and cannot easily react when an application exhibits different behaviour, to that of the profile run.

For the JIT compiler, when the 'invoke' instruction for a method is encountered, control is passed to the JIT compiler and, if the method has not previously been compiled, a compiled version is created. The compiled version is then used for the subsequent execution of the method. Once the budgeted memory available to the JIT compiler is used, the compilation of new methods is not possible and the use of the JIT compiler ceases. Methods subsequently found will be interpreted, thus slowing subsequent execution of the non-compiled code.

The amount of memory available to the compiler varies depending on the computer system used. The overall memory allocated to the compiler includes the code buffer space, the space allocated to the compiler for building required internal data structures and for register allocation. That memory is usually set aside for the compiler prior to compilation.

JIT compilers were designed for use on desktop computer systems having plenty of memory. The memory allocated to the compiler is generally so great that the amount of buffer space available to the compiler is, in practice, unlimited.

For embedded systems, however, the amount of memory allocated to the compiler might be 70 or 80K. Clearly, that imposes constraints on the amount of code that may be compiled.

In summary, the Invention described in this application involves any, some or all of the following features, in any combination:

1. Compile fragments of code for the dominant path rather than whole methods.

2. Use execution history to determine which paths through the application are the dominant ones.

3. Use a fallback interpreter to interpret infrequently executed code.

4. Have an online compilation system which can compile code on demand as the application executes. This system does not block progress of the application. The system runs as a separate thread, whose priority is adaptive.

5. Have the ability to incorporate new fragments of code into a running multi-threaded system.

6. Support removal of fragments of code from a running multi-threaded system.

7. Constrain the amount of memory used by the dynamic compiler during its execution at any time.

The invention described in this application aims to, among other things, reduce the performance impact of online compilation, generate code which is optimised for the dominant paths through an application, allow better optimisation of code, within time and memory constraints, reduce the storage overhead of compiled code which is rarely executed, improve application responsiveness in a multi-threaded computer system, and reduce the amount of memory used by the compiler itself.

According to the present invention, there is provided a computer system including a compiler for compiling the code of an application, wherein the compiler is arranged to compile a fragment of the code.

By compiling only fragments of code rather than whole methods, it is made possible only to compile the most desirable sections of code, leaving the less desirable fragments uncompiled.

By this method, the compilation may be made more efficient as only those fragments required are compiled. Also, the memory of the system need not be filled with compiled versions of rarely executed code.

Where reference is made to a fragment of code, it preferably refers to a section of code which represents less than a whole method. Preferably the fragment of code includes one or more blocks of code. It is preferred that the smallest unit of compilation of the code is a block.

A particularly preferred feature of the invention is that the fragment of code is a dominant path fragment of the code.

It will be understood that a dominant path fragment includes a fragment including a number of blocks of code which represents a preferred execution route through the relevant code. For example, where a section of code includes a conditional branch, on repeated execution of code through the branch, one path through the branch is likely to be preferred over another path through the branch. The fragment of code associated with the preferred route through the branch is preferably considered to be a dominant path fragment.

As indicated below, in some cases, another less preferred route through the branch may also be a dominant path.

In a preferred embodiments of the present invention, the dominant path fragments of code include code which is frequently executed. Preferably, the dominant path does not include infrequently executed code. Such infrequently executed code may include, for example, code for handling infrequently encountered exceptions.

By compiling only the dominant path, in accordance with a preferred embodiment of the invention, the storage overhead of storing compiled code which is rarely executed can be minimised. Further, optimisation techniques can be used to optimise the execution of the dominant path code thus increasing the speed of execution of the dominant path code. Further, the compiler need not waste time on-line in compiling rarely executed code and so the overall speed of execution in the system can be improved.

In a preferred embodiment of the invention, a fragment of code is considered to be part of a dominant path if it is executed more than a predetermined number of times.

Preferably, the computer system further includes an execution history recorder for recording the number of times a fragment of code is executed, preferably interpreted.

Preferably the execution history recorder records the number of times a block of code is interpreted.

In preferred embodiments of the invention, as well as recording how many times a particular block has been interpreted, the execution history recorder also records further information regarding the execution of the block, for example, from where the transfer of control into the block came and to where control was transferred out of the block. The recorder preferably also records what type of code was executed in the block.

Preferably a fragment which has been interpreted a number of times which is equal to or greater than a threshold is able to be compiled. Preferably, the threshold is greater than or equal to 2, 5 or even 10.

Thus the frequently executed blocks of code are compiled. It is generally unpreferable for unexecuted blocks to be compiled. In preferred embodiments of the invention, no unexecuted blocks are compiled.

Preferably the system further includes a compiler manager and the execution history recorder is arranged to alert the compiler manager when a fragment of code has been interpreted the threshold number of times. In preferred embodiments of the invention, the compiler manager administers a queue of frequently executed blocks for compilation. Preferably the queue is managed in such a way that only the more frequently executed blocks are chosen from the queue for compilation by the compiler.

Preferably, the threshold is able to be dynamically tuned. For the example above, in which the compiler manage administers a queue, if the queue is persistently long, the threshold is preferably raised so that fewer blocks are sent to the queue for compilation.

It is highly preferable for the execution history recorder to be arranged to record during the execution of the application. It is preferred for the execution history to be collected on-line so that a representation of the dominant path for the particular execution of the application by the system may be determined and used to generate the compiled code. In the alternative, when information regarding the dominant path is captured from a previous run, there is a risk that conditions may have changed from the previous run and the dominant path of the previous run is not a representation of the dominant path of the present run. Furthermore, the dominant path may change during a run.

Preferably, the system further includes an interpreter for interpreting the code of the application and the execution history recorder is arranged to record the interpretation of fragments of code. It is more efficient for the interpreter to manage the execution history recordal. It is envisaged that the recordal of execution of compiled fragments of code could be carried out but in many cases it is thought that it would not be worthwhile having regard to the time and memory required to do so.

Most preferably, the execution history recorder is arranged to record a path of execution from a first fragment to a second fragment. Preferably, the path of execution from a first block to a second block is recorded. In a preferred embodiment, the execution history recorder records, for the execution of a particular block, to where control was transferred from the block. Thus, for a particular block, the most likely successor block can be determined. Thus a dominant path from the particular block can be determined. If the particular block passes the threshold number of executions and is compiled, a dominant path from that particular block through the most likely successors can be compiled.

Thus, preferably, the compiler is arranged to compile a path of fragments.

Preferably, the system is arranged so that only fragments in which all of the code has been executed are able to be compiled. Some sections of code are not always suitable for compilation. If sections of the code have not been executed, the unexecuted portions might include "hidden" code which is unsuitable for compilation. Compilation of such unexecuted code is avoided in preferred embodiments of the invention.

In embodiments of the present invention, a block of code is unsuitable for compilation if it has not executed all the way to a control transfer. As a result, there may still be symbolic resolution required—a job left for the interpreter to implement.

Preferably, the compiled version of the dominant path exposes only one external entry point to the rest of the system. Therefore, assumptions may be made in the compilation of the code. Thus the compiler is preferably arranged to create compiled fragments having only one external entry point.

Where the fragments of code are compiled, preferably the compiler is able to optimise the compiled code. Such optimisations might include inlining. Where compiled code has been optimised, in particular where assumptions have been made when optimising the code which might later prove to be untrue or too limiting, preferably the compiled code is associated with a marker to indicate that a particular optimisation or assumption has been made.

In preferred embodiments of the invention, several optimisations are made, in many cases using various assumptions, to produce particularly efficient compiled code for the dominant path.

Preferably, the system includes a fallback interpreter. Preferably the fallback interpreter is not used when a compiled version of code is available, but is used when no compiled version is available, an exception occurs, or an assumption proves false during execution.

Preferably the system includes an interpreter and at least one portion of compiled code wherein, on execution of the code, at least a first portion of the code is executed from compiled code and at least a second portion of the code is executed from non-compiled code by the interpreter. Preferably, the system uses a fall back interpreter.

This feature is of particular importance and may be provided independently. Thus, a further aspect of the invention provides a computer system including an interpreter and further including the code of an application, the code including at least one portion of compiled code, wherein, on execution of the code, at least a first portion of the code is executed from the compiled code and at least a second portion of the code is executed by the interpreter.

The interpreter can be used where there is no compiled versions of the code available or, for example, where assumptions made in the compilation of the code are found to be untrue. Thus more aggressive optimisation is thus made possible to produce optimised code which might not be 'safe' to use in all cases. Where a case is identified in which the compiled version is not safe to use, the fallback interpreter can complete the execution of the necessary code without excessive disruption to the execution and without the need to cease execution while a fresh compiled version of the section of code is produced.

Preferably the system further includes a searching device for determining whether there is a compiled version of a fragment of code. Thus, the possibility of time being wasted when an interpreter interprets a section of compiled code is available, is reduced. Preferably, the compiler is able to compile on-line. Thus the compiler is able to create compiled versions for any new dominant path fragments which may appear during a run.

In a preferred system, the system is multi-threaded. Preferably the compiler runs on a separate thread to the thread executing code.

Preferably, the compiler is able to limit the memory which is used by itself and by the compiled fragments. Thus the compiler preferably has a memory management policy enforced by the compiler to limit the memory used by compilation. This is of particular importance for virtual machines which have limited memory. Preferably the system also includes a deletion device for deletion of compiled code. Thus compiled versions of less frequently used code are able to be deleted to release memory for new compiled code.

The present invention finds particular application for virtual machines, in particular in embedded systems. It is envisaged that the invention could also find general use in systems for which there is the choice of executing compiled code and interpreting code. The invention is of particular use in systems having memory constraints.

The invention also provides a compiler for compiling code in a computer system, the compiler being arranged for the compilation of a fragment of code. Preferably the compiler is arranged for the compilation of a dominant path fragment of the code.

Accordingly, the invention provides a computer system containing a compiler for compiling the operating code of an application, in which only dominant path (or near dominant path) fragments of the code are compiled.

This technique can afford the primary advantage of enhancing performance and reducing compiled space. It is important for a small memory application and involves a mixture of trade offs between memory size, compilation time and performance.

In its preferred form, it also enables the use of key optimisation techniques, involving loops and inlining, without the overhead of global dataflow analysis, and hence allows the compiler itself to execute much faster than compilers that do perform global dataflow analysis.

The memory usage of the compiler itself is also much lower.

In the system as defined, advantageously only the dominant path of execution is compiled, rather than all the paths through the code, while the remaining paths are interpreted.

It is a particularly preferred feature that the compiler is operating on-line, in the sense that as the operating code is running parts of it are being compiled; what is termed the dominant path may be constantly changing as execution of the code progresses.

The invention further provides a method of operating a computer system, the computer system including a compiler for compiling the code of an application, wherein a fragment of the code is compiled.

Preferably, the number of times a fragment of code is executed is recorded by an execution history recorder.

In a preferred embodiment wherein the system further includes a compiler manager and the execution history recorder alerts the compiler manager when a fragment of code has been executed a threshold number of times, and preferable wherein the execution history recorder records during the execution of the application.

The invention provides in a further aspect a method of operating a computer system including an interpreter and further including the code of an application, the code including at least one portion of compiled code, wherein the method includes executing at least a first portion of the code from the compiled code and executing at least a second portion of the code using the interpreter.

Preferably the compiler compiles on line. Preferably the memory available to the compiler is limited and preferably the method further includes the step of deleting compiled code.

Also, according to the invention, there is provided a method of operating a computer system containing a compiler for compiling the operating code of an application, the method including compiling only the dominant path fragments of the code.

The method can enhance the performance and reduce the compiled space requirement of the computer system and the memory space requirements of the compiler itself.

Advantageously, information identifying the dominant path is provided from the execution history of the code. The execution history information is preferably derived dynamically as the program runs. The execution history information is advantageously captured from a previous run of the code.

In its preferred embodiment, infrequently executed code is interpreted in a fallback interpreter, whereby preferably execution of the code can continue without the need for compiled code for the infrequently executed code.

Advantageously, an online compilation system is provided which can compile code on demand as the application/program executes whereby compilation information can be generated in response to the appearance of a new frequently executed path.

When the computer system is operating in a multi-threaded system, new fragments of code are preferably incorporated into the multi-threaded system, whereby preferably to achieve smoother operation without stopping running threads.

The invention further provides a method of operating a computer system containing a compiler for compiling the operating code of an application, the method including compiling only the dominant path fragments of the code.

Preferably the method includes compiling a fragment of the code and preferably includes compiling a dominant path fragment of the code.

The invention also provides the use of a fall back interpreter to execute infrequently executed code.

Further provided by the invention is code for a computer system, the code including compiled code produced by a method as aforesaid.

Any, some, or all of the features of any of the aspects of the invention may be applied to any other aspect.

The following considerations apply to any and all the inventions and aspects of the inventions described above.

BRIEF DESCRIPTION OF THE SEVERAL VIEWS OF THE DRAWINGS

Reference will be made, where appropriate, purely by way of example, to the accompanying figures of the drawings (which represent schematically the above improvements) in which.

Figure 1:
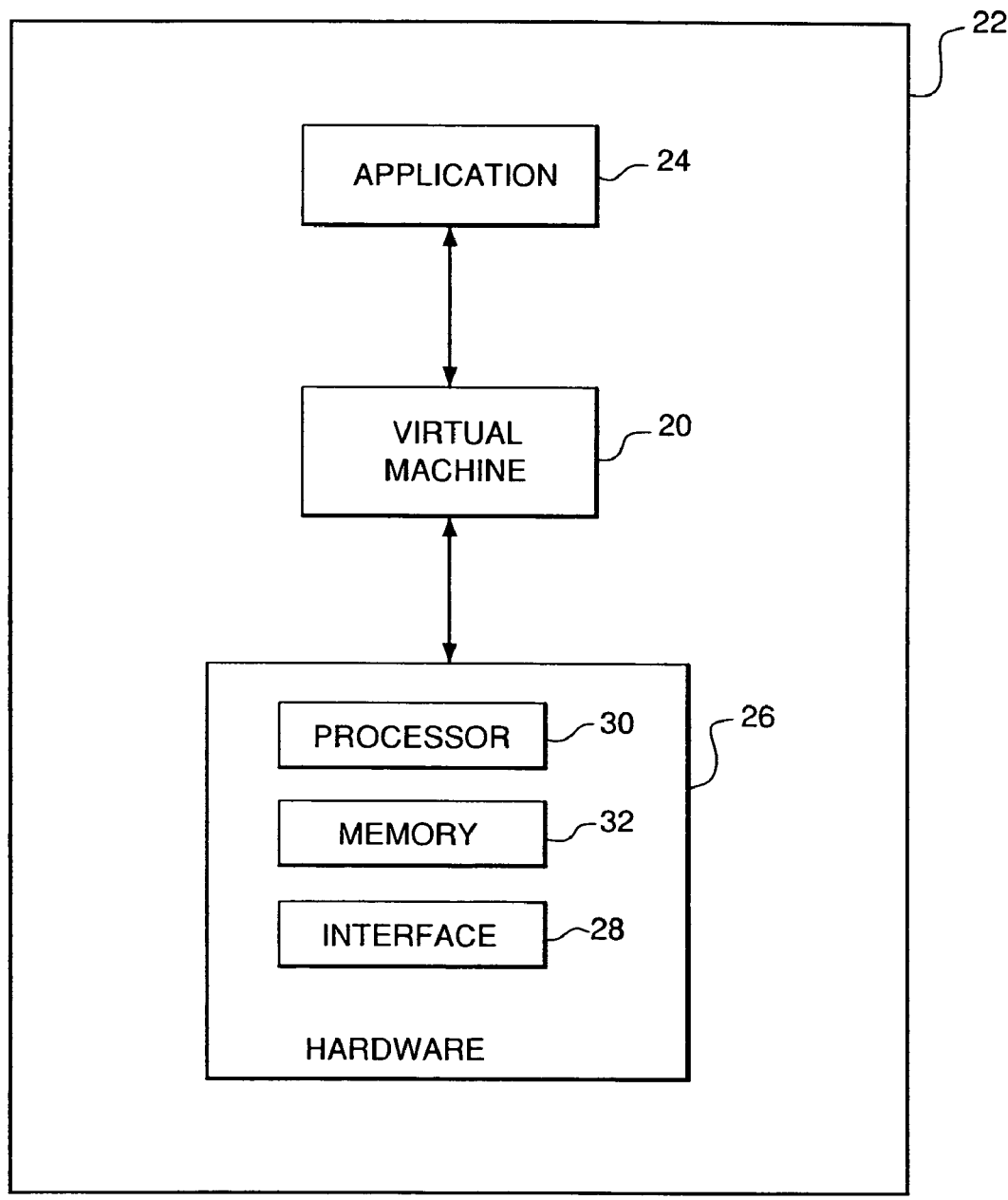
FIG. 1 shows certain components of the virtual machine.

FIG. A1-1 illustrates the principle of a virtual machine;

FIG. A1-2 illustrates the operation of an emulator stack;

FIG. A1-3 illustrates the operation of a unified stack;

FIG. A1-4 shows an embodiment of the present invention;

FIG. A1-5 shows an apparatus embodiment of the present invention;

FIG. A2-1 shows a section of code before compilation;

FIG. A2-2 shows a standard compilation of the code of FIG. A2-1;

FIG. A2-3 shows compilation of code in accordance with a preferred embodiment;

FIG. A2-4 shows a code buffer;

FIG. A2-5 shows the memory arrangement in a computer system;

FIG. A2-6 shows apparatus for carrying out the method of the invention;

FIG. A3-1 shows apparatus for carrying out the method of the invention;

FIG. A3-2 shows a fragment of code including an exception;

FIG. A3-3 shows a compiled fragment of code in accordance with the present invention;

FIG. A4-1 to A4-4 illustrate the use of patches in compiled code;

FIG. A4-5 is a flow diagram of a preferred method embodiment;

FIG. A4-6 illustrates the use of patches with potentially polymorphic methods;

FIG. A4-7 is a block diagram of a preferred apparatus embodiment;

FIG. A5-1 is a schematic illustration of data storage in a stack;

FIG. A5-2 shows an activation stack;

FIG. A5-3 illustrates how checks are made on references in a frame;

FIG. A5-4 shows the arrangement of data in a procedure call frame;

FIG. A5-5 shows the execution of a procedure;

FIG. A5-6 shows the arrangement of the contents of a barrier descriptor block.

FIG. A6-1 illustrates a hierarchical structure in object-oriented programming;

FIG. A6-2 shows the arrangement of data stored in dispatch tables;

FIG. A6-3 shows the application of an interface hash table to a dispatch table;

FIG. A6-4 is a hierarchical structure of a domestic equipment system;

FIG. A6-5 shows dispatch tables used in operating devices in the domestic system of FIG. A6-4;

FIG. A6-6 shows a controller program with driver devices for operating the devices in the domestic system of FIG. A6-4;

FIG. A7-1 shows a flow diagram illustrating a preferred embodiment;

FIG. A7-2 shows a section of compiled code;

FIG. A7-3 shows a different section of compiled code; and

FIG. A7-4 shows apparatus for carrying out a preferred embodiment.

DETAILED DESCRIPTION OF THE INVENTION

A specific example of a preferred embodiment of virtual machine is now described with reference to FIG. 1.

The virtual machine 20 is an executable code installed in the particular item of equipment 22. It can provide a degree of independence from the hardware and operating system. The virtual machine may typically include any, some, or all of the following features: an operating engine, a library of routines, one or more interpreters, one or more compilers, storage means for storing a plurality of instruction sequences, queue management means, and buffer management means.

The virtual machine is coupled to one or more applications 24 on one side (the "high level" side), and, on the other side (the "low level" side), perhaps via various intermediate logical units, to the hardware 26 of the item of equipment. The hardware can be regarded as including various ports or interfaces 28 (perhaps an interface for accepting user input); the virtual machine receives events from those ports or interfaces. The hardware also includes one or more processors/control means 30 and memory 32.

1. Compile Fragments of Code for the Dominant Path Rather than Whole Methods

A summary of a preferred embodiment is as follows:

The compiler takes as input the runtime representation of the source program, and execution history information (which may be obtained as described below). The execution history information could be live (that is, dynamically changing as the program runs), or captured from a previous run of the program.

Execution history information is combined with structural information determined from the runtime representation of the program source, to establish what is the dominant path of the program the compiler should compile. Unexecuted code is preferably never included in the dominant path.

The compiler treats the dominant path as a super-block fragment, laying the code out sequentially, even though the program source may not be. Branches and tests are adjusted where necessary to make the dominant path fall-through. Code and registers are optimised with the assumption that the dominant path will be followed to the end. This improves performance on modern processor architectures. Critically, the dominant path only exposes one external entry point. This greatly simplifies and enhances optimisations.

Figure 1A:
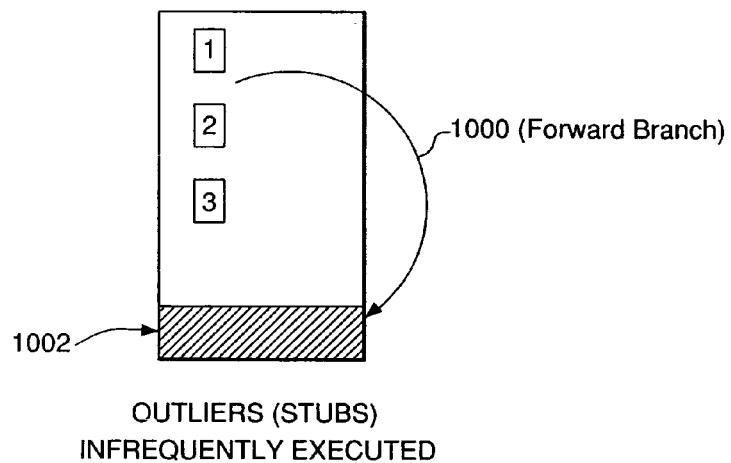
FIG. 1A shows paths of execution.

As shown in FIG. 1A, where the path of execution would leave the dominant path, the appropriate run-time tests are inserted with a forward branch 1000 to some stub code referred to as an "Outlier" 1002. The outlier stub updates any state which the dominant path has not written back yet, before transferring control out of the fragment. The mainline code of dominant paths are generally kept together, as are the outlier stubs as shown at 1002. This improves performance on modern processors, especially where branch prediction software/hardware initially assumes that forward branches are less likely. It also provides better instruction cache behaviour.

Compiling dominant paths of execution allows loop optimisations and inlining to be performed, while simplifying the analysis required for many optimisations. It obviates the need for the compiler to have to resolve symbolic references. That is left to the fallback interpreter.

For example, when loading a new class symbolic references are used, for example, for fields so that when the first time the reference is seen it is necessary to load the class hierarchy satisfying the symbolic references. Where, in a preferred embodiment of the invention, all of the relevant code has been interpreted at least once, the symbolic references have already been resolved before the code is compiled.

Often exceptions need to be recognised in the middle of a loop after some global state has changed. The exception check can be performed early outside the loop, forcing the code into the fallback interpreter, thus allowing the check to be removed from the loop, and code motion to be performed in the presence of those exceptions.

The fallback interpreter will execute the loop and recognise the exception at the right time, albeit more slowly. It is assumed that exceptions rarely occur, and therefore the benefits of the optimised loop will outweigh the disadvantages.

Various optimisations can be made in compiling the code. The optimisations may be made at block level or may be more widespread, in particular where several blocks are involved. An advantage of the preferred embodiments of the invention is that flow analysis need not be carried out. Registers are preferably used for the compiled code to give faster execution of the compiled code.

Where the fall back interpreter is available for use, it is possible to make various assumptions when compiling the code and to omit several safety checks which might otherwise have been required if no fallback interpreter were available. If later any of the assumptions is proved wrong, or if the lack of safety checks would cause something to go wrong, the fallback interpreter can be used to interpret the relevant non-compiled code.

When the compiler is being executed online as the application is executed, the compilation overheads are often critical. By only compiling the dominant path, the compiler is simpler, quicker, and uses less memory for its analysis and therefore can afford to perform more optimisations than would otherwise be feasible, especially in a small memory system.

2. Use Execution History to Determine which Paths Through the Application are the Dominant Ones Execution history is captured as the application executes. It is maintained at the block level, when a transfer of control occurs. It is preferred for the execution history recorder to record when a block is entered (when the transfer of control into the block occurs). The execution history recorder may also record other details relating to the execution of the block, for example which is the next block (successor) that was executed after the block in question. Thus information about the preferred route of execution through the blocks of code may be obtained rather than only information about individual blocks.

For each block an entry count and list of successors is kept with a count associated with each. These counts act as an indicator of popularity. Execution history records also contain an indication of what instruction caused the transfer of control which ends the block. Only blocks that have executed up to the transfer of control are candidates. For blocks which have not executed all of the way through, it is not known what type of code is 'hidden' in that part of the block which has not been executed. Such hidden code might contain code which requires symbolic resolution. It is therefore preferred that such blocks are not compiled. Where the count of the block is made in the execution history recorder as the control is transferred from the block, only blocks which have executed to the end will be counted. Alternatively, or in addition, checks can be carried out prior to compilation to check whether the block has executed to the end.

When memory is constrained, execution history records are recycled in two ways. Firstly, the list of successors is limited to a small number, and when a new successor is encountered the least popular existing successor is replaced with the new one. When there are no free execution history records, all of the history records associated with the least frequently used method are moved to the free list.

In summary, compilation of a fragment is triggered by the entry count of a block exceeding a given threshold. The threshold may be fixed, or dynamically tuned. However, if the state of the history block indicates that the block is already queued to be compiled, or is not compilable, it is ignored. Such a block may not be queued for compilation.

In a preferred embodiment, when the code is first executed, none of the code is compiled. Execution is initially carried out by the interpreter. As each block is interpreted, the count of the block held by the execution history is increased by one. The execution history recorder records, for each block, from where the transfer of control into the block came and to where the control was transferred from the block. The execution history may also contain further information about the execution of the block, for example the type of code executed in the block. A threshold is set and when the count for a particular block reaches the threshold value, the block is entered on the queue for compilation. The threshold may be 5; when a particular block has been executed 5 times, it is entered on the queue.

The compiler is associated with a compiler manager which manages the queue of blocks for compilation. When a particular block reaches the threshold number of executions, the execution history recorder sends a message to the compiler manager to enter the block on the queue for compilation. The compiler is running on a separate thread and checks at intervals to see whether there is an item for compilation in the queue and, at some time, the compiler will start to compile the block referred to at the top of the queue.

In a preferred embodiment, the queue is managed so that new entries onto the queue are entered at the top of the queue and are therefore most likely to be compiled. When the queue is managed in that way, blocks which reach the threshold many times are more likely to be compiled than blocks which reach the threshold only a few times, or once. So that the queue does not become unmanageable, the compiler manager may delete part or all of the queue from time to time.

If it is found that too many blocks are being queued for compilation, the threshold can be raised. Equally, if few, or no, blocks are being queued for compilation, the threshold can be lowered. This can be carried out dynamically during the execution of the application. The compiler manager can monitor the length of the queue and, if desired, send a message to the execution history recorder to increase or decrease the threshold.

When the compiler compiles a block which is queued by the compiler manager, it may proceed to compile just that single block. It is preferred, however, that the compiler uses the information gathered by the execution history recorder regarding the successors of the block and compiles not only the single block which has reached the threshold but also the most popular successors of the block, thus compiling the most popular path from the block (the dominant path). It will be appreciated that the successors of the block may or may not have been executed the threshold number of times to be eligible for compilation in their own right but, nevertheless, are compiled as a part of the dominant path from a block which has been executed the threshold number of times.

When the compiler takes a block for compilation, it carries out checks to determine whether the block is one which is desirable to compile, for example, if it is able to be compiled, and whether there is already a compiled version of the block available.

The compiler then traces the dominant path (though the most popular successors of the block) until it gets to the end of the method or comes across a piece of code which it is not desirable to compile, for example because a compiled version already exists. Other code which is not desirable to compile would be code which merges back into the dominant path other than at the original block that triggered compilation. Flow analysis would be required for optimal compilation otherwise. The compiler detects and prevents such control flow merges from occurring (having determined the likely flow at a branch, the unlikely flow is handled by generating code to exit the fragment). It will not pass beyond the end of the method but it will follow, for example, invokes to follow the dominant path. When the compiler stops in its tracing of the dominant path, it starts to compile the code, starting at the beginning of the dominant path.

When a compilation triggers, the dominant path can be determined by following the most popular successors a block at a time, including following method calls.

Generally speaking, execution history of the running application is a good indicator of which paths are the dominant ones.

It will be appreciated that, where there are two or more paths through a method, both or all of the paths through the method may be dominant paths and be compiled if the relevant blocks are executed sufficient times.

Execution history does not need to be accurate, and can be updated in a number of ways. Rather than track execution history in compiled code, which would slow execution down significantly, execution history is maintained by the fallback interpreter.

3. Have a Fallback Interpreter which Interprets Infrequently Executed Code

Having a fallback interpreter means that when infrequent or exceptional code is executed, execution can continue without the presence of compiled code for it. The fallback interpreter maintains execution history. It also means that all issues to do with class resolution can be solely handled by the fallback interpreter.

Where only the dominant path of the code is compiled, where the path of execution leaves the dominant path, interpretation of non-compiled code will be necessary. Furthermore, optimisations may have been carried out in the compilation of the compiled code and, if it is discovered at a later stage that assumptions which were made in the optimisations were incorrect, the fallback interpreter is used to interpret the relevant section of code. Also, the run starts execution using the interpreter before any compiled versions of the code have been created.

It will be seen, therefore, that there are many occasions where it might be necessary to pass control of execution from the compiled version to the interpreter and away from the interpreter when compiled code is available.

As is described in more detail below for a particular embodiment, while the interpreter is translating code, checks are carried out to see if there is a compiled version of the code next to be executed. Thus unnecessary interpretation can be avoided.

Again, as discussed in more detail below, when control is passed to and from the interpreter and between separate pieces of compiled code, special conversion devices are provided. Examples of such devices are "glue code" and "outliers". The conversion devices help to ensure the smooth transfer of execution between compiled versions of the code. They hold, for example, information regarding the address of code to be interpreted at the end of a compiled section and are of particular importance where optimisations have been made in the compiled version to ensure that the variables are up to date and are stored on the correct registers, for example, when the execution is transferred.

For example, when a jump is made from the compiled code to the interpreter, the interpreter expects memory state to be current, so if a memory location has been put into a register for the compiled version, it needs to be returned to the correct memory location before the interpreter proceeds.

4. Have an Online Compilation System which can Compile Code on Demand as the Application Executes As and when application behaviour changes, a dynamic compiler can generate optimised code for any new frequently executed paths which show up. By running as a separate thread, this allows the application to continue useful work via the fallback interpreter.

5. Have the Ability to Incorporate New Fragments of Code into a Running Multi-threaded System Smoother operation is obtained if a new fragment of code can be incorporated without stopping running threads.

Once the compiler has completed the compilation of the dominant path for a particular block, it sends a message to the compiler manager that the compilation has been completed. Until complete, the compiled code is kept from the executable code. The compiler manager loads the compiled code in the executable code. The necessary changes are made in the dispatch tables and code cache to indicate that the compiled code is available for the relevant block and where the compiled code is.

The introduction of the compiled code is carried out atomically so that the stopping of running threads is not required.

6. Support Removal of Fragments of Code from a Running Multi-threaded System

Removal of code fragments is also key to being able to operate in restricted memory environments. It also allows code which was optimised for one dominant path to be replaced with different code when new dominant paths appear. Code can be compiled with optimistic optimisations on the basis that they can be deleted if the optimistic assumptions under which the code was compiled are broken.

As indicated above, where assumptions made about the dominant path are found to be incorrect for subsequent execution of the code, the fallback interpreter can be used to interpret a non-dominant path through the code. However, if a dominant path which has been compiled is subsequently executed infrequently, it would be desirable to remove the compiled version of the code to release the memory used by the compiled version.

In some embodiments, the number of times of execution of each piece of compiled code is monitored and, if it is executed infrequently, can be marked as suitable for deletion.

In a preferred embodiment, the number of times a code buffer is accessed is recorded. Before passing control into a buffer, its execution count is increased. The least popular buffer may be deleted when desirable.

For example, at a certain point, the compiler may run out of code buffer space. A buffer is then deleted. If a count has been made of the number of times control has been passed into the various buffers, the least popular buffer may be deleted. Alternatively, the oldest buffer may be deleted.

It will be appreciated that various checks will usually be carried out before the deletion of the buffer to reduce the risk of disruption to the system. See Appendix 1 of this specification.

Figure 1B:
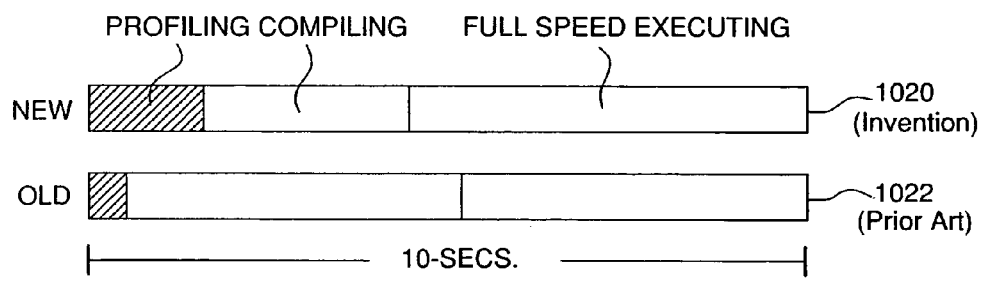
FIG. 1B shows the comparative costs of compiling dominant paths.

The fact that compilation costs can be radically reduced is illustrated by the schematic diagram in FIG. 1B in which the comparative time taken up in profiling, compiling and executing at full speed for the invention 1020 and the typical prior art 1022 are shown as a proportion of a 10-second time slot.

Use of the dominant path also allows the dynamic compiler to be memory constrained by truncating a fragment some way along the path when the compiler reaches its budgeted memory limit. This is impossible in prior-art compilers.

Thus, when the compiler has used all of its allocated memory, the compilation of a fragment can be terminated. It will be understood that suitable steps would usually need to be taken so that at the end of the truncated compiled fragment, control can be passed back to the interpreter so that execution can continue at the correct byte code address and with the correct updated parameters and register structures, where required.

It is crucial in small memory computer systems that the compiler adheres to a memory budget. Prior art compilers typically view memory as an unlimited resource. Hence they may consume large amounts of memory during compilation, to build internal representations of its input program, and to hold results of dataflow analysis and the like.

In contrast, the dynamic compiler works within external configurable constraints imposed upon it at system start up or build time. It then compiles as much of a fragment as it can within these constraints. If necessary, it truncates the fragment, by relying on the feedback interpreter to receive control at the truncation point. This is impossible in prior art compilers, where the unit of compilation is a method or greater, and where no interaction with a fallback interpreter is available.

There now follows an example of a run in which execution history is used to determine a dominant path, the dominant path fragment is compiled and execution switches between compiled and non-compiled code.

The system described includes a virtual machine (VM) and includes an interpreter (in C language) and a Java application. The system is multithreaded and includes a Java main thread, a Compiler Manager thread and a compiler thread.

For example, the Java application includes Class A:

Class A

```
static main ()
{
    for (i=f; i<100; i++)
    Aa=newA();
    a.method(i);
}
```

The Java thread is started:

Java A class load A

Figure 1C:
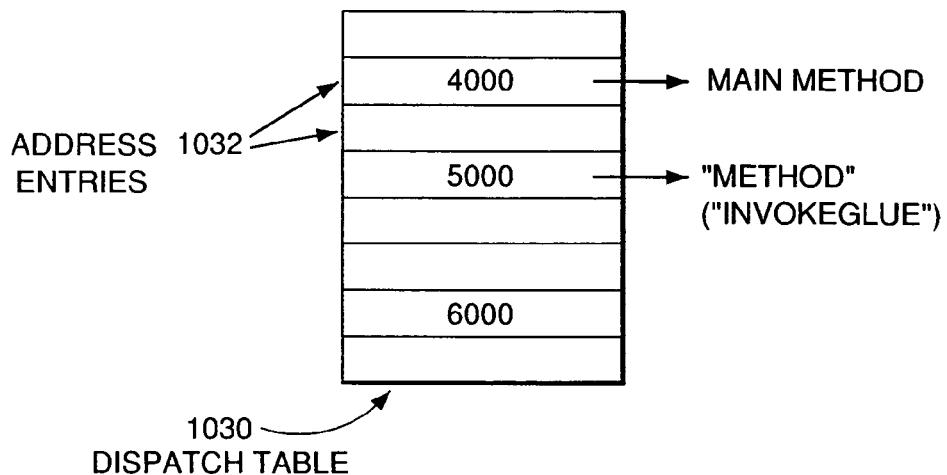
FIG. 1C shows a dispatch table.

Class A is loaded and A's dispatch table is loaded. The dispatch table is shown schematically in FIG. 1C. FIG. 1C shows A's dispatch table 1030 having various address entries 1032. For example, the main method is located at address 4000.

The main program of the VM identifies the address of the method main A at 4000 and calls glue code:

call glue (4000)

Glue code is a part of the conversion device which enables the execution to switch between the use of the interpreter and the execution of compiled code. Glue code includes several devices for effecting smooth transfer between the execution of compiled code and non-compiled code. Glue code includes sections for one or more of:

1. updating states of memory locations and register states.
2. passing control to the interpreter when no compiled version of code is available or optimisations made in compiling code are found to be inappropriate.
3. passing control away from the interpreter when a compiled version of code for execution is available.

The conversion device may include outliers as described above for updating the states. For example, when an exception is encountered in execution of compiled code, control may pass first to an outlier for states to be updated before passing to the glue code for instructing the interpreter to begin executing the code for dealing with the exception.

The glue code then calls the interpreter to start to execute code beginning at address 4000:

call interpreter (4000)

The interpreter starts at address 4000 and executes the byte code until it reaches the invoke instruction. The interpreter returns to the glue code which determines that the interpreter is trying to perform the invoke. The interpreter knows where the invoke is in the dispatch table, and tells the glue code.

The glue code takes the object reference for the method off the stack and looks at the dispatch table to get the address for the method.

If a compiled version of the start of the method is available, the address of the compiled version will be entered in the dispatch table, and the compiled version is executed.

If there is no reference to a compiled version of the start of the method, the dispatch table includes an entry for "invoke glue" and a return is effected to a separate section of the glue code which starts interpretation of the method at the relevant address:

call interpreter (5000)

When the interpreter jumps into the method, it sends a message to the execution history recorder that the method is about to be executed.

At the end of the method, there is a return, and the interpreter returns to the glue code which returns the execution to the previous method for interpretation or execution of a compiled version as indicated above.

The glue code includes a dedicated portion for handling returns which ensures that the register, stacks, and so on are correct for the execution of the next piece of code. For example, where the method has been executed from a compiled version and the next piece of code is to be interpreted, anything put onto registers for the compiled version has to be restored into the correct memory location before the next section of code is generated. Thus the return handling glue code restores any states which have been altered as a result of the use of the compiled code.

Thus the return to the glue code further returns to the return handling glue code before execution passes to the next portion of code.

The various portions of glue code described above may all be a part of the same piece of glue code, or may be separate glue code pieces. The updating of the states may be carried out by outliers as described above and in Appendix 2 of this specification.

A further example below describes the action of the interpreter for a transfer of control other than an invoke.

In this embodiment, the following method has just been invoked and is to be executed using the interpreter:

```
void func (int p, int a)
{
    int x = p;
    for (int i=a; i<p; i++)
    {
        x=x/i;
    }
}
```

The interpreter executes the method in byte code, symbolised in numbered lines as follows:

| | Bytecode: | Java: |
|---|---|---|
| 0 | iload _ 1 | x=p; |
| 1 | istore _ 3 | |
| 2 | iload _ 2 | i=a; |
| 3 | istore 4 | |
| 5 | goto 16 | |
| 8 | iload _ 3 | x=x/i; |
| 9 | iload 4 | |
| 11 | idiv | |
| 12 | istore _ 3 | |
| 13 | i inc 4 1 | i++; |
| 16 | iload 4 | i<p? - reiterate if true |
| 18 | iload _ 1 | |
| 19 | if_icmplt 8 | |
| 22 | return | |

The method void func is called for the first time. There is no compiled version so the method starts execution by the interpreter. At execution time, the following blocks (groups of lines of code) are recognised by the interpreter:

$b_1=\{0–5\}$
$b_2=\{19\}$
$b_3=\{8–19\}$ (not a basic block)
$b_4=\{22\}$

The interpreter executes the first block $b_1$. The interpreter runs an execution history recorder in which it records that $b_1$ has been executed once and has a count of 1. (Preferably, it also records that the successor of $b_1$, is $b_2$ and that $b_1$ was executed all of the way through. For simplicity, references to the recordal of such extra information is omitted below).

At the end of the block, the interpreter consults the code cache to see if there is a compiled version of the next block $b_2$. (Note that in this example, while there is a transfer of control from one block to another, there is not an invoke and thus there is no return to the glue code. In an alternative embodiment, the interpreter might return to the glue code after every block, but that is likely to be time consuming. In the preferred embodiments described herein, the interpreter only returns to the glue code when a. it encounters an invoke,
    b. it encounters a return,
    c. it finds from the code cache that there is a compiled version of the next block, or
    d. via an exception.

In this case there is no compiled version, so the interpreter proceeds to execute $b_2$, giving $b_2$ a count of 1 in the execution history recorder. The interpreter consults the cache again and, finding no compiled version of $b_3$, proceeds to execute $b_3$. For the present example, the loop is repeated 3 times so when a return is made from the method by block $b_4$ (going through the return handler glue code as described above), the counts of the blocks in the execution history recorder are as follows:

$b_1=1$
$b_2=1$
$b_3=3$
$b_4=1$

If the threshold for compilation is 5, none of the blocks $b_1$, $b_2$ or $b_3$ will be queued for compilation.

After the next time the method void func is called, the counts will be as follows:

$b_1=2$
$b_2=2$
$b_3=6$
$b_4=2$

Thus the execution history recorder sends a message to the Compiler Manager to queue $b_3$ for compilation. At some later time, the compiler will consult the queue, and compile $b_3$. Before compilation, the compiler determines the dominant path from $b_3$ using the record for $b_3$ in the execution history recorder which indicates the successors of $b_3$. In this simple case, the most popular successor of $b_3$ is $b_3$ so that only the single block $b_3$ representing the loop is compiled. The compilation of $b_3$ may be optimised for example by using registers to store the values of p, x, i and a. A pre-exception condition check could be inserted for an i=0 check (division by zero) (see Appendix 3 of this specification). When the compiler has completed the compilation, it notifies the Compiler Manager what compilation has been done, where the compiled version is and whether it includes a method entry point or not. The compiled version is not available for execution at this time.

In due course, the compiler manager will load the compiled version of $b_3$. The code cache is updated so that the host code address for that part of the method now points to where the compiled code is.

At a later time when the method func is called, the interpreter consults the code cache after execution of $b_2$ and finds that a compiled version of $b_3$ is available.

The interpreter returns to the glue code which, as described above, effects the execution of the compiled version of $b_3$.

At a later time still, the method func will have been executed 5 times so that $b_1$ and $b_2$ are queued for compilation.

When $b_1$ is taken for compilation, the compiler will determine the dominant path from $b_1$. The successor of $b_1$ is $b_2$ (the compiler does not consider $b_3$ for compilation as part of the dominant path on this occasion because there is already a compiled version).

The fragment $b_1$ and $b_2$ is compiled and the dispatch table is updated.

On a subsequent execution, the compiled code for $b_1/b_2$ is executed, a return is made to the glue code, which effects execution of the $b_3$ compiled code. If the path from compiled $b_1/b_2$ to the glue to the compiled $b_3$ is effected a sufficient number of times, a patch connecting the compiled $b_1/b_2$ to compiled $b_3$ may be made. (Patching is described in more detail in Appendix 4 of this specification). Thus the execution can be made more efficient because the step through the glue is no longer required.

At a later time, a memory manager associated with the compiler manager decides that memory for the compiler should be freed. The oldest buffer chosen for deletion includes the compiled version of $b_3$. The compiler manager calls the deleter to delete the buffer. Certain checks have to be carried out before deletion (see for example Appendix 1 of this specification). In the example given above, there is a particular problem because a patch was inserted between the compiled code for $b_1/b_2$ (which is not deleted) and the compiled code for $b_3$ (which will be deleted). For a discussion of how this problem may be overcome, see Appendix 4 of this specification).

Figure 1D:
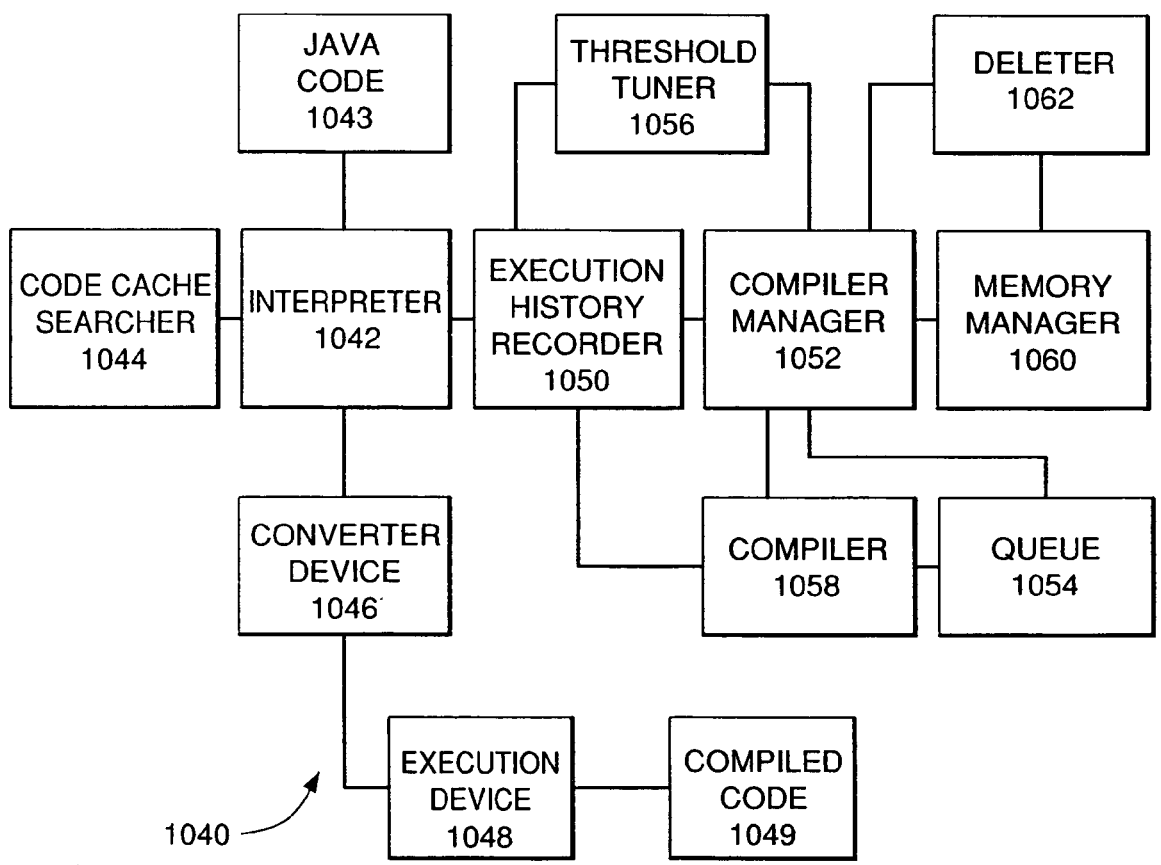
FIG. 1D is a schematic representation of apparatus for carrying out the invention.

FIG. 1D shows apparatus 1040 suitable for carrying out the embodiment described above.

The apparatus 1040 includes an interpreter 1042 for interpreting Java code 1043 in the computer system. When the interpreter reaches the end of a block of code, unless there is an invoke or a return, it consults the code cache using the code cache searcher 1044 to see if a compiled version of the next block is available. If there is, the converter device 1046 (which includes the glue code referred to above) carries out the necessary changes and alterations before passing control to an executer 1048 for executing the compiled version 1049 of the code.

As interpreter 1042 executes, it records in the execution history recorder 1050 which blocks of code have been executed as well as further details about the execution of the block, for example which blocks were executed before and after the block and what type of code was executed.

The execution history recorder 1050 notifies the compiler manager 1052 when a block is executed a threshold number of times. The block is held in a queue 1054 managed by the compiler manager 1052. A threshold tuner 1056 monitors the length of the queue from information from the compiler manager 1052. Based on information regarding the length of the queue, the threshold tuner 1056 alters the threshold for the execution history recorder 1050 to send a block to the compiler manager.

A compiler 1058 compiles blocks referred to in the queue 1054. The compiler 1058 uses information from the execution history recorder 1050 regarding the execution of the block to determine the dominant path from the block and prepares a complied version of the code. When the compiled version is complete, the compiler 1058 notifies the compiler manager 1052 which updates the necessary dispatch tables and code caches and loads the compiled version.

The compiler manager 1052 includes a memory manager 1060 which monitors the memory available to the compiler 1058. If memory available becomes low, the memory manager 1060 instructs a deleter 1062 to delete some of the compiled code. Also, if the queue 1054 becomes too long, the compiler manager 1052 instructs the deleter 1062 to delete some or all of the queue 1054.

Figure 1E:
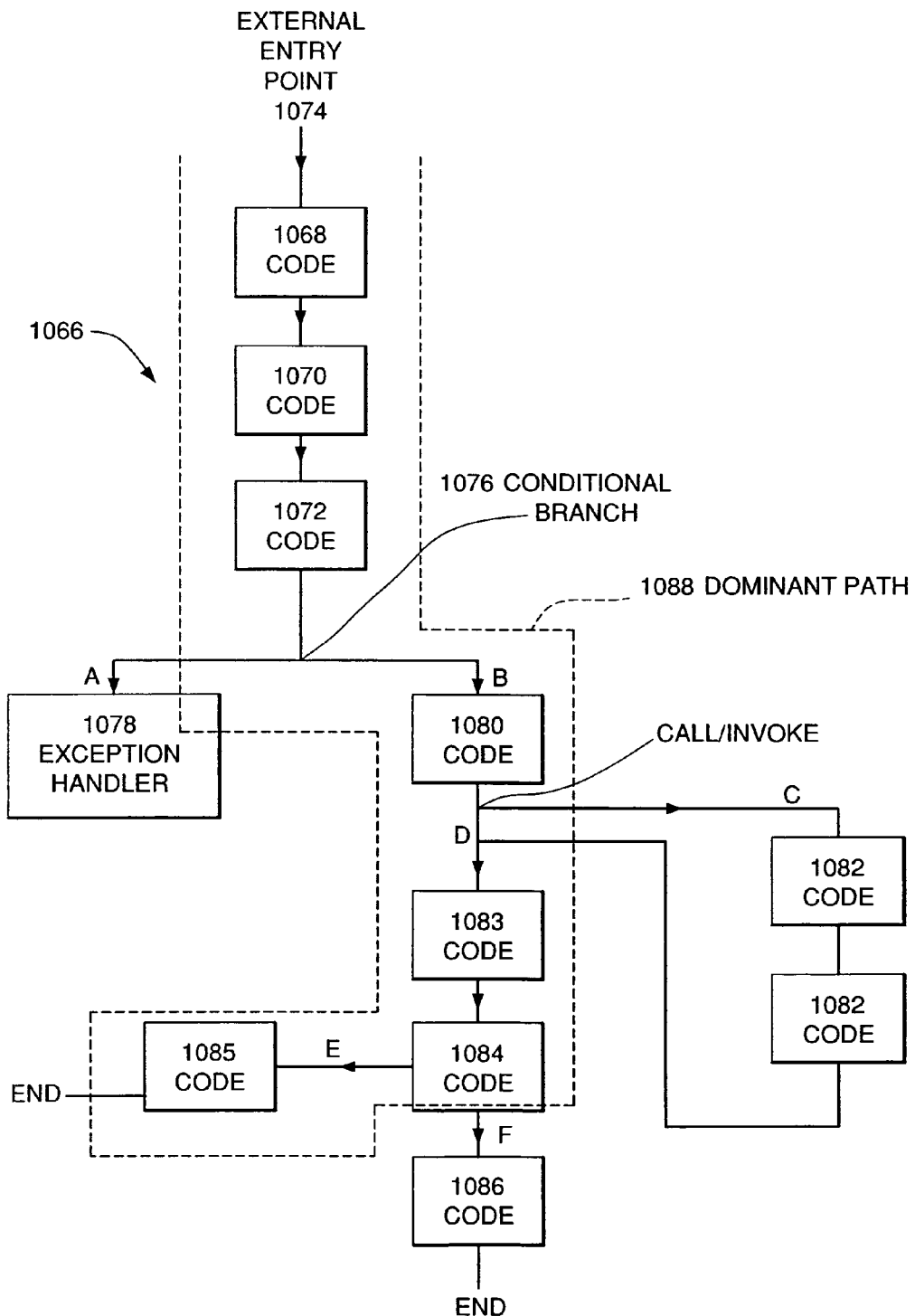
FIG. 1E shows paths of execution through code.

FIG. 1E shows paths of execution through code of a method generally referred to as 1066.

The figure shows schematically various fragments of code, for example 1068, 1070, 1072. Such fragments of code may each represent a block of code.

The code shown in the Figure has one external entry point 1074. After block 1072, there is a conditional branch 1076, for example an exception check. If an exception occurs, the execution passes along path A to code 1078 to handle the exception. Otherwise, code passes along path B to code block 1080 at which point there may be a call (path C to block 1082) or the execution may follow path D to code sections 1083, 1084. Execution may pass along path E to block 1085 or path F to block 1086.

Information about execution runs through the code 1066 is recorded on the execution history recorder 1050 run by the interpreter 1042.

If block 1068 is found to have been executed by the interpreter the threshold number of times, it is passed to the queue 1054. The compiler 1058 consults the execution history in the recorder 1050 and finds that:

1. The more popular successor of 1072 is 1080 (that is, execution passed along path B more often than along path A);
2. The more popular successor of 1080 is 1083 (that is, execution passed along D more often than along C); and
3. The more popular successor of 1084 is 1085 (that is, execution passed along D more often than along C).

The compiler 1058 determines that the dominant path is therefore 1068, 1070, 1072, 1080, 1083, 1084, 1085 through the code. The dominant path is indicated as 1088.

While the compiler 1058 was tracing the dominant path 1088, it noted that fragment 1084 was never executed all the way through (path F was never followed). Thus, 1084 is not a suitable candidate for compilation and the dominant path fragment for compilation does not include fragments 1084 or 1085.

Thus the compiled dominant path fragment includes fragments 1068, 1070, 1072, 1080 and 1083.

In any or all of the aforementioned, certain features of the present invention have been implemented using computer software. However, it will of course be clear to the skilled man that many of these features may be implemented using hardware or a combination of hardware and software. Furthermore, it will be readily understood that the functions performed by the hardware, the computer software, and such like are performed on or using electrical and like signals.

Features which relate to the storage of information may be implemented by suitable memory locations or stores. Features which relate to the processing of information may be implemented by a suitable processor or control means, either in software or in hardware or in a combination of the two.

In any or all of the aforementioned, the invention may be embodied in any, some or all of the following forms: it may be embodied in a method of operating a computer system; it may be embodied in the computer system itself; it may be embodied in a computer system when programmed with or adapted or arranged to execute the method of operating that system; and/or it may be embodied in a computer-readable storage medium having a program recorded thereon which is adapted to operate according to the method of operating the system.

As used herein throughout the term "computer system" may be interchanged for "computer", "system", "equipment", "apparatus", "machine" and like terms. The computer system may be or may include a virtual machine.

In any or all of the aforementioned, different features and aspects described above, including method and apparatus features and aspects, may be combined in any appropriate fashion.

It will be understood that the present invention(s) has been described above purely by way of example, and modifications of detail can be made within the scope of the invention.

Each feature disclosed in the description, and (where appropriate) the claims and drawings may be provided independently or in any appropriate combination.

Appendix 1

The invention relates to a method of and apparatus for examining memory in a computer system to allow a section of compiled code to be deleted, and to a method of and apparatus for deleting compiled code in a computer system. The invention finds particular (but not exclusive) application in the environment of a unified stack virtual machine in which stack walking allows compiled code to be deleted. In a preferred embodiment, the invention relates to stack walking to allow compiled code deletion in the multi-threaded environment of a unified stack virtual machine The invention applies preferably to virtual machines where compiled portions of the code being run in the virtual machine appear and need to be removed at various times in the execution of the virtual machine; for example, in a dynamically compiling virtual machine.

When executing code using a virtual machine, we have found that it is advantageous to produce a compiled version of some or all of the emulated code (see FIGS. 1–1E and associated text). We believe that it will sometimes be desirable or necessary to subsequently remove some or all of these compiled versions. Also we believe that it would be advantageous to use a single stack to support the stack requirements of both the emulated machine and also the needs of the virtual machine code itself, and to use a native call instruction to perform the equivalent of an emulated call (invoke) and use of a native return instruction to perform the equivalent of an emulated return in the code being run on the virtual machine.

Where a computer system has finished using memory which it has taken to perform a particular function we have found that it is in the interests of speed and efficiency that the used memory is returned as soon as possible for further use. Currently known techniques for virtual machines would require that one or more of the optimising techniques listed in the background information section be not taken advantage of, or require explicit checks to be used which impair the efficiency of the system.

In particular, the deletion of compiled code from a system can give rise to problems. There may be a link from a section of compiled code which is not being deleted into a section of deleted code. Particular problems can arise because of the proposed use of a native call instruction (or equivalent) to emulate a call or invoke in the virtual machine; this would typically leave the address where execution is to continue once the called method is complete (the "return address") on that stack for that thread, at or near the stack point when the call or invoke is performed. If the native call instruction is part of a compiled version of a section of code, then the return address will point into the compiled version. This causes no problems until the point of deletion of the compiled version. The return address cannot be left pointing to where the compiled version used to be. If, during execution, a thread tried to return to the address where the compiled code used to be, an error would occur and execution by that thread would usually terminate. In such an arrangement, it would be necessary to perform a check at each place where a return is about to be performed to ensure that it is safe to perform a return operation.

The present invention seeks to mitigate this and/or other problems.

The solution to these problems in a preferred embodiment of the invention is, at the point of deletion of the compiled code, to perform an examination of the virtual machine, looking for cases where a return address exists in the stacks that points to a position within the piece of compiled code to be deleted, and to re-arrange the thread's stack contents to allow seamless continuation of execution of that thread without the compiled version of the code which is about to be deleted. The mechanism is preferably arranged such that the cost of the operation is borne at the time of deletion, with little or no extra cost at normal call/return time, since the relative frequency of the two situations is such that there are many more call/return operations than code deletion operations.

Accordingly, the invention in one aspect provides a method of examining memory in a computer system to allow a section of compiled code to be deleted, the method including:

examining a frame of a stack in the computer system;

identifying whether the frame contains a return address which is in the range of addresses of the section of compiled code; and altering the contents of the frame when such a return address is identified.

By carrying out the above method, the problems associated with leaving a return address pointing into a section of compiled code to be deleted can be overcome.

In a closely related aspect of the present invention, there is provided a method of deleting compiled code in a computer system, including:

selecting a section of compiled code to be deleted;

examining a frame of a stack in the computer system;

identifying whether the frame contains a return address which is in the range of addresses of the section of compiled code;

altering the contents of the frame when such a return address is identified; and deleting the section of compiled code.

Preferably any such return address is changed to the address of a piece of continuation code. The continuation code enables execution to continue after the return without the code to be deleted. Preferably, the continuation code is arranged to transfer control to an interpreter. The continuation code may be arranged so that subsequent instructions are interpreted, for example, until a section of emulated instructions is encountered for which there is a compiled version, or alternatively, to jump to a compiled version of the code to be deleted, if such a version exists. The use of a fallback interpreter for the execution of instructions subsequent to the return allows execution of the instructions of the deleted compiled code without the overhead of creating a new compiled version of the instructions.

If the frame contains such a return address, preferably, values in the frame are changed. Preferably, values in the frame are arranged to enable execution to continue without the code to be deleted. For example, temporary register information which is stored in the frame may be changed to take into account optimisations which were made when the code to be deleted was compiled. Such changes may be required, for example, where control is to be transferred to an interpreter for subsequent execution (see FIGS. 1–1E and associated text).

Preferably the alteration of the frame is carried out at the time of deletion. Thus, none of the links and return addresses of the frame will point into the compiled code after deletion, and time consuming checks during execution can be avoided.

Preferably, a plurality of frames in the stack are examined. For example, all frames in the stack may be examined, or else, each frame which may contain a return address pointing into the section of compiled code is examined.

In a preferred embodiment of the invention, the computer system operates a multi-threaded environment. Each thread has its own stack.

Preferably, the stacks of a plurality of threads in the computer system are examined. For example, the stacks of all threads in the computer system may be examined, or else, the stack of every thread to which the code to be deleted may have had access is examined.

In this way it can be ensured that no return addresses point into the section of compiled code to be deleted.

It may be known that some threads cannot have had access to the section of compiled code to be deleted. Execution time can be saved by not examining the stacks of such threads.

For the thread of the stack being examined, however, it will often be necessary to stop the thread while the examination is carried out. Alternatively, a return barrier may be inserted to restrict the thread to certain sections of the code (see Appendix 5 in this specification).

In another aspect of the present invention, there is provided a method of deleting compiled code in a computer system, including:
examining each frame of each stack of each thread in the system;
identifying whether a return address points to a portion of compiled code which is to be deleted; and
rearranging the contents of each stack containing the return address so as to enable that thread to continue execution without that portion of the compiled code which is to be deleted.

In a further aspect of the invention, there is provided a method of deleting a section of compiled code in a computer system, the method including, examining the memory of the computer system identifying a link to the section of compiled code and altering the link.

The link to the section of compiled code is preferably a return address in a frame. Thus, the return address identified when examining a frame is preferably a return address which is in the range of addresses of the section of compiled code to be deleted.

Alternatively, or in addition, the examination of the memory may identify a patch or other jump to the compiled code to be deleted. The link may be a direct or an indirect link to the compiled code to be deleted. For example, the link may be via a section of glue code to the section of compiled code.

Preferably, the computer system is configured as a virtual machine.

In a further aspect of the present invention, there is provided an apparatus for examining memory in a computer system to allow a section of compiled code to be deleted, including:
means for examining a frame of a stack in the computer system;
means for identifying whether the frame contains a return address which is in the range of addresses of the section of code to be deleted; and
means for altering the contents of the frame.

In another aspect of the present invention there is provided apparatus for deleting compiled code in a computer system, including:
means for selecting a section of compiled code to be deleted;
means for examining a frame of a stack in the computer system;
means for identifying whether the frame contains a return address which is in the range of addresses of the section of compiled code to be deleted;
means for altering the contents of the frame; and
means for deleting the section of compiled code.

The apparatus may further include means for executing subsequent instructions, and the means for arranging the contents of the frame may be adapted to change any such return address to the address of the means for executing subsequent instructions. Preferably, the apparatus further includes a fallback interpreter. The means for executing subsequent instructions may be arranged to interpret subsequent instructions until a section of emulated instructions is encountered for which there is a compiled version.

The means for arranging the contents of the frame may be adapted to alter values in the frame to enable execution to continue without the code to be deleted, if the frame contains such a return address.

In a preferred embodiment of the invention, a record is kept of the optimisations which have been carried out in compiling code so that "clean up" information will be available as to what alterations are required to update the values to allow for the subsequent execution, for example, by the interpreter. For a computer system including the apparatus, preferably the system further includes a compiler system, the compiler system including a recorder for recording "clean up" information as the code is compiled.

The means for examining a frame in the stack may be adapted to examine a plurality of frames in the stack. The means for examining a frame in the stack may be adapted to examine the stack of each of a plurality of threads in the computer system.

The invention also provides a virtual machine including the apparatus described above.

The invention further provides a computer system including the apparatus described above.

In another aspect, the invention provides a computer system including means for deleting compiled code, further including means for examining each frame of each stack of each thread in the system, means for identifying whether a return address points to a portion of compiled code which is to be deleted, and means for rearranging the contents of each stack containing the return address so as to enable that thread to continue execution without that portion of compiled code about to be deleted.

The invention further provides a computer-readable storage medium having a programme recorded thereon for carrying out a method as described above.

The features of any of the above aspects may be provided with any other aspect, in any appropriate combination. Apparatus features may be applied to the method aspects and vice versa.

Prior to a description of a preferred embodiment, background to the preferred embodiment will first be discussed.

A virtual machine allows software which has been written for one operating system to run on another operating system; the software is then termed 'non-native' software. In order to allow the non-native software to run, the virtual machine emulates the operation of the operating system for which the software was written. This situation is illustrated in FIG. A1-1. The virtual machine 5004 translates the instructions of the non-native software 5002 into native instructions which can be run by the host operating system 5006. Conventional emulators work by interpreting the non-native instructions during execution.

Any execution path, or 'thread,' will have a stack associated with it. A stack is an area in memory that stores frames consisting of temporary register information and return addresses of subroutines. In the conventional emulator, the non-native application has its own stack (the emulator stack) separate from the stack of the host operating system.

An example of the operation of the emulator stack is shown in FIG. A1-2. Referring to that Figure, a section of non-native code 5008 has a call instruction at address aaa which calls a subroutine 5010 located at address bbb. When the emulator encounters the call instruction, the address aaa (the return address) is put onto the emulator stack 5009, together with temporary register information, and the path of execution then jumps to address bbb. At the end of the subroutine the emulator encounters a return instruction. It then takes the return address from the stack, together with the register information, and returns to the instruction following the call instruction in the main routine.

In the virtual machine of the preferred embodiment, rather than interpreting the non-native instructions, part or all of the instructions are compiled into native instructions that can run on the host operating system. Although a certain amount of time is required for the compilation, significant time savings can made when running the compiled code.

Time savings can be made in various ways. Firstly, if a section of code is to be executed more than once, then it will be more efficient to execute a compiled version. Secondly, as described above in FIGS. 1–1E and associated text, various assumptions may be made during compilation that allow optimisation of the compiled code. Thirdly, time savings can be made by using the host operating system's stack, and by using native call instructions (rather than emulated call instructions) to call subroutines.

Referring to FIG. A1-3, non-native main routine 5008 and non-native subroutine 5010 are compiled into native main routine 5012 and native subroutine 5014. Call instruction 5016 at address xxx is a native call instruction. When this call instruction is encountered, the address xxx (the return address) is put onto the host stack 5015, together with temporary register values, and the instructions in the subroutine at address yyy are picked up. When the return instruction at the end of the subroutine is encountered, the return address and register values are pulled from the host stack, and execution of the main routine resumes.

When using compiled code in the way described above, in some circumstances it may be desirable or necessary to delete certain sections of compiled code. This may be because the memory area in which the compiled code is stored is required elsewhere, or because assumptions that where made during compilation are no longer valid. Also, it is desirable to remove any code which is not expected to be required in the future, particularly when working in a limited memory environment.

A problem arises if a section of compiled code is discarded while the processor is executing a subroutine that has been called from that section of code. In this situation, a return address is left on the stack which points to a section of code that no longer exists.

According to the preferred embodiment, prior to deletion of a section of compiled code, the stack is examined frame by frame to identify any return addresses that point to the section of code to be deleted. If such a return address is identified, the address is changed to the address of a piece of continuation code referred to herein as 'glue code'. The glue code enables execution to continue without the piece of code to be deleted. This is done either by interpreting instructions in the original, non-native code until a section of code is encountered for which there is a compiled version, or by jumping to another compiled version of the code, if this exists.

A discussion of the use of glue code and the transfer of execution between compiled and non-compiled code, and between compiled and compiled code, can be found in FIGS. 1–1E and associated text.

As noted above, when a subroutine is called, temporary register information is also put onto the stack, in the same frame as the return address. Since various optimisations may have been made during the compilation of the code, this register information may only be valid if the rest of the compiled code is executed. For example, when a section of code is compiled, the compiler may have identified that not all parameters are needed in that section of code. In that case, some of the register information may have been left out, since it is not needed for executing the rest of the compiled code. However, if execution then returns to the original interpreted code, all of the parameters are needed (since the interpreter cannot look forward to see which parameters are or are not needed). Thus, it may be that missing register information needs to be added, before the interpreted version of the code can be executed.

The problem of incorrect register information could be avoided by making sure that, when a subroutine is called, all of the register information which is put on the stack is valid even if the rest of the compiled code were not executed. Alternatively, when optimisations are made which affect the register information, this fact could be recorded, together with the necessary information to allow the optimisations to be undone, should the rest of the compiled code not be executed. When a frame with a return address is identified, the glue code can then examine the optimisations which have been made, and change the register information in that frame, where necessary.

The preferred embodiment is designed to operate in a multi-threaded environment, that is, an environment in which there are two or more processors, or threads, running asynchronously but sharing the same work space. Each thread has its own stack. In the preferred embodiment, the stack of every thread to which the compiled code may have had access is examined, or simply the stack of every thread is examined.

In order to examine a stack, the thread to which that stack relates is stopped for a certain period of time. In one example, the thread is stopped while all of the frames in the stack are examined. In another example, the thread is paused for long enough to examine the most recent frame, or a predetermined number of most recent frames, on the stack. Once these frames have been examined, a 'return barrier' is inserted into the stack, in the way described in Appendix 5 of this specification. The thread can then be allowed to continue execution for as long as the stack stays above the return barrier.

Referring to FIG. A1-4, operation of a preferred embodiment will now be described.

In step 5020 it is decided that a certain code buffer is to be deleted. A code buffer is an area in memory that stores compiled code. In step 5022 a thread is selected whose stack is to be examined. In step 5024 that thread is stopped. Optionally, in step 5026, a return barrier is inserted into the stack, and operation of the thread allowed to continue for as long as the stack stays above the return barrier.

In step 5028 a frame on the stack is selected. The first frame to be examined will typically be the youngest frame on the stack. In step 5030 the selected frame is examined to see whether it contains a return address in the buffer that is to be deleted.

If it is found that there is such a return address, then in step 5032 the fragment within the buffer that the return thread points to is identified. In step 5034 the other frame fields are adjusted to 'clean up' any optimisations of local variable values, or of variables specific to the virtual machine, that may have been made. In step 5036 the return address is changed to point to a piece of glue code.

If the frame contains no return address into the buffer to be deleted, or once the values in the frame have been adjusted, then in step 5038 it is determined whether all frames in the stack have been examined. If not, then in step 5040 the next youngest frame in the stack is selected, and that frame is examined. Once all of the frames in the stack have been examined, then in step 5042 the thread is restarted, or the return barrier is removed. In step 5044 it is determined whether the stacks of all threads have been examined. If not, then another thread whose stack has not been examined is selected and the process is repeated.

Once all of the frames in all of the stacks in all of the threads have been examined and the appropriate changes to the stack contents have been made, then in step 5046 the code buffer is deleted.

Referring now to FIG. A1-5, apparatus for putting the present embodiment into effect will be described.

FIG. A1-5 shows a computer system including a virtual machine 5050 which allows non-native code 5052 to run on host computer 5054. The virtual machine includes control means 5056, interpreter 5058 which interprets non-native application code, compiler 5060 which compiles sections of non-native application code, and 'stack walker' 5062. The host computer includes a processor 5064 and memory 5068. In FIG. A1-5 a single processor is shown which executes several threads simultaneously by appropriate division of its time between the various threads, but two or more processors could be provided, each executing one or more threads.

Compiled code 5070 which has been compiled by compiler 5060 is stored in memory 5068. Also located in memory 5068 are a number of stacks 5072, 5073, 5074 corresponding to the number of threads that are being executed by the processor 5064.

In operation, the control means 5056 may decide at a certain time that a section of compiled code 5070 should be deleted, for example to allow this area of memory to be used for other purposes. The control means then indicates to stack walker 5062 that this section of code is to be deleted. The stack walker pauses operation of each thread in turn, and examines the frames in the stacks of the threads to identify any frames which contain return addresses which are in the area of memory containing the section of code to be deleted. Any such addresses are changed to the address of a piece of glue code 5076, and other fields in the frame are adjusted to 'clean up' any optimisations of local variable values, or of variables specific to the virtual machine, that may have been made. The glue code operates in the way described above with reference to FIG. A1-4. Once all of the frames in all of the stacks in all of the threads have been examined and the appropriate changes to the stack contents have been made, the stack walker 5062 indicates to the control means 5056 that the section of code may be deleted. The control means 5056 then controls deletion means 5078 to delete the section of compiled code 5070.

In summary, at code deletion time, each thread in the virtual machine is paused in turn, and the stacks of these threads are scanned, looking for return address values which point at code which is to be deleted. Once one of these cases is found, the state of the stack around the return address value is adjusted to "clean up" the virtual machine state for that thread at the point where the return is encountered (i.e., some time in the future for that thread), and the return address value itself is adjusted to cause the flow of execution to transition to one of a small number of central pieces of code. These centralised pieces of code (termed "glue code") perform some generalised checks and cause the continuation of the flow of execution for that thread in the appropriate manner; usually this will involve interpretation of subsequent emulated instructions until a section of emulated instructions is encountered for which there is a compiled version.

In any or all of the aforementioned, certain features of the present invention have been implemented using computer software. However, it will of course be clear to the skilled man that any of these features may be implemented using hardware or a combination of hardware and software. Furthermore, it will be readily understood that the functions performed by the hardware, the computer software, and such like are performed on or using electrical and like signals.

Features which relate to the storage of information may be implemented by suitable memory locations or stores. Features that relate to the processing of information may be implemented by a suitable processor or control means, either in software or in hardware or in a combination of the two.

In any or all of the aforementioned, the invention may be embodied in any, some, or all of the following forms: it may be embodied in a method of operating a computer system; it may be embodied in the computer system itself; it may be embodied in a computer system when programmed with or adapted or arranged to execute the method of operating that system; and/or it may be embodied in a computer-readable storage medium having a program recorded thereon which is adapted to operate according to the method of operating the system.

As used herein throughout the term 'computer system' may be interchanged for 'computer,' 'system,' 'equipment,' 'apparatus,' 'machine,' and like terms. The computer system may be or may include a virtual machine.

In any or all of the aforementioned, different features and aspects described above, including method and apparatus features and aspects, may be combined in any appropriate fashion.

It will be understood that the present invention(s) has been described above purely by way of example, and modifications of detail can be made within the scope of the invention.

Each feature disclosed in the description, and (where appropriate) the claims and drawings may be provided independently or in any appropriate combination.

Appendix 2

The present invention relates to a computer system and to a method of operating a computer system. Preferably, the invention relates to the management of memory in a computer system, and in particular to the management of cache memory in a computer system. In a preferred embodiment, the invention relates to outliers for spatial separation of infrequent code etc.

In a computer system there are various levels of cache memory. It is of benefit to the system, in terms of improved efficiency and therefore speed, if the caches themselves can be operated efficiently. It has been appreciated pursuant to the present invention that it would be advantageous to have code which is likely to be executed frequently located in the caches and in particular in the fastest cache. In the embodiment of the invention described below, Java code is compiled for faster execution at run-time using a dynamic compiler. In order to improve cache density of useful code (density), as one of the aims of the invention, it would be beneficial to have in the fastest of the caches the compiled code that the dynamic compiler has produced.

Prior art solutions do not maximise the density of cache memory. For example, as is discussed in more detail below, it has been appreciated that the fast caches of prior art systems are often occupied by large amounts of infrequently accessed code reducing the density of frequently accessed code in the cache which may lead to more cache misses. The present invention seeks to mitigate this and/or other problems.

According to a first aspect of the present invention, there is provided a computer system including a compiler, the compiler being arranged to compile dominant path fragments of code.

A dominant path represents a frequently executed path of execution through the code and may include a large number of individual blocks of code. By arranging for the dominant path to be compiled (and preferably only the dominant path to be compiled), the density of useful code in the compiled version of the code is increased since the compiled version includes only code which is executed frequently. Thus the density of useful code in the cache can be increased.

By arranging for the dominant path to be compiled, it is possible to arrange for blocks of code including the most frequently executed paths through the code to be more likely to be stored in the cache, and more likely to be stored in the same (L1) cache as other blocks of the dominant path code. Thus the run-time execution of the dominant path can be faster.

Preferably, the system further includes an execution history recorder for recording information about the dominant path. Preferably, an on-line record of the dominant path is made during the execution run. Preferably, therefore, the system includes means for determining the dominant path fragment during the execution of the code.

Preferably, the system further includes a compiler for compiling code and, preferably, the compiler is arranged to compile a dominant path fragment. Preferably, the compiler is an on-line compiler. Preferably, the dominant path fragment does not include infrequently executed code. Thus, if the dominant path fragments of code are arranged separately from infrequently executed fragments of code, management of the memory of the system can be improved.

Further discussion of preferred features in the compilation of the dominant path can be found in FIGS. 1–1E and associated text.

Preferably, the system further includes an outlier for use where a path of execution leaves the dominant path.

According to a second aspect of the invention, there is provided a computer system including outliers for use in the execution of infrequently executed code.

Where the path of execution would leave the dominant path, for example, due to a conditional transfer to a non-dominant location of the code or due to an exception condition being detected, control is passed to the outlier. Preferably the outlier is in the same code buffer as the fragment of dominant path from which control is transferred.

The dominant path is a 'best guess' of the likely path of execution through the code based on current behaviour. It will sometimes prove to be inapplicable for a particular execution of the code. The outliers are used to deal with the situation.

Preferably, the system further includes an interpreter. Preferably, the interpreter is used to execute at least some of the infrequently executed code. Preferably, the system further includes a converter for converting between the execution of compiled code and non-compiled code. The converter preferably includes outliers.

Where the execution has left the dominant path due to a conditional transfer, preferably, the outlier is adapted to effect transfer of control to the interpreter.

Where execution has left the dominant path due to an exception being encountered, preferably, the outlier is adapted to transfer control to an exception handler.

Preferably, the outlier is adapted to update states before execution of infrequently executed code. For example, where control is being passed to the new non-dominant path, which is typically interpreted until that new section warrants compilation, the updating may be required, for example, where optimisations have been used in the compilation of the dominant path code.

Preferably, the code includes a conditional branch to the outlier, the conditional branch including a conditional test and being such that execution follows the dominant path if the conditional test fails. Processors often predict that forward branches will fail and will carry out various checks before the branch is carried out. If the condition of the branch occurs rarely so that usually the execution falls through (in the dominant path), when the code for the condition is compiled, the code is arranged so that if the condition is true, the control passes to the outlier. Thus the forward branch occurs only rarely and thus the processor checks are only carried out on the rarely executed jump to the outlier. Thus, processor time can be reduced because the condition is usually not true and the execution simply drops through to follow the dominant path.

Preferably, the system includes means for separating frequently executed code from infrequently executed code.

That is a particular important feature of the present invention which may be provided independently, thus the invention further provides a computer system including means for separating frequently executed code and infrequently executed code.

By separating the frequently executed code from the infrequently executed code, it is made possible for memory of the system to be managed more efficiently. For example, it makes it possible to arrange for less of the infrequently executed code to be pulled into the cache. That can give improved execution speed of the frequently executed code at runtime by reducing the cache misses. The means for separating the code may be provided by a compiler which compiles the code in a particular way as described in more detail below. The separation may be effected by arranging that certain types of code are stored in one memory area and other types of code are stored in a different memory location.

Preferably, the system further includes an outlier, and means for separating dominant path fragments from the outlier.

Thus the system preferably includes means for storing the frequently executed code in a first memory region and means for storing infrequently executed code in a second memory region. Preferably, the system includes means for storing the dominant path fragments in a first memory region and means for storing outliers in a second memory region. Preferably, the first memory region and the second memory region are regions of a code buffer.

Preferably the frequently executed code and infrequently executed code are generated in different areas of the code buffer. For example, the system may include means for storing the infrequently executed code "backwards" in the buffer. Preferably, the system includes means for storing the dominant path fragments and the outlier at opposite ends of the code buffer.

By storing the code in that way, it is possible to arrange the code so that frequently executed code is likely to be drawn into a code cache while infrequently executed code is unlikely to be pulled into the cache. Therefore, preferably the code is stored so that infrequently executed code is unlikely to be pulled into a cache.

That is a particularly important feature of the present invention, and can be provided independently. Thus the invention further provides a computer system including a code cache, the system being arranged so that infrequently executed code is unlikely to be stored in the cache.

Preferably, in the compilation of the dominant path, the frequently executed code includes the compiled dominant path fragments. Those fragments are preferably generated forwards in the code buffer. The outliers are preferably generated backwards in the code buffer, thus spatially separated from the dominant path fragments. Thus the memory occupied by the outliers in the code buffer can be much less than a compiled version of the original portion of infrequently executed code fragment of the uncompiled code.

The present invention further provides a computer system including means for storing substantially all of (and preferably only) the dominant path compiled code together in one memory region. Preferably, the system further includes means for storing code for dealing with the non-dominant cases in spatially separate regions.

The present invention also provides a method of operating a computer system, the method including compiling dominant path fragments of code. Preferably, the method includes determining the dominant path during the execution of the code.

Preferably, an outlier is used when a path of execution leaves the dominant path, and preferably the outlier effects transfer of control to the interpreter and/or to an exception handler.

Preferably, the outlier updates states before execution of infrequently executed code.

Preferably, where the code includes a conditional branch to the outlier, the conditional branch includes a conditional test such that execution follows the dominant path if the conditional test fails.

Preferably the method includes separating frequently executed code from infrequently executed code.

Also provided by the invention is a method of operating a computer system, including separating frequently executed code and infrequently executed code.

Preferably, the method includes separating dominant path fragments from outliers and preferably storing the dominant path fragments in a first memory region and storing outliers in a second memory region. Preferably, the first memory region and the second memory region are regions of a code buffer. Preferably the method includes storing the dominant path fragments and the outliers at opposite ends of the code buffer.

Preferably the method includes storing the code so that infrequently executed code is unlikely to be pulled into a cache.

The invention also provides a method of storing code in a computer system including a code cache, the method being such that infrequently executed code is unlikely to be stored in the cache.

According to the present invention, there is further provided a method of operating a computer system including the steps of: compiling dominant path code, and storing the compiled code in one memory region. Preferably, the method includes storing outliers in a separate memory region.

Also provided by the invention is a method of compiling code, the compilation being effected so that frequently executed code is separate from outliers.

The invention also provides code stored in a computer system by a method described herein and provides a compiler for compiling code in accordance with the invention.

The invention further provides a computer-readable storage medium having a programme recorded thereon for carrying out a method according to the invention.

The invention also provides a computer-readable storage medium having a programme recorded thereon for compiling code, the compilation being effected so that frequently executed code is separate from outliers.

The invention further provides a computer programmed according to a method as aforesaid.

The invention also provides a computer programmed for compiling code, the compilation being effected so that frequently executed code is separate from outliers.

Accordingly, the invention provides a computer system including means for storing substantially all of (and preferably only) the dominant path compiled code together in one memory region, whilst, preferably, any outlier is only stored in spatially separate regions. Such a memory layout typically maximises the amount of useful code loaded into the cache.

The invention also provides a method of operating a computer system including the steps of: compiling all of the dominant path code; and storing substantially all of the compiled code in one memory region, while preferably storing outliers in a separate region.

An 'outlier' is so called since it lies out of the normal memory region for predominantly executed code. In this way the infrequent, by which may be meant the non-dominant path, code is separated from the more frequently used dominant path code, and so does not get loaded into the cache as long as the dominant path is executing.

Any, some or all of the features of any aspect of the invention may be applied to any other aspect.

The following considerations apply to any and all the inventions and aspects of the inventions described above.

FIG. A2-1 shows a section of Java bytecode including blocks B1, B2, B3, B4 and B5 which carry out calculations 1, 2, 3, 4 and 5, respectively. B4 is code which deals with exceptions which may occur in B1, B2 or B3 (see paths 9000, 9002 and 9004 to B4). The dominant path through the blocks is found to be such that control (almost) always passes from B1 to B3 (path 9006) at the conditional transfer of control at the end of B1, and B3 passes control to B5 (path 9008). The paths 9000, 9002 and 9004 are hardly ever taken.

An outline of the original Java source for the example of FIG. A2-1 is

```
void method () {
    try {
        calculations 1        // calculations 1 and if (condition)
        if (condition) {          translates to block B1
            calculations 2    // calculations 2 translates to block B2
        }
        calculations 3        // translates to block B3
                              and a jump to B5
    }
}
catch () {
    calculations 4            // translates to block B4
}
calculations 5                // translates to block B5
}
```

Suppose that predominantly the condition is false, and none of the calculations 1, 2 or 3 encountered an exception which would be caught by the catch clause (block B4). Therefore, the useful code based on this dynamic behaviour consists solely of blocks B1, B3 and B5.

Standard compilation techniques for this code (especially in the case of compilation at runtime) would be to emit code for all five blocks, to allow for all eventualities in the subsequent execution of the compiled code. Thus the compiled versions of B2 and B4 potentially waste memory space, and as detailed below can lead to reduced cache density of useful code compared to preferred embodiments. If many such methods are compiled in this standard manner, the wider range of address space used to encompass the compiled code can lead to control transfers crossing address space page boundaries more frequently, with ensuing higher frequency of page faults (if virtual memory is enabled on the computer system), compared to preferred embodiments.

As a program runs, the processor picks up instructions from the memory. When the instructions for the program run over the end of a page, the memory manager must be interrogated to find and check the next page if that next page is not in main memory. That is time consuming. Crossing a page boundary is therefore time consuming.

A standard compilation of the code is shown in FIG. A2-2. Blocks B1, B2, B3, B4 and B5 are set out sequentially.

FIG. A2-3 shows compiled code according to a preferred embodiment. Note that the dominant path includes blocks B1, B3 and B5.

The compilation of the code has inverted the logic of the condition test in block B1, so that the predicted fall through case is to block B3, and the unpredicted flow of control is to an outlier OL1. Note that the code for the blocks B1 and B3 are spatially contiguous despite not being contiguous at the source and bytecode levels. This is advantageous to modern processors with branch prediction hardware. Note also that this contiguity by definition occupies a smaller range of the memory address space than if block B2 had been inserted in between.

Blocks B2 and B4 do not exist in the compiled versions of the code because they were found not to be a part of the dominant path.

B5 is also spatially contiguous with block B3, and the original unconditional control transfer present in the bytecode for jumping over the exception handler B4 requires no corresponding host instruction. Block B3 simply drops though into block B5 in terms of control flow. Thus blocks B1, B3 and B5 are spatially contiguous, and hence occupy a smaller range of the memory address space in total than if they were interspersed with blocks B2 and B4. These blocks (B1, B3 and B5) have been packed to model the current execution characteristics of the Java method.

When B1 first receives control, requiring loading of a cache line into the processor, better cache density ensues in the immediately affected cache line. Code infrequently executed (in blocks B2 and B4) does not get pulled into the cache.

Now consider several methods (or dominant paths thereof) compiled in a similar manner, and into a given code buffer. As these pass control amongst each other, the cache perturbations will be reduced by having a greater cache density of useful code. Low cache density can lead more frequently to cache-collisions and cache-misses. Also, with computer systems employing virtual memory, preferred embodiments can give a reduction in page faults, as a consequence of the reduction in address space usage for frequently executable code. A page fault occurs when the processor tries to execute an instruction which is not in memory. When a page fault occurs, the page in which the instructions to be executed are located are loaded into memory from the permanent storage device that is being used for the virtual memory. This is a time consuming operation which slows down the speed of execution.

FIG. A2-3 shows outliers OL1 and OL2 for use if the execution leaves the dominant path. If the conditional test passes at the end of B1, control will pass to OL1. OL1 synchronises states (that is, ensures that register-cached values are spilt back to their corresponding memory locations) and then passes control to 2 piece of glue code to effect resumption of the unpredicted (non-dominant) path corresponding to calculations 2 via a fall back interpreter. Until such time as the corresponding bytecodes of the non-dominant path execute frequently enough to warrant dynamic compilation, these continue to be interpreted, thus saving space in the code buffers (which are limited resources) for more important paths of bytecode execution. Thus outliers of the type of OL1 handle the case where normal control flow takes an unpredicted path away from the dominant path, such as needing to execute calculations 2.

An example of code of an outlier such as OL1 is as follows:

```
a = r_n            // update states and restore memory locations for a, b, c
b = r_m
c = r_s
callglue (3000)    // calls the glue code and tells it to interpret uncompiled
                      code from bytecode address 3000
```

The interpreter will start execution at the beginning of block B2. If the bytecode at 3000 is executed enough, it will later be compiled. The next time the glue is told to interpret from 3000, it will recognise that there is a compiled version of B2. It will amend the 'callglue' line of OL1 (automatically) to 'goto . . . ' to direct control to the compiled version. This is known as "patching" (see Appendix 4 of this specification). Thus, the next time the outlier OL1 is called, the control will be transferred directly to B2, without the glue being used. (See also FIGS. 1–1E and associated text).

A different type of outlier OL2, deals with the situation in which an exception condition is recognised within the dominant path (for example, block B1 attempts to access an array outside of its legal bounds). The dominant path passes control to an outlier (OL2) to deal with the exception. Here, the outlier synchronises state as usual, and then passes control to the glue code to raise the exception within the virtual machine.

An example of code of an outlier such as OL2 is as follows:

| | |
|---|---|
| a = $r_n$ | // update states, restore memory locations for a, b and c |
| b = $r_m$ | |
| c = $r_s$ | |
| callglue raise exception X | // tell glue to transfer control to an execution handler for dealing with an exception of type X |

Further discussion of the use of glue code and the transfer of control to the interpreter can be found in FIGS. 1–1E and associated text.

Only two outliers have been shown in FIG. A2-3 for clarity. In practice, separate outliers would be provided to deal with each exception and each deviation from the dominant path which could occur.

Outliers are spatially far separated from those blocks of code corresponding to their associated dominant paths. A given compilation produces a set of blocks for the dominant path and another set of blocks of outliers used by the dominant path when unpredicted or exceptional behaviour is encountered during execution.

FIG. A2-4 shows the blocks of compiled code and the outliers filled into a code buffer 9054. The dominant path blocks are filled into the buffer in the direction 9056 and the outliers are filled in the direction 9058. The dominant path blocks occupy one end of the code buffer, and its outliers the other end. Each compilation of a new fragment of code produces new sets of dominant path blocks and outliers and the code buffer is laid out so that the outliers and dominant path blocks grow towards each other. Hence it can be seen that in the normal course of execution, where outliers are not executed, their presence is transparent in the system with respect to the processor cache behaviour. Thus maximum cache density of useful code, and maximum address space density of useful code is possible.

The code buffer is managed by the compiler manager which indicates where the pointers are at the high memory and low memory ends of the buffer. As the compiled code is generated for a block, the compiled version of the block will be entered in the buffer, followed by the block of code for the outlier(s). The code for the outlier is then moved to the opposite end of the buffer. Thus the dominant path blocks and outlier blocks fill the buffer from separate ends. This improves cache density and reduces paging problems.

In an alternative embodiment, the blocks of dominant path code and outliers can be filled from the same end of the buffer, but in blocks for each fragment of code. In the example above, the buffer would include (in order) B1, B3, B5, OL1, OL2, OL3 . . . The next fragment to be compiled would also lay down the code for the dominant path blocks followed by that for the outliers. That arrangement is, however, less preferred since address space is being used up by the outliers and there is a greater chance that code of the outliers will be pulled into the cache.

As FIG. A2-5 of the drawings indicates, a processor chip 9200 may operate at a speed of 400 MHz and be associated with an on-board, first level memory cache 9202 of 16K. A second level cache 9204 of say 512K would be associated with the chip 9206. These are in addition to the normal RAM 9208 of perhaps 32 MB operating at a speed considerably less than the 400 MHz of the first and second level cache memories. In operation, the processor would pull instructions in from the cache a line at a time (32 bytes). By ensuring that the most frequently used code, that is, the compiled dominant path code, is stored in a separate memory region from the less frequently used code, the density of the most frequently used instructions in the cache can be increased. In the process, less frequently used instructions will also be stored together but in non-cache memory and will thus not pollute the cache.

Identification of the Frequently Executed Fragments

In order to separate the frequently executed fragments from infrequently executed fragments of a section of code, it is necessary first to identify those fragments which are frequently executed. This can be accomplished by analysing an execution run of the code and identifying the most frequently executed paths though the code (the dominant path). The dominant path can be determined from a previous run of the code. In the present embodiment of the invention, the dominant path is determined dynamically on line during a run. Detailed discussion of the determination of the dominant path can be found regarding FIGS. 1–1E and associated text. In summary, the number of times each block of code is executed is recorded by an execution history recorder. The execution history recorder notes that the block has been executed and also notes from where the control has passed into the block and also notes the successor of the block (to where the control passes from the block). From that information, the most popular successors of each block can be determined and thus the dominant path can be found.

In the case where the code is code of a Java application, the code is first translated by an interpreter. The execution history recorder is run by the interpreter and records information about the interpretation of each block. Once a block has been executed a threshold number of times by the interpreter, the interpreter passes details of the block to a queue for compilation which is managed by a compiler manager. The threshold number of times may be 5. When the compiler manager inspects the queue and takes the block for compilation, it traces the dominant path from the block using the information recorded by the execution history recorder regarding the interpretation of the block and its most popular successors. The compiler then produces a compiled version of the dominant path fragment of code as described in more detail below.

For example, for a section of non-compiled code having a general structure as that shown schematically in FIG. A2-1, a path of execution through the blocks of code is usually B1, B3, B5. When the block B1 has been executed 5 times, it is queued for compilation. The compiler traces the dominant path from B1 and finds that, although the exceptions sometimes occurred, the most popular successor of B1 was B3, and the most popular successor of B3 was B5. Thus the dominant path from B1 is B1, B3, B5. The compiler then proceeds to produce a compiled version of the dominant path.

Compilation of the Dominant Path

Full compiled versions of the infrequently executed pieces of code B2 and B4 are not prepared. In an alternative embodiment, compiled versions of the code could be prepared but compilation of those sections would take time and the compiled versions would occupy memory space and thus this alternative embodiment is not attractive where there is limited memory, for example in a virtual machine.

The fragments B1, B3, B5 are laid out sequentially (see fragments B1, B3, B5 of FIG. 3C). Optimisations are made in the compilation of the code, for example using known optimisation techniques. Exception checks are inserted at relevant positions in the compiled code, the exception checks corresponding to the checks originally in the blocks B1, B3, B5 of the non-compiled code. The exception checks each include a jump to a relevant piece of code called an outlier (OL2 is shown for the exception in B1). As indicated above, it is preferred that the outlier does not just contain a compiled version of the code B4 for handling the exceptions. The outliers include code for updating any necessary states and registers before transfer of control out of the compiled version of code.

For example, where the compiled code has been optimised, at the time of the conditional transfer corresponding to that at the end of block B1, some states may not yet have been updated at the end of block b1. Also, the compiled version of the code may hold states in different memory locations to those of the original code. The outlier OL1 updates all of the states and registers to what they would have been at the transfer of control out of the block B1 into B2. The outlier OL1 then transfers control to a conversion device which transfers control to the interpreter which then proceeds to interpret the code for B2. Once the exception has been handled, if appropriate, the control can be passed back, via the glue code, to the outlier, which reinstates the states which had been updated and execution of the compiled code can resume at block B3. See FIGS. 1–1E and associated text for a further discussion of the role of the conversion device and the glue code.

It will be appreciated that, in most cases, an exception will not occur and the execution will simply pass through the blocks B1, B3, B5.

As indicated above, the compiled code is generated in the code buffer forwards and the outliers are generated in the code buffer backwards so that they are spatially separated in the buffer. Thus the outliers are less likely to be pulled into a cache. Although the execution of the exceptions (via the outliers) might be slower than for the case where the infrequently executed code was cached with the dominant path code, that decrease in speed is more than compensated for by the increased speed of execution of the dominant path, especially where the infrequently executed code is very rarely executed.

Apparatus for carrying out the method of the present invention is shown schematically in FIG. A2-6. The apparatus includes an interpreter 9300 for interpreting code. An execution history recorder 9302 records details of the execution of the code by the interpreter 9300. When a block is executed the predetermined number of times, the execution history recorder 9302 notifies the compiler manager 9304 which administers a queue of blocks for compilation. The compiler 9306 consults the queue and takes blocks for compilation, determines the dominant path from the records of the execution history recorder 9302 and compiles the dominant path fragment and prepares any necessary outliers for the fragment. The compiled fragments are loaded into the code buffer 9308. The dominant path fragments are loaded forwards in the buffer 9308 and the outliers are loaded backwards in the buffer 9308. At some time, lines of the compiled code in the buffer 9308 are pulled into the cache 9310. Compiled code is executed from the buffer 9308 or from the cache 9310 by the execution device 9312. If an exception is encountered which cannot be handled by the dominant path code, the outlier 9314 updates any necessary states and transfers to the glue code 9316 which transfers control to the interpreter 9300 which proceeds to interpret code for the handling of the exception.

In any or all of the aforementioned, certain features of the present invention have been implemented using computer software. However, it will of course be clear to the skilled man that any of these features may be implemented using hardware or a combination of hardware and software. Furthermore, it will be readily understood that the functions performed by the hardware, the computer software, and such like are performed on or using electrical and like signals.

Features which relate to the storage of information may be implemented by suitable memory locations or stores. Features which relate to the processing of information may be implemented by a suitable processor or control means, either in software or in hardware or in a combination of the two.

In any or all of the aforementioned, the invention may be embodied in any, some or all of the following forms: it may be embodied in a method of operating a computer system; it may be embodied in the computer system itself; it may be embodied in a computer system when programmed with of adapted or arranged to execute the method of operating that system; and/or it may be embodied in a computer-readable storage medium having a program recorded thereon which is adapted to operate according to the method of operating the system.

As used herein throughout the term 'computer system' may be interchanged for 'computer,' 'system,' 'equipment,' 'apparatus,' 'machine' and like terms. The computer system may be or may include a virtual machine.

In any or all of the aforementioned, different features and aspects described above, including method and apparatus features and aspects, may be combined in any appropriate fashion.

It will be understood that the present invention(s) has been described above purely by way of example, and modifications of detail can be made within the scope of the invention.

Each feature disclosed in the description, and (where appropriate) the claims and drawings may be provided independently or in any appropriate combination.

Appendix 3

The present invention relates to computer systems and to methods of operating computer systems. In particular, the invention preferably relates to a computer system including a compiler for compiling code and to a method of compiling code in a computer system. Preferably the invention relates to computer systems running interpreted languages, for example Java. The invention preferably relates to object-oriented programs (preferably Java). In a preferred embodiment, the invention relates to pre-exception condition checks.

In order to avoid problems arising during the course of a program or method execution in an object-oriented program such as Java, safety systems are normally built in which will detect an impermissible situation and throw an error and/or an exception. The system will usually respond to the exception condition being detected and will cease execution in the area where the exception has been detected. In some such systems, an exception handler will be invoked in order to handle the exception, for example to close down an illegal operation, before allowing the execution to continue.

Java throws both errors and exceptions. For simplicity, these will be referred to herein as 'exceptions'. It should be understood that the term 'exception' used herein is to be interpreted broadly to include, for example run-time errors, exceptions and other occurrences that occur in the Java language and/or in other languages, unless clear from the context otherwise.

Java is a language which is rich in exceptions. Java also has various mechanisms for dealing with exceptions when they occur.

For example, a section of code may include the term 'y=i/z'. If, when the code is executed, z=0, a 'divide by zero' exception is thrown. When compiled, the method containing the possible exception is marked to throw an exception.

If a method is invoked in Java which has declared itself to throw an exception, then the Java compiler requires that any method which invokes that method also to declare an exception or to provide an exception handler to deal with the exception. Thus the exception can ripple up the call chain until it is either caught and dealt with by an exception handler or falls off the end of the chain. This will be well understood by those familiar with the Java language who will also appreciate that there are essentially two types of exceptions in Java, namely 'checked' and 'unchecked'.

A 'checked' exception will either be 'caught' or 'thrown'. Indeed the compiler will force a checked exception to be caught or thrown. In contrast, an 'unchecked' exception is more like a runtime error, such as divide-by-zero, and neither Java nor C++ forces declaration of a throw.

Consider the situation where a stack is formed in which a particular exception, such as divide-by-zero, is declared in the uppermost, or oldest, frame a whilst the most recent frames b, c, d and so on are regarded as being added in sequence below frame a. If the exception is encountered in frame d, the evaluation stack for that frame is cleared, the VM creates an exception object and a reference to it will be placed on the evaluation stack of the frame with a matching handler.

The object reference indicates the type of exception and goes to a table for instructions (assuming there are any for that exception) on how the exception is to be handled. For example, the table might indicate that if the exception occurs in any of lines 1–20, it will be handled in line 21.

When the exception in d is encountered, first frame d is searched for the handler but, since the exception is declared in frame a it clearly will not be found so frame d is wiped and the search continues in frame c. The same situation obtains in c, so the search continues backwards, wiping each of d, c and b in turn, until frame a is reached where the handler can be located. It should be emphasised that only local variables are stored in the wiped frames, so there is no loss of valuable information; all global variables (called arrays, objects, static fields in Java) and objects created in other programming languages (for example) remain stored in the heap.

Java is a language rich in exceptions. Java state must be written to as dictated by the semantics of the Java program.

When the Java program is compiled, however, it is possible to make various optimisations. One such optimisation might be possible in the case where the fragment of code to be compiled includes a loop. It is desirable to move any loop invariable operations outside the loop to make execution at run-time more efficient. However, that can give rise to difficulties where an exception may occur within the loop. Thus, in the following simple example, one cannot update "x" before the array access is executed, in case the array access "arr[i]" raises an "index out of bounds" exception. If the write to "x" was incorrectly moved before the access, and an exception did occur, we would now have an incorrect value for "x".

```
x = . . . ;
b = 10
for (int i=a; i<b; i++) {
    arr[i]++;
    x = b
}
```

Standard code-motion optimisations, such as loop invariance, are thus blocked in the presence of such exceptions, which act as barriers across which code cannot be moved.

In the above example, "x" is being written with a loop-invariant value (10). In the presence of the potential exception, we cannot move the write outside of the loop. If "a" did not fall within the range of allowable index values for the array "arr", then the first access to "arr[i]" would raise an exception and "x" would have the same value extant at entry to the loop, and not the value 10. Moreover, the exception check itself executes within the loop body, hence incurring its own execution penalty.

If optimisations are to be made in the case of the compilation of the code of the above example, it would be necessary to carry out an analysis to prove that 'i' could never fall outside the range of allowable index values. If that can be proved, then the write to x could be safely moved outside the loop. In order to prove the necessary conditions, complex analysis of the code would be required. In some cases local analysis might be sufficient, for example where it can be shown from an analysis of a basic block of a single method that the exception would not occur. In most cases, however, it will be necessary to look at several blocks, for example back to the block in which the array was created to be able to make the proof. In that case, global data flow analysis (the analysis of an entire single method) or inter-procedural analysis (the analysis of the entire program or class) would be required. Clearly, such analysis is time consuming and costly in memory usage and could really only be contemplated for use in off-line compilation. In any case, if it is found as a result of the detailed analysis that the exception might occur, optimisation would in any case not be possible. Thus, such analysis is rarely done in practice at runtime on limited memory systems and optimisations of code in which exceptions may occur are usually not attempted.

Another example involves an exception condition covering the situation where a point may be reached in a division step where the denominator equals zero.

This example involves division of a variable x by another variable i. There may be certain circumstances where i becomes zero, leading to division by zero, a non-calculable function, such as follows:

```
int x=p;
b=10;
for (int i=a; i<b;i++){
    x=x/i;
    y=b;
}
```

It is not advisable to throw the exception too early for fear that the program loop may have executed something which is of value. It is not impossible for a loop including a possible exception to be circulated a large number of times (perhaps on average 10 times) before the exception is raised.

Thus, while it would be desirable to remove the loop invariant term out of the loop to save time at run-time in the repeated execution of the loop, it would not be safe to move the term out of the loop without having carried out detailed analysis.

The present invention seeks to mitigate this and/or other problems.

According to the invention, there is provided a method of compiling a fragment of code including a possible exception, the method including the step of including a pre-exception condition check.

The pre-exception condition check is preferably included in the compiled version of the fragment of code. By using a pre-exception condition check, it can be determined early on before the code which might raise an exception is executed, whether an exception will occur. If the check shows that no exception will occur, it will then be safe to execute the code including the exception.

It will be understood that the pre-exception condition check will preferably be included immediately before the body of the fragment of code in which the exception might occur. Thus, code other than the pre-exception check can be optimised. Preferably, the condition check is included at the beginning of the compiled fragment. That is especially preferred where the fragment contains a loop.

Preferably, the fragment of code is compiled on the assumption that the exception will not occur. When the pre-exception check is used, if the check is passed it is known that the exception will not occur. Thus optimisations may be made which would not have been safe to make if it were not known whether or not the exception would occur. Thus the compiled code can be more efficient, both in terms of the increased speed in executing the code as well as being more compact, thus occupying less memory space.

Preferably, the method includes providing a bailout device for use if the condition check determines that an exception will occur. In many cases, the pre-exception condition check will determine that no exception will occur and execution of the compiled code can proceed. However, in some cases, an exception will occur and the condition check will determine that an exception condition is imminent. The bailout device preferably allows the exception to be encountered in the interpreter at the expected point of execution.

Preferably, if the original code fragment included code for dealing with the exception, that code is not included in the compiled version as a part of the optimisation procedure. In any case, the code is preferably compiled so as not to be cluttered with code for use in the further detection and handling of exceptions which occur infrequently. Rather than the code for dealing with exceptions being compiled, therefore, preferably an interpreter is used to interpret uncompiled code for handling the exception. Preferably, the bailout device is arranged to pass control to an interpreter. The control is forced to pass to the interpreter because, since there is a compiled version of the code, the interpreter would normally not be used for execution of that code.

Thus, in effect, the compiled version of the code is preferably prepared only for use when the exception does not occur and is compiled so as to optimise the compiled code for that situation. Where the exception does occur, the compiled code is preferably not used and the interpreter is used to execute up to the point of detecting the condition, and raising the exception. It would be possible to provide two versions of the compiled code: one for use in the case where the exception occurred and one for use where the exception did not occur, each version of code being optimised for the relevant situation. In many cases however, that would be undesirable, especially where the system was one having limited memory (for example a VM). The compiled version of the code for use where an exception occurred would be infrequently used and would clutter up the memory allocated for compiled versions of code.

Where the compiled code has been optimised, it is possible that the condition of states, (for example the values of integer variables and the register states) when the condition check reveals that the exception will occur, is not the same as for the corresponding uncompiled code. Preferably, the bailout device includes an outlier for updating states.

Preferably, the fragment is a dominant path fragment of code. Preferably, at least part of the code forms a loop. In particular where the memory available is limited, as in a virtual machine, it is highly preferable not to compile code which is infrequently executed. Preferably, the method also includes the step of determining a dominant path through the code. Preferably, infrequently executed code, for example non-dominant path fragments of code are not compiled. Preferably, the compiler compiles only dominant path fragments of code.

According to the invention there is further provided the use of a pre-exception condition check in compiled code.

The invention also provides a compiler for compiling code according to the method described above.

Also provided by the invention is an apparatus for compiling a fragment of code including a possible exception, the apparatus including means for including a pre-exception condition check.

The apparatus is preferably a part of a computer system, preferably a virtual machine. The invention relates in particular to interpreted languages, and has particular relevance to Java.

Preferably, the compiler is arranged to include the condition check at the beginning of the compiled fragment and preferably the compiler is arranged to compile the fragment of code on the assumption that the exception will not occur. This is of particular relevance where the fragment includes a loop.

Preferably, the apparatus includes a bailout device for use if the condition check determines that an exception will occur. The bailout device is preferably provided on compilation by the compiler.

Preferably, the apparatus further includes an interpreter and the bailout device is arranged to pass control to the interpreter. Preferably, the interpreter is arranged to interpret the code for handling the exception.

Preferably, the bailout device includes an outlier for updating states. In particular, where control is relinquished from the execution of compiled code and, it will often be necessary to update states before the control is passed.

Preferably, the fragment is a dominant path fragment of code and preferably the compiler is arranged to compile the dominant path code. Preferably, the compiler is arranged to compile only dominant path fragments of code. Preferably the compiler is an on-line compiler. The execution time impact of the compiler and the amount of memory that it uses can be reduced if the compiler only compiles dominant path fragments of code.

The invention also provides code compiled using a method described above.

According to the invention, there is also provided code for a computer system, the code including a fragment of compiled code including a possible exception, the code further including a pre-exception condition check.

Preferably, the code further includes a bailout device for use if an exception is indicated and preferably, the bailout device includes means for forcing a transfer of control to an interpreter.

Also provided by the invention is a computer-readable storage medium having structured data recorded thereon including code as described above, and also a computer-readable storage medium having a programme recorded thereon for carrying out a method as described above.

Further provided by the invention is a computer system when programmed with a method as aforesaid, and a computer system when programmed according to a method in which a fragment of code including a possible exception is compiled, the method including a pre-exception check.

The invention aims to allow optimisations relating to code motion in the presence of exception conditions within loops, which in turn improves the execution speed of the resulting compiled fragment.

The solution is achieved by use of "pre-exception condition checks", whereby the compiled fragment contains equivalent checks placed prior to the loop entry point.

Advantageously, such a check critically relies upon the presence of the fallback interpreter. If the check detects an exception condition, then control reverts to the fallback interpreter without the possibility of re-entering the fragment at this loop entry point. The failback interpreter continues execution at the loop entry point, and hence executes up to the point where the exception is encountered at its correct control point, thus raising the exception with all Java states containing the correct values. If the pre-exception condition check passes however, then the fragment is safely usable, and any code motion optimisations are valid.

In the above example therefore, one could have moved the loop-invariant assignment of "x" out of the loop, so long as it follows the check. This allows omission of the original exception check in the loop, which also offers improved performance.

Preferably all pre-exception condition checks are effected outside any execution loops, to reduce any time penalty of execution of the checks (in particular where the loop may be repeated a large number of times).

Preferably the compiled code includes several pre-exception condition checks, to check for several possible exceptions. Such checks may be arranged as a collection of individual checks, or may include a single check which determines whether any of a number of exception conditions exists.

Preferably, the computer system includes a virtual machine. The method of the invention finds particular application in the context of a virtual machine (VM). A VM requires a small memory footprint in embedded systems, and the present invention allows the footprint of the compiled version of code in the virtual machine to be reduced.

The invention finds particular application for interpreted languages, where an interpreter may be used, and in particular the Java language. The interpreter can be used as a fall back for when an exception is indicated. If the interpreter were not present, a number of different compiled versions of code might have to be provided to deal with alternative routes through the code, for example in the presence of exceptions. Such an arrangement might reduce, or indeed cancel, any benefit in reduced memory space occupied by compiled versions of the code.

There is likely to be a balance between the number of checks which can be inserted into the compiled version of code (the checks incurring a time penalty at execution) and the benefit of reduced execution time in execution of the optimised compiled code.

The benefits of the invention may include increased safety in execution (by use of the condition checks), preferably without incurring increased execution time and memory penalties.

A further advantage of the invention is the choice of the fast (unchecked) route through the compiled fragment or the slow (exception detecting route through the fallback interpreter. The invention enables the fast route to take advantage of code motion (including exception condition checks) outside of a loop, even in the presence of exception conditions within the loop. This choice is unavailable to prior compilers which have compiled the entire method and whose compiled methods do not have the ability to interact with an interpreter to field exception conditions.

By virtue of the invention, the performance of the compiled fragment may be greatly improved due to the ability to move code out of loops. Hence greater freedom is available to the dynamic compiler in its choice and application of optimisations which are not normally available to prior compilers.

According to alternative aspects of the invention, there is provided a computer system including (preferably during the running of a program) means for compiling an exception check to identify the occurrence of an exception condition, and means for executing an exception, when identified by the exception check, in an interpreted language.

Optionally there may also be provided means for carrying out an exception check to identify the occurrence of an exception condition.

In another aspect, the invention provides a method of operating a computer system including the steps of: running a program; compiling an exception check to identify the occurrence of an imminent exception condition, and executing an exception, when identified by the exception check, in an interpreted language.

Preferably, the exception check is carried out outside a processing loop, whereby preferably to avoid the need for the exception check to be carried out at each circulation of the loop. An advantage of the invention is the choice of taking the fast (unchecked) route through the compiler or the slow (exception detecting) route through the interpreter which is not available to prior compilers off-line.

It may be possible, according to the invention, to decide outside the loop that the exception will be reached at some future point in time. When that occurs, control is passed off to the interpreter and therefore there is no necessity for the exception to be checked in each circulation of the loop.

The exception check itself is compiled but interpretation of the exception itself in the slower interpreter serves to save compilation time and, in particular, reduce memory requirements by not having multiple compiled versions of code for dealing with possible exceptions, but does not prejudice optimisation. Indeed, optimisation can be positively enabled. (In Java, exception handling is carried out a programming level.)

Any, some or all of the features of any aspects of the invention may be applied to any other aspect.

The following considerations apply to any and all the inventions and aspects of the inventions described above.

Consider the following example:

A method is called:
    invoke func (20,200)

The method func:

```
void func (int p, int a)
{
    int x=p;
    int b=10;
    int y;
    for (int i=a; i<b; i++){
        x=x/i;
        y=b;
    }
}
```

It will be seen that an exception will occur if i=0 and a divide by zero is attempted. Previously, it would not have been possible to move the loop invariant code (y=b) out of the loop because, if the exception occurred, the write to x would be affected.

When the method func is first invoked, it will be executed by the interpreter. If an exception occurs, it will be dealt with in the normal way and, because the code is being interpreted, the write to x will only occur if the exception does not occur. In accordance with a preferred aspect, if fragments of the code of the method func are executed sufficient times by the interpreter such that the fragments are considered to be dominant path fragments of the code, they are queued for compilation. A detailed discussion will be found in FIGS. 1–1E and associated text.

From that discussion, it will be seen that it is likely that the loop will be compiled first, and that the dominant path for the loop includes only the block or blocks including the loop.

As explained in FIGS. 1–1E and associated text, the repeating loop represents a third block $b_3$. The byte code (as translated by the interpreter) can be symbolised as follows (the equivalent Java instruction being indicated):

|    | Bytecode   | Java                |
|----|------------|---------------------|
| 0  | iload_1    | x=p;                |
| 1  | istore_3   |                     |
| 2  | sipush 10  | b=10;               |
| 4  | istore 5   |                     |
| 6  | iload_2    | i=a;                |
| 7  | istore 4   |                     |
| 9  | goto 21    |                     |
| 12 | iload_3    | x=x/i;              |
| 13 | iload 4    |                     |
| 15 | idiv       |                     |
| 16 | istore_3   |                     |
| 17 | iload 5    | y=b;                |
| 19 | istore 6   |                     |
| 21 | iinc 4 1   | i++;                |
| 24 | iload 4    | i<p ?. Reiterate if true |
| 26 | iload_1    |                     |
| 27 | if_icmplt 12 |                   |
| 30 | return     |                     |

Block $b_3$ is represented by lines 12 to 27 of the bytecode. When block $b_3$ has been executed sufficient times, it will be queued for compilation.

The compiler sees that there is a possible 'divide by zero' exception in the block $b_3$. A pre-exception condition check is inserted into the compiled version of the block $b_3$. In the present case, the check is inserted at the beginning of the compiled fragment. (It could, of course, be inserted at any point before the exception might occur in the compiled code. Where the exception could occur within a loop, preferably the check is inserted prior to the entry point of the loop. Often, as in the present example, the entry point of the loop will, in any case, be the start of a dominant path fragment.)

The compiler will also see that the block $b_3$ includes a loop invariant term y=b, and that an optimisation can be carried out to remove the loop invariant term from the loop.

A compiled version of block $b_3$ might be, for example, as shown in the left-hand column below (given in simplified code for clarity). An indication as to the step performed by each section of compiled code is included in the right-hand column.

| Compiled code | Step performed |
|---|---|
| cmp i, 0 | compare i with zero |
| ble glue_bailout | if i is less than or equal to 0, go to the glue code |
| load $r_a$, b | load b into the register |
| store $r_a$, y | y = b (loop invariant step) |
| load $r_n$, i | load registers for start of loop |
| load $r_m$, x |  |
| div $r_s$, $r_m$, $r_n$ | x/i and store result in register s |
| add $r_n$, 1 | i++ |
| cmp $r_n$, $r_a$ | i<b |
| blt | if i<b, repeat the loop (from div $r_s$, $r_m$, $r_n$) |

The first two lines of the compiled code above include the pre-exception condition check. If i is greater than zero, the check passes and the remainder of the compiled code is executed (from the third line). If i is less than or equal to 0, the second line of code transfers the execution to the glue code of the bailout device as described below. The remainder of the compiled block $b_3$ is not then executed. Note that the interpreter then interprets the loop from the start of the loop body, through to the point where an exception is detected. Thus the check in the compiled code is giving an early warning of an imminent exception rather than an immediate one. In some case this can reduce the number of steps carried out in the compiled code which have to be "undone" before control is transferred to the interpreter.

It will be seen that various optimisations have been made in the compiled version of the loop. In particular, the loop invariant term y=b has been moved outside the loop. That would not have been safe to do if there had not been a pre-exception condition check present.

The above example has been simplified. In practice there may also be an 'index out of bounds' pre-exception condition check (either before or after the i is less than or equal to 0 check), for the situation where i is out of bounds for the execution of the loop. Thus, each section of compiled code may have several pre-exception condition checks. Examples of types of pre-exception condition checks are discussed below.

For a detailed discussion of the execution of code including compiled and non-compiled fragments see FIGS. 1–1E and associated text and Appendix 2 of this specification. A summary of some of the steps is given here for the above example in the case in which the condition check determines that there is an exception condition.

The first line of the compiled code is executed to check if i is less than or equal to 0. If it does, the second line of code directs the execution to a specific entry point of the glue code. The glue code then forces control to pass to the interpreter. The glue code tells the interpreter at which address to start to interpret code (and not to consult the code cache before executing (because the code cache will contain a reference to the compiled version and in this case the compiled version cannot be used)). The glue code indicates to the interpreter to recommence execution at the beginning of the non-compiled version of the block $b_3$ (from iload_3, see above). The interpreter sees the exception at the correct time and it is dealt with accordingly. (The interpreter cannot raise the exception too early.)

Once the interpreter has executed the fragment including the exception, the control may pass back through the glue code for the execution of a compiled version of code as discussed in FIGS. 1–1E and associated text.

Equally, where an 'index out of bounds' pre-exception condition check is inserted, if the relevant check fails, control is passed to the glue code, and to the interpreter.

A separate pre-exception condition check could be used for any exception which could occur in the code to be compiled. One pre-exception condition check could be used to check for several possible exceptions.

A suite of such pre-exception checks are available for use, including early typecast check, early bounds check against the possible range of array index values, early null-reference check, early divide by zero, and early object type check, to enable code motion and other early checks to be applied to inlined methods.

A checkcast check proves whether or not an object of a given type can be stored in a field for that type—for example, the check could answer the question whether a 'graphics' type object could be stored in a 'car' type object.

Java (and other object oriented languages) has a hierarchical structure for classes where if Class A extends a Class O and Class B extends a Class O then Class A and Class B are not related. Conversely, if Class A extends Class O and Class B extends Class A then Class B is a subclass of A and the system could use B where it uses A. Thus it will be seen that there is scope for an exception to arise where the hierarchy of objects in a section of code is not appropriate.

The checkcast condition check checks to see that the class relationship is correct and, if the checkcast check fails, control passes to the bailout device.

A bounds check, as the name implies, proves whether the array index is within the permitted limits, that is, the bounds, of the array, otherwise it refers to the bailout device (glue code) to raise the exception for the index being out of bounds. An example is given above of a situation in which an 'index out of bounds' exception might be raised.

A null-reference check identifies whether a field reference is null, in which case nothing can be done with that field. As an example, consider the following steps:
aload s
//push reference for an object onto stack
getfield At this stage the 'getfield' loads the specified field from the object. If the situation arises:
aload s
getfield (class X, field Y)

then if s is null, nothing further can be done and an exception must be raised by the getfield. The pre-exception condition check determines whether there will be a null. If so, the bailout device is called.

A divide-by-zero check, as has already been discussed in the examples above, determines whether a situation will or may be reached where the denominator of a divider function becomes zero, an uncomputable function.

An object type check can best be described as a check to ensure that objects are fitted into the hierarchical structure of an object-oriented system with the correct implementation of methods.

As an illustration of this check, consider the situation where a method might call draw where draw is a method for drawing an object of the Graphics class. If there is no subclass of graphics at that stage which includes a different implementation of draw, it can been assumed that the method draw is final and will not be overridden by a new draw method. Thus, it is assumed that the draw method is not polymorphic, even though it is potentially polymorphic. The code can be compiled with the assumption that the draw method is final. Optimisations can be made based on that assumption, for example inlining of the method draw into the code. See Appendix 7 of this specification.

The object type check is made to determine whether the called method can appropriately be implemented on the relevant object. In the present example, the check will determine whether the object is a graphics type rather than anything else and whether the draw method is appropriate for the object.

Apparatus for carrying out the method of the present invention is shown schematically in FIG. A3-1. The apparatus includes an interpreter 2000 for interpreting code. An execution history recorder 2002 records details of the execution of the code by the interpreter 2000. When a block of code is executed a predetermined number of times, the execution history recorder 2002 notifies the compiler manager 2004 which administers a queue of blocks for compilation. The compiler 2006 consults the queue and takes blocks for compilation, determines the dominant path from the records of the execution history recorder 2002. The compiler also determines whether there are any possible exceptions which may occur in the dominant path fragment to be compiled. If so, the necessary pre-exception condition checks are inserted at the beginning of the compiled fragment of code. The compiler 2006 compiles the fragment and sets up any necessary links to bailout devices 2008. The compiled code is executed by the execution device 2010. If the pre-exception condition check indicates that an exception will occur, the bailout device 2008 transfers to glue code 2014 which passes control to the interpreter 2000 for execution of non-compiled code relating to the exception.

FIG. A3-2 shows a section of uncompiled Java code 2100. Code section 2100 would be executed using the interpreter 2000.

The section 2100 includes a loop 2102. Within the loop 2102 is a possible exception 2104 (for example a division which might result in a 'divide by zero' exception). The loop 2102 also includes a loop invariant term 2106 which it is desired to move out of the loop to increase the speed of execution of the loop 2102.

After several executions of the code 2100, it is found that the code fragment forming the loop 2102 is a dominant path fragment of code and it is queued for compilation. FIG. A3-3 shows the compiled version of the code fragment (indicated generally as 2108). The compiled code fragment 2108 includes a pre-exception condition check 2112 to check to see whether the exception will occur. The compiled version still includes a loop 2114 but, due to optimisations made in the compilation, it is smaller than before, and quicker to execute. The loop invariant term 2116 has been moved out of the loop 2114, to increase the speed of execution. The pre-exception condition check 2112 includes a path 2118 to a bailout device 2008 for the case in which it is found that an exception will occur.

In any or all of the aforementioned, certain features of the present invention have been implemented using computer software. However, it will of course be clear to the skilled man that any of these features may be implemented using hardware or a combination of hardware and software. Furthermore, it will be readily understood that the functions performed by the hardware, the computer software, and such like are performed on or using electrical and like signals.

Features which relate to the storage of information may be implemented by suitable memory locations or stores. Features which relate to the processing of information may be implemented by a suitable processor or control means, either in software or in hardware or in a combination of the two.

In any or all of the aforementioned, the invention may be embodied in any, some or all of the following forms: it may be embodied in a method of operating a computer system; it may be embodied in the computer system itself; it may be embodied in a computer system when programmed with or adapted or arranged to execute the method of operating that system; and/or it may be embodied in a computer-readable storage medium having a program recorded thereon which is adapted to operate according to the method of operating the system.

As used herein throughout the term 'computer system' may be interchanged for 'computer', 'system', 'equipment', 'apparatus', 'machine' and like terms. The computer system may be or may include a virtual machine.

In any or all of the aforementioned, different features and aspects described above, including method and apparatus features and aspects, may be combined in any appropriate fashion.

It will be understood that the present invention(s) has been described above purely by way of example, and modifications of detail can be made within the scope of the invention.

Each feature disclosed in the description, and (where appropriate) the claims and drawings may be provided independently or in any appropriate combination.

Appendix 4

The present invention relates in one aspect to a method of creating a link from a first piece of compiled code to a second piece of compiled code, and to a method of compiling code. It relates in another aspect to methods of and apparatus for examining memory in a computer system to allow a section of compiled code to be deleted, and to a method of and apparatus for deleting compiled code in a computer system, in particular where there may be a link between sections of compiled code. The invention has particular (but not exclusive) application to a self-modifying multi-threaded environment. In a preferred embodiment, the invention relates to multi-threaded fragment patching.

A self-modifying environment may be one in which sections of compiled code are created and deleted dynamically during execution. Such an environment is described in FIGS. 1–1E and associated text. A multi-threaded environment is one in which several processes, or threads, operate asynchronously in the same workspace.

In a self-modifying environment there may be situations in which a link must be made between a first section of compiled code and a second section of compiled code that is located elsewhere in the workspace, to enable execution to transfer between the two sections of code. The process of transferring execution from one piece of code to the other generally involves a number of steps, including putting the address of the first piece of code on the stack, together with register values, transferring execution to an intermediate piece of code that identifies the location of the second piece of code, and then transferring execution to the second piece of code. A problem with transferring execution in this way is that a relatively large amount of time is spent in making the transfer.

In a first aspect of the present invention there is provided a method of providing a link between two pieces of compiled code in a self-modifying multi-threaded computer system, including inserting a patch from one piece of compiled code to the other.

By providing patches from one piece of compiled code to another, execution may transfer more quickly than if the patches were not made.

The step of inserting a patch may include changing a control transfer instruction within the compiled code. The control transfer instruction may be any instruction which causes execution to transfer to another address, such as a jump instruction or a call instruction. The control transfer instruction may be changed to point to the address of the piece of code to which a patch is made.

The step of changing a control transfer instruction may be carried out atomically. By atomically it is preferably meant that the other threads cannot view the area being changed in a partially changed form. This may be achieved for a single processor system by ensuring that the step of inserting a patch is carried out as a single write operation. Alternatively, some processors provide one or more special instructions or sequences of special instructions which are defined to ensure atomicity; such instructions may be used to ensure atomicity in single processor and multi-processor systems. In this way it can be ensured that patch manipulation is completed before any other operations which may influence the work space are carried out.

The first aspect of the invention also provides an apparatus for providing a link between two pieces of compiled code in a self-modifying multi-threaded computer system, including means for inserting a patch from one piece of compiled code to the other.

The first aspect of the invention also provides a method of compiling code, the code including two possible paths of execution, the method including compiling the code corresponding to one of the paths of execution, and including in the compiled code a control transfer instruction which is capable of being changed atomically to point to the address of another piece of code.

In this way, the compiled code can be arranged so that a patch to another piece of code can be made after the code has been compiled, in particular, to enable the other path to be executed.

Preferably, the control transfer instruction is of a type which can point to an address which is further from its own address than if the most optimum form of the control transfer instruction were used. This feature can allow the patch to be to a more distant piece of code than would otherwise be the case.

The method may include forming an outlying section of code which includes the control transfer instruction.

The first aspect of the invention also provides a compiler adapted to carry out any of the above methods of compiling code.

In some circumstances it may be desirable or necessary to remove the patches which have been made, for example, because a code buffer containing a section of compiled code is to be deleted, or because assumptions which where made about a piece of compiled code prove not to be valid.

Thus, in a second aspect of the invention there is provided a method of examining memory containing a section of compiled code in a self-modifying multi-threaded computer system, including identifying any patches into the section of compiled code, and redirecting any such patches. The method may be carried out, for example, because a section of compiled code is to be deleted, or because the section of compiled code is no longer to be used. The redirection of the patch enables execution to continue at the patch without the section of compiled code.

The second aspect of the invention further provides a method of deleting compiled code in a self-modifying multi-threaded computer system, including selecting a section of compiled code to be deleted, identifying any patches into the section of compiled code, redirecting any such patches, and deleting the section of compiled code.

Preferably, any such patches are directed to the address of a continuation code. The continuation code enables execution to continue without the section of code. The continuation code may be arranged to effect interpretation of subsequent instructions, or it may be arranged to perform a dispatch table transfer.

Preferably, the step of redirecting a patch is done atomically, to ensure that other threads cannot access the location being patched when the patch operation is only partially completed. An alternative solution would be to stop all executing threads while the patch was redirected, but that is less preferred due to the execution time lost while the threads are stopped.

In order to identify patches going into the section of compiled code, the method may include calculating a hash value of the address of the section of compiled code, and examining a hash table of patch blocks to identify any patches into the section of compiled code.

In the interests of efficient memory usage, any unused patches (such as patches out of the code buffer) should be deleted, so that the overhead associated with the patch can be reclaimed. Therefore, the method preferably further includes identifying any patches out of the section of compiled code, and removing any such patches.

Thus, the second aspect of the present invention also provides a method of examining memory in a self-modifying multi-threaded computer system when a section of compiled code is to be deleted, including identifying any patches out of the section of compiled code and removing any such patches.

Preferably the method of examining memory further includes the steps of:

examining a frame of a stack in the computer system;

identifying whether the frame contains a return address which is in the range of addresses of the section of compiled code to be deleted;

and altering the contents of the frame when such a return address is identified.

Thus, the second aspect of the invention also provides a method of examining memory in a self-modifying multi-threaded computer system to allow a section of compiled code to be deleted, the method including the steps of:

examining a frame of a stack in the computer system;

identifying whether the frame contains a return address which is in the range of addresses of the section of compiled code;

altering the contents of the frame when such a return address is found;

identifying any patches into the section of compiled code; and redirecting any such patch.

Thus the second aspect of the invention preferably includes one or more of the features of one or more aspects of the invention described in Appendix 1 of this specification.

Preferably, the method further includes identifying any patches out of the section of compiled code and removing any such patches.

Preferably, the alteration of the contents of the frame and/or the redirecting of the patch are carried out at the time of deletion of the section of compiled code rather than, for example, as patches or returns into the deleted code are found during execution.

The second aspect of the invention also provides apparatus for examining memory in a self-modifying multi-threaded computer system to allow a section of compiled code to be deleted, including means for identifying any patches into the section of compiled code, and means for redirecting any such patches. Thus, execution may continue at the patch without the section of compiled code.

The second aspect of the invention also provides an apparatus for deleting compiled code in a self-modifying multi-threaded computer system, including means for selecting a section of compiled code to be deleted, means for identifying any patches into the section of compiled code, means for redirecting any such patches, and means for deleting the section of compiled code.

Preferably, the apparatus includes means for calculating a hash value of the address of the section of compiled code, and means for examining a hash table of patch blocks to identify any patches into the section of compiled code.

Preferably, the apparatus further includes means for identifying any patches out of the section of compiled code, and means for removing any such patches.

The second aspect of the invention also provides apparatus for examining memory in a self-modifying multi-threaded computer system to allow a section of compiled code to be deleted including means for identifying any patches out of the section of compiled code and means for removing any such patches.

Features of one aspect may be applied to other aspects; similarly, method features may be applied to the apparatus and vice versa.

The following considerations apply to any and all the inventions and aspects of the inventions described above.

As described above in FIGS. 1–1E and associated text, dynamic compilation may result in fragments of code in a method being compiled, rather than the whole method. The fragments that are compiled correspond to the dominant path, as determined, for example, from the run time representation of the source program and execution history information. At a later stage, other fragments of code may be compiled, for example, where the original assumptions that were made about the dominant path prove to be incorrect.

As an example, if the code contains a conditional control transfer instruction (such as a conditional branch instruction or a conditional call instruction), the compiler decides whether or not the transfer is likely to be made, and then compiles the code corresponding to the path that is most likely to be followed (the dominant path). However, during execution, it may be decided that in fact the other path should be followed. In such circumstances, when the transfer instruction is encountered, execution transfers to a piece of code known as 'glue code.' If the path that is to be followed has not been compiled, then the glue code causes interpretation of subsequent instructions in the path to be followed. If the interpreted path is followed a certain number of times, the compiler may decide that it is worthwhile compiling that section of code, and will then produce a compiled version of the code.

A self-modifying environment is thereby created, in which sections of compiled code are created (and possibly deleted) dynamically during execution. Such an environment is typically multi-threaded, with several processes operating in the same work space concurrently.

According to a preferred embodiment, in such a situation, a patch is made from the transfer instruction in the original section of code to the newly compiled section of code. The patch modifies the transfer instruction so as to cause execution to transfer directly to the address of the newly compiled section of code. In order to allow the patch to be made, at the time of compilation the compiled code is arranged so that a patch can be inserted at a later stage, should this be required. This is done, for example, by compiling a longer form of the transfer instruction than is necessary for the original compiled code, to allow a transfer to a more distance piece of code to be made at a later stage.

A patch may also be made from the newly compiled section of code back to the original section of code, if necessary.

It should be noted that in a multi-threaded environment, patching such as that described above needs to be done atomically, that is, as a single instruction, so that other threads cannot view the area being changed in a partially changed form. Therefore, the code is arranged so that the patch can be made atomically. To retain atomicity, the patching could be done as a single write operation. Alternatively, some processors provide one or more special instructions or sequences of special instructions which ensure atomicity. In a multi-processor environment the address of the location being patched will probably, for many processors, need to be aligned according to the size of the patch data (such that the address is an integer multiple of the size of the operation).

A first example will now be described with reference to FIGS. A4-1 and A4-2. This example concerns the case where the non-native code contained a call instruction.

Referring to FIG. A4-1, a first code fragment 23002 has a call instruction 23003 at address aaa. In the original non-native code this call instruction called the subroutine 'bar'. During compilation the subroutine bar was not compiled (for example, because it was not certain which version of bar would be used), but instead a piece of outlying code 23004 was created to deal with the situation where bar is called. Call instruction 23003 points to address abd in the outlying code. At this address there is a call instruction 23005 which transfers execution to a piece of glue code. The glue code causes the subroutine bar to be interpreted, if no compiled version of bar exists. Thus, when call instruction 23003 is executed, the glue code is called.

Referring now to FIG. A4-2, at some later time the subroutine bar has been compiled. The compiled version of bar is stored as compiled code 23006 at address xyz, in this example. A patch 23008 is then made from code fragment 23002 to compiled code 23006, either directly or via outlying code 23004.

FIG. A4-2 shows the case where the patch is made directly. In this case, call instruction 23003 is changed so as to point directly to address xyz. This is possible if call instruction 23003 has been compiled in a form which is atomically patchable to address xyz.

FIG. A4-3 shows the case where the patch is made via outlier 23004. In this case, a jump instruction 23007 at address abc in the outlier 23004 is set to jump to address xyz, and call instruction 23003 is changed to point to address abc. Alternatively, call instruction 23003 could point permanently to address abc, in which case jump instruction 23007 would point initially to address abd (to call the glue code) and would then be changed to point to address xyz (to make the patch).

In each case, the instruction that is changed to point to address xyz is in a long form to allow transfers to relatively distant addresses. Thus, when compiling the code, allowance must be made for this. For example, the call instruction 23003 could be made to be a longer version than is required if the instruction were only to point to address abd, to allow the instruction to be changed to point to a more distant address in the future. It must also be ensured that the instruction is of a type which can have the address to which it points changed atomically.

At the end of the compiled version of subroutine bar, a return instruction causes control to transfer directly back into code 23002. Once the patch has been made, execution can transfer from compiled code 23002 to compiled code 23006 and back again without the need for glue code.

For each patch, information concerning the patch is recorded in a patch block, which is stored in the code buffer (area of memory) where the patch originates from.

FIG. A4-4 illustrates an example where a section of code 23012 contains a conditional branch instruction 23013 at address aaa. During compilation, the compiler decided that the branch instruction was unlikely to be followed, and so the instructions at the address where the original (non-native) branch instruction pointed to were not compiled. In order to cope with the situation where this assumption is wrong, the compiler inserted outlier 23014. Initially, instruction 23013 points to address abd in the outlier. At this address there is a call to glue code. The glue code causes the instructions at the address where the original (non-native) branch instruction pointed to be interpreted.

At some later stage, the instructions to which the branch instruction points may be compiled, for example, because the initial assumption that these instructions are unlikely to be executed has proved to be incorrect. The compiled version of these instructions is shown at address xyz in this example. A patch may then be made directly to the compiled code at address xyz. This is done by changing a jump instruction at address abc to point to address xyz, and by changing instruction 23013 to point to address abc. Alternatively, instruction 23013 could point permanently to address abc, and the jump instruction at that address could point initially to abd, and then be changed to point to xyz. Again, at the time of compilation, the instructions which are to be changed to make the patch are set up so that the patch can be made atomically.

Thus, it will be seen that an important aspect of the above techniques is that the compiled code is arranged so that patches may be inserted at a later stage. This can be done by ensuring that, where there are two or more possible paths of execution and only one path is compiled, there exists a control transfer instruction (such as a call or jump instruction) that can be modified atomically to transfer execution to a relatively distance address.

The outliers described above may also include code for updating registers and states, before transferring control out of the compiled version of code. Such outliers are described in more detail in Appendix 2 of this specification.

In some circumstances it may be desirable or necessary to remove the patches which have been made. For example, at some stage a code buffer containing a section of compiled code may be deleted. This may be because the code buffer is required for use elsewhere, or because assumptions that were made during compilation are no longer valid. Also, it is desirable to remove any code which is not expected to be required in the future, particularly when working in a limited memory environment. If there is a patch into the code buffer, deleting the code buffer would leave a patch to a section of code that no longer exists.

At the time of deletion of a code buffer, the code buffer is examined to see if there are any patches going into or out of the buffer. Any patches going into the code buffer are redirected so as to allow execution to continue without the buffer to be deleted, for example, by redirecting the patch to a piece of glue code or outlier code. Any data structures relating to patches going out of the buffer are removed, in order to reclaim the overhead.

As mentioned above, when a patch is made, information concerning the patch is stored in a patch block. Each patch block gives the 'from' address and the 'to' address of the patch to which it relates. The patch blocks are stored as a chain in the code buffer where the patches originate. Each code buffer therefore has a chain of patch blocks relating to the patches from that buffer. The patch blocks are simultaneously chained together on a second chain, according to where the patch is to. At the same time, a hash table is maintained, which allows access to the various chains. A hash table is a data structure consisting of multiple chains of blocks, in which elements are grouped according to an arbitrary mathematical function. Hash tables are described in more detail in Appendix 6 of this specification.

In order to find the patches going into the buffer to be deleted, a hash (using the same mathematical function as the hash table) is made of the address of the buffer that the patch causes a transition to, in order to find the chain containing the patch blocks relating to 'to' patches. The patch blocks in the chain are then examined to see if they relate to patches to the buffer to be deleted. When such a patch block is found, the patch to which it relates is redirected, for example, to a piece of glue code or outlier code, and the patch block itself is removed from the chain. The glue code is designed to perform some generalised checks, and to cause the continuation of the flow of execution, for example by interpretation of subsequent instructions, or by jumping to another piece of compiled code. Further discussion of the action of the glue code can be found in FIGS. 1–1E and associated text.

It may also be determined whether there are any patches from the buffer to be deleted. This can be done by examining the chain of patch blocks stored in the buffer to be deleted using the first chain described above. The patch blocks in this chain are examined, and if a patch which has not yet been deleted exists, the patch is deleted. In this way, the overhead associated with the patch may be reclaimed.

Referring to FIG. A4-5, a method of removing patches when a code buffer is to be deleted will be described. In step 23020 it is decided that a certain code buffer is to be deleted. In step 23022 a hash is made of the address of the buffer. In step 23024 a patch block is selected from the 'to' chain in the hash table. In step 23026 it is decided, from the patch block, whether there is a patch into the buffer that is to be deleted. If there is such a patch, then in step 23028 the patch is redirected, for example, to the address of a piece of glue code, and the patch block is removed from the chain in the hash table. In step 23030 it is determined whether the patch block is the last in the chain. If not, then the sequence of selecting and testing a patch block is repeated.

Once the hash table has been examined for all patches into the code buffer, it is then examined for patches out of the code buffer. In step 23032 a patch block is selected from the 'from' (jump source) chain in the code buffer to be deleted. In step 23034 a hash is made of the 'to' buffer address. In step 23036 the patch block is removed from the hash chain relating to the "to" buffer for that patch. In step 23038 it is determined whether the patch block is the last in the 'from' chain, and if not the sequence is repeated for other patch blocks in the chain until all the patch blocks have been examined. Finally, in step 23039, the code buffer is deleted.

In another example, the patches to or from a section of compiled code are removed, not because the code buffer in which the code is stored is to be deleted, but because the compiled code is no longer to be used, for instance, because assumptions that were made during compilation are no longer valid. For example, when a potentially polymorphic method has been assumed to be final, and a patch has been made to a compiled version of that method, if it is later discovered that the method is not final, then the patch to the compiled version must be removed. Reference is made in this respect to Appendix 7 of this specification.

Referring to FIG. A4-6, a section of compiled code 23072 contains a call to a method, which may be polymorphic. Initially the method to be called has not been compiled. Call instruction 23073 points to address abc in a piece of outlying code 23074. At this address, there is a call to glue code. The glue code will determine which version of the method to use, and will cause that version to be executed.

Later, an assumption may be made that the method is final, and the method may be compiled. The compiled version of the method 23076 is shown at address xyz. A patch 23078 may then be made directly to the compiled version of the method. This is done by changing instruction 23073 to point directly to address xyz. Return 23079 is made back to code 23072.

Later still, the assumption that the method was final may prove to be false. In this situation, patch 23078 is removed, since it is not certain which version of the method should be used. Instruction 23073 is then changed to point to address abd. At this address there is a call to the dispatch table. The dispatch table determines which version of the method should be used, and whether there is a compiled version. If there is a compiled version, execution jumps to that version; if not, execution jumps to glue code which causes the method to be interpreted.

The technique for deleting compiled code may be used in combination with the 'Stack Walking' technique described in Appendix 1 of this specification, and/or with any other techniques described herein.

Referring to FIG. A4-7, an apparatus for putting the present embodiment into effect will be described. FIG. A4-7 shows a computer system including a virtual machine 23040 which allows non-native code 23042 to run on host computer 23044. The virtual machine includes control means 23046, interpreter 23048, compiler 23050, glue code 23054, and deletion means 23056. The host computer includes a processor 23058 and memory 23060 including code buffer 23062. Code buffer 23062 contains code which has been compiled by the compiler. The compiler is adapted to compile code in any of the ways described above. Also shown in FIG. A4-7 is patching means 23055 for inserting a patch from one piece of compiled code to another. The patching means 23055 is adapted to make a patch in any of the ways described above.

In operation, the control means 23046 may decide at a certain time that code buffer 23062 is to be deleted. It then consults a hash table 23052 to identify any patches going into or out of the code buffer in the way described above. If any patches are found going into the code buffer, the control means redirects those patches, for example, to glue code 23054. If any patches are found going out of the code buffer, the control means removes the patch blocks relating to those patches. The control means then instructs the deletion means 23056 to delete the code buffer.

It will be appreciated that the virtual machine shown in FIG. A4-7 will generally be in the form of software and stored in the memory of the host computer 23044.

It will be understood that the present invention has been described above purely by way of example, and modifications of detail can be made within the scope of the invention.

Each feature disclosed in the description, and (where appropriate) the claims and drawings may be provided independently or in any appropriate combination.

In any or all of the aforementioned, certain features of the present invention have been implemented using computer software. However, it will of course be clear to the skilled man that any of these features may be implemented using hardware or a combination of hardware and software. Furthermore, it will be readily understood that the functions performed by the hardware, the computer software, and such like, are performed on or using electrical and like signals.

Features that relate to the storage of information may be implemented by suitable memory locations or stores. Features which relate to the processing of information may be implemented by a suitable processor or control means, either in software or in hardware or in a combination of the two.

In any or all of the aforementioned, the invention may be embodied in any, some, or all of the following forms: it may be embodied in a method of operating a computer system; it may be embodied in the computer system itself; it may be embodied in a computer system when programmed with or adapted or arranged to execute the method of operating that system; and/or it may be embodied in a computer-readable storage medium having a program recorded thereon which is adapted to operate according to the method of operating the system.

As used herein throughout the term 'computer system' may be interchanged for 'computer,' 'system,' 'equipment,' 'apparatus,' 'machine,' and like terms. The computer system may be or may include a virtual machine.

In any or all of the aforementioned, different features and aspects described above, including method and apparatus features and aspects, may be combined in any appropriate fashion.

It will be understood that the present invention(s) has been described above purely by way of example, and modifications of detail can be made within the scope of the invention.

Each feature disclosed in the description, and (where appropriate) the claims and drawings may be provided independently or in any appropriate combination.

Some of the terms used above are specific to the Java language and to Java-type languages. Various aspects of the inventions and their embodiments are also applicable in the use of other languages. It will be understood that the terms used herein should be construed broadly, unless clear to the contrary, to include similar and/or corresponding features relating to other languages.

It will be understood that the present invention(s) has been described above purely by way of example, and modifications of detail can be made within the scope of the invention.

Each feature disclosed in the description and (where appropriate), the claims and drawings, may be provided independently or in any appropriate combination.

Features of one aspect of any one of the inventions may be applied to other aspects of the invention or other inventions described herein. Similarly, method features may be applied to the apparatus and vice versa.

Appendix 5

The present invention relates to a computer system and method of operating the same, to so-called return barriers for garbage collection in a computer, to a computer-readable storage medium, computer system, Virtual Machine or similar apparatus incorporating the same, and to an operating method. In a preferred embodiment, the invention relates to return barriers for garbage collection.

The invention has general applicability to Run-time Environments. More particularly, it is applicable to automatic dynamic memory management.

The present invention relates in one aspect to the use of so-called return barriers to minimize blocking while a thread's stack is being inspected by a concurrent garbage collector.

In certain computer systems, as shown schematically in FIG. A5-1, data is stored in (activation) frames 29000 in an (activation) stack 29002 with the most recent activity being regarded as stored in the lowermost frame in the stack (although it could equally be in the uppermost). Garbage collection involves tracing the connectivity of all cells. Any that are not traced in this way are therefore invisible and cannot contain any information of relevance. Those cells can thus be released for use (as additional memory) in the system. The garbage collector traces every frame in every thread's stack.

A typical activation stack is shown in more detail in FIG. A5-2. For convenience, the stack (29102 as shown in this figure) may be regarded as a memory store in which items are successively added from top to bottom so that the 'youngest' items are nearest the bottom of the stack. Each stack consists of a number of frames (29104 as shown in this figure), each frame containing data and one or more references or frame pointers to other frames or stacks. Typically, each frame will contain a pointer 29106 to the previous, that is older, frame and a return pointer 29108 into the calling procedure's executable code.

In the tracing process, all of the pointers or references (to memory objects stored in the memory heap) in each frame of the stack need to be looked at. For that to happen, it has been necessary up to now for the thread to be paused while tracing is carried out through the whole of that thread's stack. That in turn requires the garbage collection process to be halted while it waits for the thread to give permission for the garbage collector to interrogate its frames.

In other words, any references contained in a thread of control's activation stack need to be treated as part of a tracing concurrent garbage collector's root set, and need to be examined during the garbage collection process. It is vitally important that the thread being inspected does not alter any information that the garbage collector ("GC") thread could be examining. One way of achieving this is to suspend execution of the thread to be inspected, allow the GC to inspect the entire contents of the stack, and then to resume execution of the inspected thread.

The main problem with the above technique which has been identified pursuant to the present invention is that the amount of time a thread will be suspended is determined by the size of the thread's stack, and suspending a thread for too long will lead to noticeable pauses. The technique described by this patent allows a thread to continue execution, provided preferably that it is not trying to use a portion of the stack that the GC thread is interested in.

According to one aspect there is provided a method of operating a computer system including at least one, preferably a plurality or even multiplicity of, activation stack(s) arranged to be managed by its (their) respective thread of control, the method including the steps of:

executing the thread using its activation stack; and permitting a further thread to access, preferably simultaneously, the same activation stack. By this feature the degree of concurrency in the system can be enhanced.

In order to prevent possible problems of contention, execution of the thread may be paused for only part of the time that the further thread is accessing the activation stack of the thread. Hence, there is provided a mechanism whereby any operation which for example wants to examine the contents of another thread's stack can do so without causing that thread to be halted unduly.

For the same reason, the thread and the further thread may be prevented from accessing the same activation frame at the same time.

Similarly, execution by the thread of its current activation frame may be paused for the time it takes the further thread to access the same activation frame.

A barrier may be provided to selectively prevent return of the thread from its current activation frame into the frame currently being accessed by the further thread. In typical practical situations one thread would be expected to execute a given activation frame more slowly than the time that the other thread (in this case referred to as the further thread) would take to access it. Accordingly, it is not expected that the return barrier will come into operation particularly frequently. However, it is most important in ensuring that no conflict occurs.

The preventive effect of the barrier may be selective upon whether the further thread is currently accessing the parent frame of the thread's current activation frame. Preferably a barrier is provided to prevent return of the thread from its current activation frame into the parent activation frame of the current activation frame of the thread if the further thread is currently accessing the parent activation frame.

The barrier for the current activation frame may be provided before the further thread changes the frame it is currently accessing. By this feature a form of 'air lock' is created.

A second further thread or even a larger number of further threads may be permitted to access, preferably simultaneously, the same activation stack. In one preferred embodiment the further thread is the thread of a, preferably concurrent, garbage collector, the second further thread is the thread of a debugger, and the thread is any other arbitrary thread within the computer system.

For the same activation frame different barriers may be provided for the further and the second further threads. This can allow different functions to be performed.

Preferably, the barriers are arranged to allow a group of the barriers to be associated with a single activation frame. For each different barrier a descriptor block may be provided, the descriptor blocks preferably being linked to form a linked list. This is a convenient way of coping with multiple barriers.

One particularly important use of the present invention is in garbage collection. Hence, the further thread may be the thread of a, preferably concurrent, garbage collector.

Preferably, in a single cycle the garbage collector makes an initial and at least one further scan of the frames of the stack.

Preferably, in the at least one further scan only frames which have mutated are scanned. Scanning can be time-consuming and accordingly this feature can reduce the time taken for garbage collection.

A record may be kept of the extent to which, in the at least one further scan, the frames need to be re-scanned. This record can be used to determine the point at which subsequent scans can be started. More specifically, the record may be of which frames could have mutated or been created between two given scans. Re-scanning may be from the youngest frame which has an intact return barrier to the current activation frame.

In a closely related aspect the present invention provides a computer system including:

at least one, preferably a plurality or even multiplicity of, activation stack(s) arranged to be managed by its (their) respective thread of control;

means (preferably a run time engine) for executing the thread using its activation stack; and means for permitting a further thread to access, preferably simultaneously, the same activation stack.

Preferably, the computer system further includes means for pausing (or, for example the run time engine, is further adapted to pause) execution of the thread for only part of the time that it takes the further thread to access the activation stack of the thread.

The computer system may further include means for preventing (or may further be adapted to prevent) the thread and the further thread from accessing the same activation frame at the same time.

The computer system may further include means for pausing (or may further be adapted to pause) execution by the thread of its current activation frame for the time it takes the further thread to access the same activation frame.

The computer system may further include means for providing (or may further be adapted to provide) a barrier to selectively prevent return of the thread from its current activation frame into the frame currently being accessed by the further thread.

The computer system may further include means for providing (or may further be adapted to provide) a barrier to prevent return of the thread from its current activation frame into the parent activation frame of the current activation frame of the thread if the further thread is currently accessing the parent activation frame.

The computer system may further include means for providing (or may further be adapted to provide) the barrier for the current activation frame before the further thread changes the frame it is currently accessing.

The computer system may further include means for permitting (or may further be adapted to permit) a second further thread to access the same activation stack.

The computer system may be adapted to provide for the same activation frame different barriers for the further and the second further threads.

Preferably, the barriers are arranged to allow a group of the barriers to be associated with a single activation frame. The computer system may he adapted to provide for each the different barrier a descriptor block, the descriptor blocks being linked to form a linked list.

The further thread may be the thread of a garbage collector.

The garbage collector may be adapted to make, in a single cycle, an initial and at least one further scan of the frames of the stack.

The computer system may be adapted so that in the at least one further scan only frames which have mutated are scanned.

The computer system may further include means for keeping (or may further be adapted to keep) a record of the extent to which, in the at least one further scan, the frames need to be re-scanned.

The invention has especial utility in the context of garbage collection.

In broad terms, it is proposed to solve the various problems mentioned earlier in connection with garbage collection by suspending the non-GC thread's execution only for as long as it takes to examine the youngest activation frame, and editing the frame's return address to refer to some special code. Then the thread is allowed to continue execution while successive caller's activation frames are examined. Once examination of a particular frame is completed, before moving onto the next, the frame's return address is edited to refer to the same special code mentioned earlier.

Garbage collection is a relatively rapid event by comparison with the speed of execution of a typical procedure call. Thus, it is relatively rare (though, of course, certainly possible) for a return from a procedure call to occur before the garbage collection is complete. In such a rare event the special code is activated; it intercepts attempts to return from an activation frame back to the caller's frame. If the caller's frame is currently being examined by the GC thread, the non-GC thread is compelled to wait until the GC thread has moved onto another frame.

In this context, the invention further provides a method of improving the concurrent garbage collection of reference data contained within a thread stack in a computer system, wherein the thread is only paused for the purpose of garbage collection for the time it takes to examine the current activation frame, rather than the entire stack.

Preferably measures are taken to prevent the return of an outstanding procedure call into an activation frame whose contents are currently being inspected by the garbage collector until such time as the garbage collector has completed the inspection of that frame.

Analogous apparatus may also be provided within the scope of the invention, including a garbage collector and means for pausing the thread for the purpose of garbage collection only for the time it takes to examine the current activation frame, rather than the entire stack.

In a closely related aspect, there is provided a computer or computer system including a garbage collector and means for pausing the thread for the purpose of garbage collection only for the time it takes to examine the current activation frame, rather than the entire stack.

In a further closely related aspect, there is provided a computer-readable storage medium having a program recorded thereon, the program providing a method of improving the concurrent garbage collection of reference data contained within a thread stack in a computer system, wherein the thread is only paused for the purpose of garbage collection for the time it takes to examine the current activation frame, rather than the entire stack.

In a further closely related aspect, there is provided a computer when programmed so as to provide a method of improving the concurrent garbage collection of reference data contained within a thread stack in a computer system, wherein the thread is only paused for the purpose of garbage collection for the time it takes to examine the current activation frame, rather than the entire stack.

In a closely related aspect, the invention provides a method of improving concurrent garbage collection in a thread stack of a computer system, including the steps of: enabling the garbage collection thread to access the thread of interest in the stack; suspending the execution of the thread of interest only for as long as necessary for the most active activation frame to be examined; editing the return address of the frame to a return barrier code; allowing the thread of interest to continue execution while successive activation frames are examined; and editing the return address of each frame to the same return barrier code before moving on to the next frame.

The barrier code may be used to prevent the return of an outstanding procedure call into an activation frame whose contents are currently being inspected by the garbage collector until such time as the garbage collector has completed the inspection of that frame. The invention thereby achieves the objective of reducing the time that the thread of interest is suspended. It can also maximize the degree of concurrency in a garbage collection system and improves the illusion of concurrency.

In a further closely related aspect, there is provided a computer-readable storage medium having a program recorded thereon, the program providing a method of improving concurrent garbage collection in a thread stack of a computer system, including the steps of: enabling the garbage collection thread to access the thread of interest in the stack; suspending the execution of the thread of interest only for as long as necessary for the most active activation frame to be examined; editing the return address of the frame to the return barrier code; allowing the thread of interest to continue execution while successive activation frames are examined; and editing the return address of each frame to the same return barrier code before moving on to the next frame.

The present invention extends to a computer when programmed according to the above method.

The present invention also extends to a computer system including at least one, preferably a plurality or even multiplicity of, activation stack(s) arranged to be managed by its (their) respective thread of control, when programmed so as to:

execute the thread using its activation stack; and permit a further thread to access the same activation stack.

The present invention also extends to a computer-readable storage medium having a program recorded thereon, the program providing the above method.

In a closely related aspect, there is provided a computer-readable storage medium having a program recorded thereon, the program providing a method of operating a computer system, the computer system including at least one activation stack arranged to be managed by its respective thread of control, the method including the steps of:

executing the thread using its activation stack; and permitting a further thread to access the same activation stack.

The invention extends to a Virtual Machine including the above computer or computer system.

The invention extends to a Virtual Machine when operated by the above method.

The invention extends to a Virtual Machine when operated by means of the above computer-readable storage medium.

Any, some or all of the different features of the various aspects of the present invention may be applied to the other aspects.

The invention will first be described in general terms and will then be followed by a more comprehensive description of a particular manner in which the invention may be put into effect.

With reference to FIG. A5-1, in the present invention, it has been recognised that the thread need only be paused by the run time engine for as long as it takes to examine the most recent (that is the youngest or most active) activation frame 29004 in stack 29002, not for the time required to examine all activation frames. The frame is checked for references or pointers and the return address is edited by substituting for the previous return address a special code (the return barrier code) which is sent into the program 29006 itself, which is operating on data in what is known as the heap 29008. The special code links the old and the new return addresses to that frame. If the garbage collector is operating on that frame at the time that the data is to be returned, the return barrier code prevents corruption of the data in that frame by pausing return until such time as the garbage collector has moved on to another frame.

The success of the invention relies on the realization that only the youngest frame will have been changed or mutated as a result of work being done on it. When the thread is paused, for example for garbage collection, checks are made on all the references in the youngest frame. With reference to FIG. A5-3, the frame pointer and return address are copied into a separate store (29204) and the return address is edited into the special code. The thread can then continue in the youngest frame. When the youngest frame wants to return to the previous frame, it may not be able to do so because the GC may be active at that location. Under those circumstances, the return barrier diverts the request to the special code, thereby preventing the thread from returning to the previous frame until the GC has finished. The GC lays down the return barrier and the thread removes it when safe to do so.

Most returns are not hindered because the GC will have moved on from the youngest frame and will be investigating frames some distance removed. There could be several return barriers in a stack, depending on the number of threads trying to access the stack at any one time. It follows that subsequent threads do not need to go back through as much of the stack as previously.

A more detailed description is now provided, at first of a generic return barrier and then later of the implementation of the return barrier in the context of garbage collection.

A thread's stack is composed of a sequence of frames. A frame contains all the information related to one particular outstanding procedure call. All frames contain the following:

(a) A return address, which is the address of some executable code which indicates where program execution should resume from once the procedure call associated with the frame has returned (a return address is a specific kind of instruction pointer); and (b) A parent frame pointer, which is a particular type of pointer to memory which points to an address which indicates the frame of the calling procedure (a parent frame pointer is a specific kind of frame pointer).

Reference is directed to FIG. A5-4 for an indication of the arrangement of data in a procedure call frame 29302 containing procedure parameters 1, 2 . . . through n, (29304), a return address 29306, a parent frame pointer 29308 and a set of local data 29310.

Hence, there exists the notion of the current or youngest frame, which describes the outstanding procedure call the thread is currently executing using procedure call stack 29402, as illustrated schematically in FIG. A5-5. The frame pointer 29404 of this youngest frame 29408 will typically be held in a particular machine register (known as the frame register). Successive parent frame pointers such as 29406 refer to increasingly older frames 29410, 29412.

The procedure undertaken in the above illustration may be represented as follows:

```
procedure C (pc1)
begin . . .
end;
procedure B (pb1, pb2)
begin
    C(z);
    . . . /* pt 2 */
end;
procedure A (pa1, pa2, pa3)
begin
    B(x, y);
    . . . /* pt 1 */
end;
```

A generic return barrier mechanism is now described (that is a mechanism which is not restricted to use in the context of a garbage collector), by which it can be arranged to have a series of arbitrary functions executed whenever a procedure executing in the context of a particular barriered frame attempts to return. This mechanism incurs no overhead if no barrier is present.

The return barrier mechanism may have a number of different clients, possibly (or even probably) simultaneously (so that more than one return barrier per frame may be required). More detailed description is provided herein of one particular client, the garbage collector, where the function to be executed is effectively a halting function. Another possible client is a debugging interface, where rather than being a halting function the function concerns the provision of information to the debugger. The important feature in this context is the ability to interrupt the return mechanism.

Laying down a return barrier is the mechanism whereby we arrange for an arbitrary function p in frame f; as mentioned previously typically this function depends upon the ultimate client—for example there is a specific function (referred to later as code B) which can be used for garbage collection. The general arrangement of the contents of a barrier descriptor block 29502 is shown schematically in FIG. A5-6; one barrier descriptor block is provided in memory per return barrier. In the following pseudo-code which describes the laying down of the return barrier the special code referred to earlier and described in more detail later is referred to as C.

allocate from memory a barrier descriptor block d.
let d's original return address be f's return address.
if f's return address is C,
;there is already at least one 'C' barrier laid in this
;frame, so f's frame pointer is really a barrier
;descriptor block.
let d's barrier link be f's parent frame.
let d's original parent frame be the original parent frame
in the barrier descriptor block pointed to by f's parent frame.
;the above two steps serve to establish another link in the
;linked list of the barrier descriptor blocks, with the
;barrier links pointing to successive boxes and d's barrier
;link being at the front of the linked list.

else
;there is no return barrier in this frame, so f's frame
;pointer really is a frame pointer.
let d's barrier link be NULL.
;so that the barrier link is a pointer to nowhere else in
;the linked list.
let d's original parent frame be f's parent frame.
;in other words save f's parent frame into d.
let f's return address point to Code C.
;this establishes the barrier.
endif
let d's barrier function be p.
let f's parent frame be d.

The idea as expressed above is that multiple barriers can be laid down in one particular frame, expressed as a chain of descriptor blocks linked via the barrier link fields. Each block has a copy of the original frame pointer, but each could have a different barrier function, so that each can have a different client.

It will understood that, for example in the context of garbage collection (which executes at a relatively rapid rate), an attempted return from the youngest activation frame is not particularly likely to occur. However, when the procedure executing in the context of a barriered frame does attempt to return, the code at C will be executed. It is responsible for executing each of the barrier functions in turn, and then completing the return as if no barrier had been present. Code C (the "special code") is described by the following section of pseudo-code; it is to be noted that this code is typically generic to all return barriers. The section includes reference to a linked list, which is a series of linked pointers.

;The procedure return mechanism means that the frame register
;contains a pointer to the first barrier descriptor block in the
;chain (linked list).
let d be the descriptor block in the frame register.
invoke d's barrier function p on d's original parent frame.
;(each barrier descriptor block will have the same parent frame
;reference)
let r be d's original return address.
;note that the original return address may point to code C.
if d's barrier link is NULL,
;end of chain (linked list) reached—continue normal
;execution.
let frame register be d's original parent frame.
else
;another barrier in the chain.
let frame register be d's barrier link.
endif
de-allocate barrier descriptor block d.
continue execution from address r.

The above describes the preferred embodiment of a generic return barrier mechanism.

In the specific context of garbage collection, the garbage collector utilises return barriers to ensure that no attempt is made by another thread to continue execution in a frame which is currently being scrutinised by the GC, while allowing execution in frames that are not being examined.

The implementation of the return barrier is now described. The garbage collector will investigate the contents of a thread's stack in the following way. Let gcf be a system-wide global variable which contains a reference to the activation frame currently being inspected by the GC thread. Only the GC can alter this, although it can be read by any thread. Hence gcf expresses the concept of the garbage collector focus, the frame which the garbage collector is currently examining.

The GC thread examines a thread t's stack as described in the following section of pseudo-code:
suspend t.
;in other words execution of the entire thread is suspended
let gcf be t's youngest (top-most) frame.
inspect the contents of frame gcf.
lay down a return barrier B in gcf.
;(by altering gcf's return address to point to the barrier
;intercept code)
;note that it is important that the return barrier is laid down
;in the parent frame before the younger frame is allowed into
;the parent frame, otherwise the present youngest frame could
;behave unexpectedly
let gcf be gcf's parent (caller's) frame.
allow t to resume execution.
while gcf is not NULL do
inspect the contents of frame gcf
lay down a return barrier B in gcf
let gcf be gcf's parent frame.
endwhile In this way the garbage collector can proceed through all of the frames of thread t's stack, from the youngest to the oldest.

The barrier intercept code B is invoked in the relatively unlikely event that a procedure attempts to return from a frame into the parent (caller's) frame (pf), and it will be supplied with a pointer to the frame it is trying to return into. It ensures that no attempt is made to return into a frame that the GC is currently inspecting (that is, it traps attempt to return to the parent frame):
while pf==gcf (this is a relatively unlikely event) do
wait a short time
;that is, code B keeps on waiting until the non-GC
;thread can return safely
endwhile Once the GC thread's focus (point of interest) has moved on, the non-GC thread can allow its return to caller to complete safely.

It is possible that return barriers established by earlier thread inspections could still be intact on subsequent inspections. In that case the GC thread does not try to establish a barrier if one is already present. While the GC is not running, gcf is set to point to an impossible value. Hence any return barriers are ignored. Hence when the GC is not running the return barrier mechanism is self-cleaning; although the return barriers remain in place the only overhead involved in running them is execution of pf==gcf, which is a trivial overhead.

The particular GC being employed may require that a particular thread's stack be examined multiple times in a single GC cycle, until no new activity is detected in the relevant thread (incidentally, this process is guaranteed to terminate at some point, since the heap is of a finite size). With the technique thus far described, each frame in each stack would need to be examined the appropriate number of times. However, in one preferred variant, now described, the barrier function B is enhanced to keep a record (in fact a single record per activation stack) of the most recent frame it had been invoked from. This record effectively represents the "high water mark" of activity on the stack. It recedes (moves towards older frames) as successive returns are made; however, calls to fresh activation frames do not alter the value of the record, since there will be no return barriers in such frames. When the GC examines a stack, it can assume that all frames older than the most recent frame the barrier function had been invoked from could not have changed, and so are not re-scanned. Hence the first scan involves the GC examining each and every frame in each and every stack. Subsequent re-scanning occurs from the youngest frame on the stack up to and including the youngest frame that still has a return barrier originally laid down in previous scans. Frames older than this cannot have changed in the interval between scans.

Details of the enhancement required to support minimal re-scanning are now provided. In addition to the variables described earlier, each thread has a variable tl-hwf, which at all times holds the youngest frame in the thread which has an intact GC return barrier.

The following enhanced technique examines a thread t's stack:

```
                this GC cycle, then
                    let scanlimit be NULL
        else
                    let scanlimit be oldhwf
        endif
        let gcf be t's youngest frame.
        inspect the contents of frame gcf
        if gcf is not the same as oldhwf then
                    lay down a return barrier B in gcf.
                    let laybarriers be TRUE.
        else
                    let laybarriers be FALSE.
        endif
        let t's tl-hwf value be gcf
        if scanlimit is the same as gcf, then
                    let finished be TRUE.
        else
                    let finished be FALSE.
                    let gcf be gcfs parent frame.
        endif
        allow t to resume execution.
        while finished is not TRUE do
                    inspect the contents of frame gcf
                    if laybarriers is TRUE, then
                            if gcf is not the same as oldhwf, then
                                    lay down a return barrier B in gcf
                            else
                                    let laybarriers be FALSE.
                            endif
                    endif
                    if scanlimit is the same as gcf, then
                            let finished be TRUE
                    else
                            let gcf be gcfs parent frame.
                    endif
        endwhile
```

Code B is enhanced so that it maintains the executing thread's copy of tl-hwf:

while pf=gcf do
  wait a short time
endwhile
let this thread's tl-hwf be pf.
;this permits updating of the high water mark where "this thread" refers to the thread executing Code B at the time (several threads may be doing this simultaneously).

The technique described above can allow a Concurrent GC implementation to minimise the amount of time it spends interacting with each thread, which in turn allows it to re-scan all threads more quickly, thus allowing entire GC cycles to complete in less time than it would take if all thread stacks had to be re-scanned in their entirety.

In summary, two (amongst other) fundamental aspects have been described. Firstly, a generic return barrier mechanism is provided, allowing arbitrary actions to be undertaken when a procedure returns. The mechanism does not cause excessive overhead to occur when the return barrier is not being used. Only the current frame has to pause when necessary—thereafter the procedure is self regulating in the sense that it can proceed at its own pace; little synchronization or handshaking is required.

Secondly, specifically in the context of concurrent garbage collection, one can use a return barrier to ensure that no attempt is made to re-enter a frame currently under scrutiny.

Concomitant with this is the ability to allow the GC to inspect a thread's stack while that thread is still running. A further feature which has been described is that, should the thread's stack be rescanned it is possible to determine which portion of the thread has to be looked at; this is achieved through a high water mark mechanism.

In any or all of the aforementioned, certain features of the present invention have been implemented using computer software. However, it will of course be clear to the skilled man that any of these features may be implemented using hardware or a combination of hardware and software. Furthermore, it will be readily understood that the functions performed by the hardware, the computer software, and such like are performed on or using electrical and like signals.

Features which relate to the storage of information may be implemented by suitable memory locations or stores. Features which relate to the processing of information may be implemented by a suitable processor or control means, either in software or in hardware or in a combination of the two.

In any or all of the aforementioned, the invention may be embodied in any, some or all of the following forms: it may be embodied in a method of operating a computer system; it may be embodied in the computer system itself; it may be embodied in a computer system when programmed with or adapted or arranged to execute the method of operating that system; and/or it may be embodied in a computer-readable storage medium having a program recorded thereon which is adapted to operate according to the method of operating the system.

As used herein throughout the term 'computer system' may be interchanged for 'computer,' 'system,' 'equipment,' 'apparatus,' 'machine,' and like terms. The computer system may be or may include a virtual machine.

In any or all of the aforementioned, different features and aspects described above, including method and apparatus features and aspects, may be combined in any appropriate fashion.

It will be understood that the present invention(s) has been described above purely by way of example, and modifications of detail can be made within the scope of the invention.

Each feature disclosed in the description, and (where appropriate) the claims and drawings may be provided independently or in any appropriate combination.

Appendix 6

The invention preferably relates to optimized execution of object oriented languages which use the 'interface' abstraction, and in particular Java. In a preferred embodiment, the invention relates to Dispatch Mechanism for Interface Methods.

Java supports single inheritance of class types, with interfaces. Interfaces themselves can be multiply inherited from other interfaces. When a concrete class claims to implement a set of interfaces, it must provide or inherit implementations of every method directly or indirectly defined by those interfaces. (See Reference [2] listed under Other Information at the end of this Appendix 6 in this specification).

In object oriented programming, objects are classified in a hierarchical structure with each object associated with attributes (data about its features or properties) and methods (functions it may perform). Typical such functions might be 'ring' in the context of a mobile or other telephone, or 'play' in the context of audio and/or video reproduction equipment. As one of the features in object-oriented languages, such as Java, the attributes and methods of a super class of objects are 'inherited' by its subclasses.

For example, as shown in FIG. A6-1, "mode of transportation" 400 is the superclass of both 'bike' 402 and 'car' 404 classes of objects. The 'car' sub-class could be subdivided into 'saloon' 406 and 'sports' 408 and further subdivision is possible according to, for example, the make or model of sports car etc. Certain attributes of the 'car' sub-class, such as the number of wheels, model, and so on, will be inherited by the 'saloon' and 'sports' sub-classes. In a similar vein, methods such as 'turn on lights' can be common to cars within the hierarchy, but in some sub-classes the methods themselves may differ to the extent that a certain function has to be performed before lights can actually be turned on. For instance, a sports car with pop-up headlights may need to raise the lights before they can be turned on. In such a case, the inheritance has to be overridden by the need to perform a function before the function in question can be performed.

In another context, the user of a mobile or other telephone may wish to arrange for his handset to emit a different ring depending on whether the call was business or social. In this context, 'ring' would be termed an 'interface.' Its significance is that 'ring' is a function that a variety of objects in the hierarchy would perform (like 'turn on lights' in the car example above) but the actual implementation would differ from object to object. Interfaces therefore cut across hierarchies. An interface is thus a list of functions that the object can perform (such as 'ring' or 'play' or 'record' and so on).

Single inheritance is usually implemented using dispatch tables (otherwise known as virtual function tables). A sub-class inherits the dispatch table of its superclass, extending it with any new methods, and replacing entries which have been overridden.

Multiple inheritance in languages such as C++ is normally implemented using multiple dispatch tables and offsets ((See Reference [1] listed under Other Information at the end of this Appendix 6 in this specification).

The relevant data is stored in slots in a dispatch table illustrated schematically in FIG. A6-2. The attributes of an object in a table 410 are always located at the same distance from the start of the object. The object includes a pointer 412 to a dispatch table of methods 414 which are always at the same distance from the start for the same function. However, when interface methods are used, as explained above, there is no longer any certainty of knowing in which slot of the dispatch table the particular function appears. This is a problem peculiar to the multiple inheritance and particularly interfaces found in Java language.

Up to now, the whole of the dispatch table had to be interrogated to check that the method accessed was the proper method. It had been realised that, ideally, a unique identifier would be needed for the interfaces, but in practice the table cannot be of such a size that everything within it has a unique identifier.

Reverting to the 'play' function analogy, there would be one dispatch table for video recorder and one for tape recorder. Each would have different interface references, so 'play' might be at position 2 for video recorder and position 22 for tape recorder.

The logical definition of invoking an interface method is to search the list of methods implemented directly or indirectly by the given class of object. This is clearly slow. This can be improved by searching a 'flat' structure which mirrors the dispatch table.

Reference [3] listed under Other Information at the end of this Appendix 6 in this specification describes an optimization where the last offset at which the interface method was found is remembered, and tried as a first guess next time the invoke interface is encountered. If the guess turns out to be wrong, a fuller search is performed. This approach is based on the assumption that a given call site will tend to operate on the same type of objects.

Even if the guess is right, the destination method has to be checked to confirm that it is. In the cases where the guess is wrong, a fairly slow search is needed.

Another approach would be to use an analog of the way C++ multiple inheritance is supported.

The invention solves this problem by a method for reducing dispatch times during the execution of a program in object-oriented language, which program has a number of interface methods, the method including the steps of:

(i) creating dispatch tables;

(ii) creating an interface hash table for one or more of the dispatch tables, the interface hash table having a pointer either as an index into a specific location in the corresponding dispatch table, or to a method stored on a computer executing the program;

(iii) when the program executes a step requiring a particular interface method, using the interface hash table to look up the latter interface method, either via the dispatch table, or directly.

Whereas the latter method applies in the case where the invention is applied to the program, the invention can also be applied in the form of a "virtual machine" wherein software emulates a "virtual" computer system in order to run a foreign application. However, steps (ii) and (iii) above are still similarly applied.

More particularly, the invention also provides a method for reducing dispatch times wherein a virtual machine, and a set of programs executed by the virtual machine are stored on a computer readable medium (such as a CD); the virtual machine being operative to reduce dispatch times in the course of program execution by:—

(i) creating dispatch tables;

(ii) creating an interface hash table for one or more of the dispatch tables, the interface hash table having a pointer either as an index into a specific location in the corresponding dispatch table, or to a method stored on a computer executing the program;

(iii) when the program executes a step requiring a particular interface method, using the interface hash table to look up the latter interface method, either via the dispatch table, or directly.

These methods of reducing dispatch time can clearly be specifically applied to Java.

In one embodiment of the invention, there is one interface hash per dispatch table. In another embodiment of the invention, there is a single interface hash table for all the dispatch tables.

In one form of the invention, the dispatch table points to the interface hash table. In another form of the invention, the hash table is part of the dispatch table at the start. This later form of the invention thereby eliminates one level of indirection.

The interface hash table can contain, for example, slot numbers of the dispatch table. Alternatively, the interface hash table can contain function points, thereby eliminating one level of indirection.

Chief advantages of at least preferred embodiments of the invention are that it is fast in the majority of situations. It uses no support routines in the common case, and does not need checks on the caller. This makes the common case fast, and makes the generated code smaller. It also has very little memory overhead, since a small hash table is needed only in the case where a class implements an interface. Small and fast are important qualities for uses such as Mobile Telephones where memory is limited on account of size or cost.

The method of the invention preferably includes the step of calling a special recovery method, in the event of a collision occurring when looking up the same interface method in the interface hash table. In this case, the hash table can either point to a method stored in the computer, or to a fallback slot in the dispatch table, which will redirect the call to an appropriate stored method, which is designed to "sort out" the class and direct the call to the appropriate location.

According to the invention in its broadest aspect, the solution to this problem is to use an extra level of indirection through a hash table.

For the majority of cases where there is no clash in the hash table, invoking an interface is only slightly slower than a standard virtual dispatch, and faster than the known techniques for invoking interface methods. It is also expected to be more compact than the C++ multiple inheritance approach, especially when dispatch table slots contain more than one word of information.

Where there is a clash in the interface hash table, a fallback slot in the dispatch table performs the slow but sure search.

According to other aspects of the invention, the problem of fast access to the required information is solved or alleviated by the use of an interface hash table as well as a dispatch table for each of the various devices.

The following considerations apply to any and all of the inventions and aspects of the inventions described above.

An embodiment of the invention will now be described by way of example only, to illustrate how a "virtual machine" can be applied in practice. It will be appreciated that this is just an illustrative example, because the "virtual machine" can be applied to very many different systems. Examples of these include Mobile Telephones (which incorporate hand-held computers); Set Top Boxes for digital television; Video Equipment which is intended for use with MPEG digital systems; and intelligent Disc Drives. The invention is particularly useful where, due to physical size (e.g., Mobile Telephones) memory is limited and more efficient modes of executing programs, using an object-oriented language such as Java, can be used. The memory onboard a Mobile Telephone may be limited, for example, to less than 500 kB, and it is in environments with limited memory that the invention works well. However, it can also run well for memories above this.

FIGS. A6-4 through A6-6 schematically illustrate an example of employing a virtual machine to a domestic environment where a computer (not shown), or microcontroller (not shown), is equipped with a controller program 460 for controlling the state of operating devices 461–464 used in controlling the supply or flow of WATER (e.g. valves); HEAT (e.g. timers, valves, pumps); and LIGHTS (e.g. switches); and also controlling the operation of a VIDEO system (e.g. switches). These operating devices 461–464 are each shown connected to respective device drivers 465–468 which receive appropriate command signals from the Controller Program 460 during execution of a program, so that appropriate drives are given to the switches, valves, pumps, etc. to produce the required action. Input 469 enables the Controller Program to be tailored to the user's requirements whereby, for example, at preset times, the heating system is turned on and off (and its temperature is adjusted), the video system is caused to play; and so on.

Referring now to FIG. A6-4, there is shown various parts of a domestic system represented as objects that are classified in a hierarchical structure where DEVICE is a class having the method of on and off that is common to the sub-classes HEATING SYSTEM and ELECTRICAL DEVICE and the subsequent sub-classes HOT WATER SYSTEM (or the domestic hot water used for washing); CENTRAL HEATING (which is a closed circulation system used in space heating); LIGHTS (which include the lights in each room); and VIDEO (which includes the control functions for playing, recording, ejecting cassettes, etc.). In addition, the HEATING SYSTEM has the method of Set Temperature, which enables control, of room temperature; the HOT WATER SYSTEM has the method Reload (which is intended to indicate when a water softener cartridge needs to be changed; the LIGHTS sub-class has the method Dim; and the VIDEO sub-class has the attributes Play and Reload cassette.

FIG. A6-5 shows the Dispatch Tables for this class and its sub-classes. In all Dispatch Tables, ON and OFF functions occupy positions 1 and 2. However, position 3 for the HOT WATER SYSTEM and the CENTRAL HEATING SYSTEM is Set Temperature, whereas the same position 3 is Dim for lights and Reload for WATER and VIDEO. The method Reload will need to distinguish between reloading a cartridge in the water softener and reloading a cassette in the Video system, but the Reload attribute is otherwise similar. Only a few control functions have been illustrated in FIG. A6-5 to simplify the drawings and description, and their dispatch tables will normally contain many more slots or entries.

It is clear from FIGS. A6-4 through A6-6 that an interface exists, between the class/sub-classes (or control functions, i.e. methods) where the same method is used in controlling a similar function in the operating devices. One interface, is the ON/OFF method; another interface is RELOAD method. Each interface method is allocated a small hash value. This interface hash value can be derived in many ways, but must not exceed the size of the hash table. Preferably, the hash values are chosen to reduce as far as possible conflicts between interface methods. One way of doing this is to derive pseudo-random hash values from each interface methods name, or some other fairly random attribute of the interface method.

Preferably, choose a starting hash value which does not collide with any related interface classes, and then allocate hash numbers for each member method of the interface sequentially from this. Hash values should be chosen so that methods of the same interface or related interfaces have unique hash values and do not conflict or clash. Clearly an object which implements many interfaces or interfaces with many methods may not be able to avoid clashes. A larger hash table usually reduces the number of clashes.

FIG. A6-3 illustrates an embodiment of the invention wherein the data for an object (e.g. Video) within a particular hierarchy (e.g. FIG. A6-4) is located in a data structure such as a table 420. The data structure will contain a header and a plurality of object data fields. When a call is made for a relevant method stored in slots in dispatch table 422, because of the uncertainty in knowing the exact slot in which that method is located, the dispatch table 422 will automatically re-route the call to a hash table 424 containing a condensed version of the method locations in the dispatch table 422. Also, because the locations within the hash table 424 are always the same for each method, the hash table will be able to generate an index pointer 426 leading to the correct location in the dispatch table 422 more quickly than searching all possible locations within the dispatch table. The same process is followed with other hash tables (not shown) and their respective dispatch tables.

In the event of a clash in the hash table, because the same location is needed for two interface methods, the hash table will point to a method stored in the computer designed to 'sort out' the clash and direct the caller to the appropriate location. This can also be done by first pointing to a slot (e.g., the first) in the dispatch table 422 which then points to the "sort out" method stored in the computer.

More generally speaking, each dispatch table is created after defining each concrete class and when the set of methods it implements is known. (The dispatch table will take into account method implementations inherited from its superclass). A fixed size hash table is created for each class which maps the interface method hash value described above to a dispatch table index of the corresponding implementation. Where a class implements two or more interface methods which have the same interface hash value, the hash table is set to contain the dispatch table index of the fallback routine for "sorting out" a clash.

This hash table is either included at the beginning of the dispatch table, or referenced from the dispatch table.

To invoke an interface method on a given object (in a register), a. Load the address of the interface hash table for the given object.
b. Get the slot number for the specified interface method using its hash as an index into the interface hash table.
c. Load a unique identifier for the destination interface method into a register.
d. Given the dispatch table slot number, perform a normal virtual invoke.

The pseudo assembler sequence for the above steps is:

Interface Hash Table Pointed to by Dispatch Table

| LOAD | Rd, doffs [Ro]  | Load dispatch table address |
| LOAD | Ri, ioffs [Rd]  | Load interface hash address |
| LOAD | Ri, hash [Ri]   | Load slot from hash table   |
| LOAD | Ru, #uniqIfaceId | Load unique interface Id   |
| LOAD | Ri, [Rd + Ri]   | Get method address          |
| CALL | Ri              | Invoke interface method     |

In the form of the invention where the hash table is part of the dispatch table, one level of indirection is eliminated.

Interface Hash Table Stored with (Before) Dispatch Table

| LOAD | Rd, doffs [Ro]   | Load dispatch table address |
| LOAD | Ri, -hash [Ri]   | Load slot from hash table   |
| LOAD | Ru, #uniqIfaceId | Load unique interface id    |
| LOAD | Ri, [Rd + Ri]    | Get method address          |
| CALL | Ri               | Invoke interface method     |

In the form of the invention where the interface hash table contains method pointers, another level of indirection is eliminated:

Method Address Stored in Interface Hash Table (Plus Previous Optimisation)

| LOAD | Rd, doffs [Ro]   | Load dispatch table address  |
| LOAD | Ri, -hash [Rd]   | Load address from hash table |
| LOAD | Ru, #uniqIfaceId | Load unique interface id     |
| CALL | Ri               | Invoke interface method      |

Where there is a clash between interface method hash entries for a particular class, the interface hash table contains the dispatch table index of a fallback method. The fallback method has access (in registers) to the destination object, and a unique identifier for the interface method. It performs the standard search for that object's implementation of the interface method.

It will be known to those of skill in the computing art that a hash table is a means of reducing to manageable proportions a data set where information is sparsely populated and there is otherwise a high degree of redundancy within the data set. A hash table thus can reduce the scale of a whole application and thereby reduce the footprint of the device, one of the important features of Java.

In summary, the inventions of this patent application include

1. Using a Hash for Interface Methods

Each interface method is allocated a small hash value. This interface hash value can be derived in many ways, but must not exceed the size of the hash table used below.

It is best if the hash values are chosen to reduce conflicts between interface methods, therefore hash values should be chosen so that methods of the same interface or related interfaces have unique hash values. Clearly an object which implements many interfaces or interfaces with many methods may not be able to avoid clashes.

Naturally, a larger hash table usually reduces the number of clashes.

2. Indirect Through a Hash Table when Invoking Interface Methods

When each concrete class is defined, the set of methods it implements is known, and a dispatch table is created. The dispatch table takes into account methods implementations inherited from its superclass.

A fixed size hash table is created for each class which maps the interface method hash value described above to a dispatch table index of the corresponding implementation. Where a class implements two or more interface methods which have the same interface hash value, the hash table is set to contain the dispatch table index of the fallback routine described below.

This hash table is either included at the beginning of the dispatch table, or referenced from the dispatch table.

To invoke an interface method on a given object (in a register), a. Load the address of the interface hash table for the given object.

b. Get the slot number for the specified interface method using its hash as an index into the interface hash table.

c. Load a unique identifier for the destination interface method into a register.

d. Given the dispatch table slot number, perform a normal virtual invoke.

3. Fallback Dispatch Table Entry

Where there is a clash between interface method hash entries for a particular class, the interface hash table contains the dispatch table index of a fallback method. The fallback method has access (in registers) to the destination object, and a unique identifier for the interface method.

It performs the standard search for that object's implementation of the interface method.

It will be known to those of skill in the computing art that a hash table is a means of reducing to manageable proportions a data set where information is sparsely populated and there is otherwise a high degree of redundancy within the data set. A hash table thus can reduce the scale of a whole application and thereby reduce the footprint of the device, one of the important features of Java. Overflows are taken into account in a way which is already known in the utilisation of hash tables.

Also according to the invention, therefore, a computer system includes one or more dispatch tables for storing data containing methods appropriate to objects in a class hierarchy and an interface hash table pointing to the location in the dispatch table where a method of interest is located.

The invention also provides a method of operating a computer system which uses dispatch tables containing methods appropriate to objects in a class hierarchy, including the steps of: directing a call for a method to the dispatch table; passing on the call to a hash table containing information as to the location of methods in the dispatch table; and redirecting the call from the hash table to that location in the dispatch table where the method is stored.

The invention also provides a computer system including means for storing data relating to an object, means for calling data relating to a method appropriate to the object, a dispatch table adapted to contain data relating to at least one the method, means for passing the call on to a hash table containing information as to the location of method(s) in the dispatch table and means for redirecting the call from the hash table to the dispatch table to access the location of the called method.

In one form of the invention, there is one interface hash per dispatch table. In another form of the invention, there is a single interface hash table for all the dispatch tables.

Alternatively, the invention provides both a method of improving the performance of interface dispatching by using a hash table and a computer system including a hash table to improve the performance of interface dispatching.

In another aspect, the invention provides a method or a computer system in which the interface reference for a particular method is found by means of a hash table.

It will be understood that 'interface dispatching' is the method by which the slot location for a particular method, e.g., the slot location number (2) for the 'play' function of a video recorder, is located and then the relevant data is called.

Chief advantages of the invention may include faster interface dispatching and/or a reduction in the size of footprint.

In each case, the method or computer system of the invention as specified in the preceding paragraphs may be applied specifically to Java.

The operation of the system can be looked at in another way. Thus, in FIG. A6-3 of the drawings, the data for an object within a particular hierarchy is located in a data structure such as a table 420. The data structure will contain a header and a plurality of frames containing relevant data. When a call is made for a relevant method stored in slots in a dispatch table 422, because of the uncertainty in knowing the exact slot in which that method is located, the dispatch table 422 will automatically re-route the call to a hash table 424 containing a condensed version of the method locations in the dispatch table. Also, because the locations within the hash table are always the same for each method, the hash table will be able to generate an index pointer 426 leading to the correct location in the dispatch table more quickly than searching all possible locations within the dispatch table.

In the event of a clash in the hash table, perhaps because the same location is needed for two interface methods, or perhaps due to being called by two different threads in a multi-threaded environment, the hash table will point to a method designed to 'sort out' the clash and direct the caller to the appropriate location or locations.

In any or all of the aforementioned, certain features of the present invention have been implemented using computer software. However, it will of course be clear to the skilled person that any of these features may be implemented using hardware or a combination of hardware and software. Furthermore, it will be readily understood that the functions performed by the hardware, the computer software, and such like are performed on or using electrical and like signals.

Features which relate to the storage of information may be implemented by suitable memory locations or stores. Features which relate to the processing of information may be implemented by a suitable processor or control means, either in software or in hardware or in a combination of the two.

In any or all of the aforementioned, the invention may be embodied in any, some or all of the following forms: it may be embodied in a method of operating a computer system; it may be embodied in the computer system itself; it may be embodied in a computer system when programmed with or adapted or arranged to execute the method of operating that system; and/or it may be embodied in a computer-readable storage medium having a program recorded thereon which is adapted to operate according to the method of operating the system.

As used herein throughout the term "computer system" may be interchanged for "computer", "system", "equipment", "apparatus", "machine" and like terms. The computer system may be or may include a virtual machine.

In any or all of the aforementioned, different features and aspects described above, including method and apparatus features and aspects, may be combined in any appropriate fashion.

It will be understood that the present invention(s) has been described above purely by way of example, and modifications of detail can be made within the scope of the invention.

Each feature disclosed in the description, and (where appropriate) the claims and drawings may be proved independently or in any appropriate combination.

OTHER INFORMATION

Related Patents

U.S. Pat. No. 5,367,685

References

[1] "The Annotated C++ Reference Manual" by M. Ellis and B. Stroustrup, Addison Wesley (ISBN 0-201-51459-1) pages 217–237
[2] "The Java Programming Language" by K. Arnold and J. Gosling, Addison Wesley (ISBN 0-201-63455-4) chapter 4
[3] "The Java Virtual Machine Specification" by T. Lindholm and F. Yellin, Addison Wesley (ISBN 0-201-63452-X) pages 258–260, 403–405
[4] "Modern Compiler Implementation in Java"; A. W. Appel; Chapter 14; published Mar. 12, 1998.

Java is a trademark of Sun Microsystems.

Appendix 7

This invention relates to a computer system and to a method of operating a computer system. More particularly, the invention preferably relates to a computer system and a method of operating a computer system including an object oriented program. In a preferred embodiment, the invention relates to the use of a class loader to allow direct invocation of non-final instance methods.

This invention applies preferably to virtual machines (VM) executing Object Oriented (OO) programs, where the classes of the objects in question are dynamically loaded and/or discovered by the virtual machine. It applies particularly to Virtual Machines where some optimisations can be performed if a potentially polymorphic Method of a class can be safely assumed to be non-polymorphic; for example in a dynamically compiling virtual machine.

The invention is concerned with Method inheritance, 'Method' being a term in Java and other programming languages for functions such as, for example, 'area' of a circle and any of the other functions such as 'play,' 'turn on lights,' and so on, as already discussed in the Appendices of this specification.

In this part of the present application relating to the use of a class loader to allow direct invocation of non-final instance Methods, the term 'Method' (with capital 'M') will be used to relate to Methods of the programming language (also known by, but not restricted to, other terms including 'functions' and 'routines'); the term 'method' (with lower case 'm') will be used in respect of the procedure of carrying out the invention (unless it is clear otherwise from the context).

In prior systems and methods a call to a Method of a given name will cause one of a number of different implementations of the named Method to be executed according to which object one is interested in (e.g., a 'play' function in a video recorder, tape recorder, etc.). This is called a 'polymorphic call'. Under these circumstances, one would compile differently according to the object. Because of these problems one would make no assumptions about the destination Method, and so one has to compile the call to it less than optimally.

Java is an example of a language which is heavily object oriented; Java allows single inheritance. Other languages, for example C++, allow multiple inheritance. Inheritance leads to polymorphism.

In an object oriented environment, a Method is said to be polymorphic if a number of different implementations of the Method are available in the system, and the implementation used is chosen at each point where the Method is invoked and at each time that the point of invocation is reached in the execution of the program. This situation typically comes about in object oriented systems due to inheritance, whereby a class (a description of a type of object, including the Methods that can be invoked on instances of that class) is taken as a basis for a subsequent class. This new class is termed the subclass of the original class, which is termed the superclass, and the subclass is said to inherit all the aspects (including the Methods) of the superclass. However, the new subclass can override some or all of the Methods inherited from the superclass and provide its own implementations of these Methods; these overridden Methods are now polymorphic, and the implementation which is chosen to be used in any case where one of these overridden Methods is invoked is governed by the class of the object that the invocation is associated with.

For example, a single named Method may appear multiple times in the class hierarchy and each appearance of the named Method may correspond to a different implementation of the Method. The actual Method that is run will depend on the object relating to the named Method.

One approach to the situation where the system can be affected by classes that are discovered and/or loaded at some time after a class or Method or part of a Method is converted to a compiled form is to make no assumptions in the compiled version about the Method being invoked by the dynamic mechanism. In the Java environment, Methods can be marked as "final," which means that it is illegal to override them in subsequent subclasses. This allows assumptions to be made about which Method implementation is being invoked, but the majority of Methods in typical Java classes are not so marked for reasons of flexibility.

Whilst the approach described above will yield a system that works, a potentially large number of optimisation opportunities will be missed, since the cases where a Method (if it is not polymorphic at the time that the compilation of a call to the Method is attempted) remains non-polymorphic are seen in normal use to predominate. If, however, the assumption is made that the Method is not polymorphic, then the system runs into problems if the assumption is later found to be false, due to a new class being loaded into the system.

In one aspect of the present invention, our solution to the problem of optimising the system aims to optimise for the set of currently loaded classes. In a second aspect of the present invention, if another class is loaded that overrides some Methods of previously loaded classes, optimisation will be changed for calls to Methods that the new class overrides, that is, if we discover that the Method is polymorphic, then we go back and undo the specific optimisation assumptions.

According to the first aspect of the invention, there is provided a method for compiling code, the code including a call to a Method which is potentially polymorphic, the method including compiling the code on the basis of an assumption that the Method is not polymorphic.

In an object oriented program, a Method may have the potential to be polymorphic but may in fact be non-polymorphic. By making the assumption that the Method is non-polymorphic, various optimisations may be made in the compilation of the code, which may give, for example, a reduction of the amount of memory occupied by the compiled code and faster execution of the compiled code.

Preferably, when the assumption is made that the Method is non-polymorphic, the Method is marked as 'assumed final.'

Preferably, the compilation includes optimisation of the call to the Method.

In one embodiment of the first aspect of the invention, the optimisation includes in-lining. In particular, there is preferably in-lining of the single implementation of the invoked Method. As is described in more detail below, the Method being invoked may be moved on compilation to be in line with the code including the invoke of the Method so that fewer jumps between portions of code are required on execution of the code and the cost of the frame creation is lost. This leads to faster execution of the compiled code.

In an alternative embodiment of the first aspect of the invention, the optimisation includes forming a patch. Where an assumption is made that a Method is non-polymorphic, a patch may be formed between the compiled code invoking the Method and the compiled code of the Method. The formation of patches are discussed in more detail in Appendix 4 of this specification.

As indicated above, where a Method is non-polymorphic at the time of compilation of a call to that Method, it is often found that in the majority of cases the Method remains non-polymorphic. However, there will be some occasions in which the assumption is found to be false. For example, a new class being loaded may include a new sub-class including a new instance of a Method which previously had been assumed to be non-polymorphic.

Preferably, the method further includes the step of creating a marker if the assumption has been made. Preferably, the marker is associated with the Method which has been assumed to be non-polymorphic and preferably the marker is made in the data structure of the Method which has been assumed to be non-polymorphic.

By creating a marker to indicate that the assumption has been made that a Method is non-polymorphic, a check can be made to see whether any assumptions have been made which should be overridden. Such a search is preferably carried out when a new class, in particular a new sub-class, is loaded into the system.

Preferably, the code is a dominant path fragment. Preferably, the compiler is arranged to compile only dominant path fragments of code. See FIGS. 1–1E and associated text for a discussion of preferred features of the compiler and the method of compilation of dominant path fragments. By compiling dominant path fragments of code, only those fragments which are frequently executed will be compiled, thus reducing the time and memory taken by the compilation of infrequently executed sections of code.

Preferably, the code is code of an object oriented language, preferably Java.

The first aspect of the invention also provides a method of operating a computer system, the method including a method of compiling code as described above.

The first aspect of the invention also provides a computer system including a compiler for compiling code, the compiler being arranged so that, when compiling code including a call to a Method which is potentially polymorphic, the compiler compiles the code on the basis of an assumption that the Method is not polymorphic.

Preferably, the system includes means for marking the Method as 'assumed final' if the assumption is made that the Method is non-polymorphic. Preferably, the compilation system marks the Method as 'assumed final.' The marking may be carried out by a compiler manager.

Preferably, the compiler includes means for optimising the call to the Method. Preferably, the compiler is arranged to in-line the Method or to create a patch to the Method.

Preferably, the system further includes means for creating a marker if the assumption has been made. Preferably, the marker is created by the compilation system, preferably by the compiler manager.

Preferably, the code is code of an object oriented language, preferably Java.

According to the first aspect of the invention, there is also provided a compiler for compiling code by a method described above.

The first aspect of the invention also provides code compiled by a method described above.

According to a second aspect of the invention, there is provided a method of introducing a class into a computer system, the method including the step of determining whether a Method of the class has previously been assumed to be non-polymorphic. That determination may be made, for example, by checking for the presence of a marker which may be provided in accordance with the first aspect of the present invention. The determination may be made by checking the data structure of the Method.

Thus, the second aspect of the invention finds particular application where the assumption has been made in the compilation of code, for example in accordance with the first aspect of the invention.

The introduction of the class may include the loading of a new class into the system.

The second aspect of the invention finds particular application in the loading of a new class into the system where the new class being loaded is a subclass of a class already on the system.

If a Method of the new class is found to have been assumed to be non-polymorphic, alterations are preferably carried out in respect to any optimisations made on the assumption that the Method was non-polymorphic.

Preferably, the method further includes adjusting the compiled code if it is determined that the Method has been assumed to be non-polymorphic. The adjustment may be to the compiled code including the call to the Method.

The adjustment of the compiled code may include deletion of a section of compiled code. The deleted code may include the call to the Method. For example, where optimisation of the compilation of the code has included in-lining, deletion of the compiled section of the code including the in-lined section may be required.

Alternatively, or in addition, the adjustment of the compiled code may include the undoing of a patch. For example, where optimisation of the compilation of the code has included a patch pointing directly from the invoke of a Method to the Method, the patch is preferably undone. Alternatively, the patch and/or the compiled code associated with the patch may be deleted.

Preferably, the alteration of the compiled code is carried out atomically. This is of particular importance in a multi-threaded environment in which several threads are executing simultaneously. If the adjustment were not carried out atomically in such an environment and the threads were allowed to continue executing while the adjustments were carried out, there is a risk that a thread may be actively executing in a region of compiled code at the same time as an adjustment of that region of code is being made. That would clearly be most disadvantageous. If the adjustment were not carried out atomically, it would be necessary to stop the execution of all threads which might enter the region of code to be adjusted while the adjustments were carried out. Preferably, checks are carried out prior to the alteration, in particular the deletion, of code to ensure that it is safe to change the relevant section of code. Preferably, the method includes the step of carrying out stack walking prior to alteration of the compiled code (see Appendix 1 and Appendix 4 of this specification). Stack walking will not normally be required for undoing a patch but is preferably carried out before deletion of a compiled version of a block of code.

In many cases, it will be preferred that the relevant section of compiled code is not deleted as soon as the assumption is found to be incorrect, but that the compiled section of code may be made unavailable for execution. It is preferred that the relevant section of compiled code is deleted in due course to release the memory occupied by the compiled section. Until the section is deleted, however, the compiled code is preferably either marked that it should not be used, or adjustments are made elsewhere so that the compiled code is not used. For example, in one embodiment of an invention of FIGS. 1–1E and associated text, the dispatch table of a Method is marked if there is a compiled version of any of the fragments of the Method. Thus, if the assumption is found to be incorrect, the dispatch table of the Method can be altered so as not to refer to the compiled fragment, thus making it unavailable for execution.

Preferably, an interpreter is used if it is determined that a Method of the new class has been assumed to be non-polymorphic in the compilation of the code. Execution preferably then continues using an interpreter. While it would be possible to wait while a fresh compiled version is made which does not make the assumption, that is not preferred. Where compiled code is deleted or made unavailable, preferably a fallback interpreter is used unless or until the compiled code is replaced. Further discussion of the use of a fallback interpreter can be found in FIGS. 1–1E and associated text.

Preferably the method of operating a computer system of the second aspect of the invention also includes features of the method of the first aspect of the invention relating to the compilation of code.

The second aspect of the present invention also provides a method of operating a computer system including the steps of:

compiling a call to the Method for a given class;

determining for a new sub-class whether a Method of the class has previously been treated as final; and adjusting the compilation of the call to the Method for the given class if the Method is not final.

The method according to the previous paragraph advantageously takes advantage of the assumption that the Method being called is "final."

Preferably, the adjustment of the compiled code is carried out before the class is introduced. For example, where a new class is being loaded into the system, both the search for non-polymorphic Methods and any necessary adjustment to the compiled code is made before the loading of the new class is completed.

The introduction of a new sub-class may be effected by the use of a class loader. Preferably, the class loader calls into the compilation system. If assumptions have been made during the compilation of the code which may be overridden by a class to be loaded, preferably, the compilation manager deals with the situation by either undoing the patch or making the compiled version of the compiled code unavailable for execution, for example by deletion and/or changing the dispatch table of the Method until, for example, the deletion of the code is effected.

According to the second aspect of the invention, there is provided a method of loading a class using a class loader into a system including compiled code, in which the class loader determines whether assumptions have been made in the compiled code which may be overridden by the class.

If an assumption has been made which is to be overridden, preferably, the class loader calls into the manager of the compiled code. That call may lead to the adjustment of the compiled code as indicated above.

In a further aspect, the invention provides a computer system including means for compiling calls to a Method for a given class, means for determining whether the Method can be treated as final, and means for adjusting the compilation of the call to the Method for the given class on the basis of the determination.

The invention therefore enhances opportunities for optimisation of the computer system.

The second aspect of the invention also provides a computer system including a means for introducing a new class, the system including means for determining whether a Method of the class has previously been assumed to be non-polymorphic. The means for introducing a new class may be a class loader.

Preferably, the system further includes means for altering the compiled code if it is determined that a Method of the new class has been assumed to be non-polymorphic in the compilation of code. The alteration of the compiled code is preferably carried out by the compilation system, preferably, the compiler manager.

Preferably, the system includes means for deleting compiled code, which may include means for undoing a patch. The compiler manager may include the deletion device.

Preferably, the system includes a stack walking device.

Preferably, the system further includes an interpreter.

According to the second aspect of the present invention, there is provided, a computer system including:

a compiler for compiling a call to the Method for a given class;

means for determining for a new sub-class whether a Method of the class has previously been treated as final; and means for adjusting a previously compiled version of the call to the Method for the given class if the Method is not final.

Preferably, the means for introducing the new class includes a class loader.

The second aspect of the invention further provides a class loader for use in a computer system as described above.

In a further aspect, the invention provides a computer system including means for compiling calls to a method for a given class, means for determining whether the method has previously been treated as final, and means for adjusting the compilation of the call to the method for the given class if the method is not final.

Also provided by the invention is a computer-readable storage medium having a programme recorded thereon for carrying out a method according to the first and/or the second aspects of the invention as described above.

The invention extends to: a computer-readable storage medium having a programme recorded thereon for carrying out a method for compiling code, the code including a call to a Method which is potentially polymorphic, the method including compiling the code on the basis of an assumption that the Method is not polymorphic.

The invention also extends to a computer-readable storage medium having a programme recorded thereon for carrying out a method of introducing a class into a computer system, the method including the step of determining whether a Method of the class has previously been assumed to be non-polymorphic.

Further, the invention extends to a computer when programmed according to a method as aforesaid.

The invention also extends to a computer when programmed according to a method for compiling code, the code including a call to a Method which is potentially polymorphic, the method including compiling the code on the basis of an assumption that the Method is not polymorphic.

Further, the invention extends to a computer when programmed according to a method of introducing a class into a computer system, the method including the step of determining whether a Method of the class has previously been assumed to be non-polymorphic.

In summary, the problems outlined above are solved by the various aspects of this invention using a number of factors. First of these is the ability to adjust the action of the class loader in this situation to notify the manager of the compiled code when an assumption about the finality of a Method previously made during prior compilation is found to be false. The second factor is the ability to, at any time, remove from the system compiled code which is no longer wanted for whatever reason. A third factor is the use of patches to existing compiled code sequences, allowing the code action to be adjusted whilst the code is "live," and being potentially executed by one or more threads of the virtual machine.

Any, some, or all of the features of any aspects of the invention may be applied to any other aspect.

The following considerations apply to any and all the inventions and aspects of the inventions described above.

Methods which are potentially polymorphic may be, in fact, non-polymorphic at a particular time. If such a Method is non-polymorphic at the time of compilation, optimisations can be made in the compilation of the call relating to the Method, in particular to the code relating to the call to the Method.

As each section of code is considered by the virtual machine for compilation, any potentially polymorphic invocations out of the code section are also considered. For each such invocation, if the destination of the invoke is fixed at the time of compilation (that is, there is only one implementation of that Method in the system at that time), then the assumption is made by the compilation system that that situation will continue to be so. This allows various optimisations to be made, including but not limited to the in-lining of the single implementation of the invoked Method.

For example, Class X defines a Method public int foo (int) which includes a call to a Method bar.

```
Class X
    public int foo (int)
    {
        :
        call bar ( )
        :
        :
    }
    public int bar ( )
    {
        // body of bar from class X
        :
    }
```

The call within public int foo (int) effects a jump out of that section of code to bar. Once bar has been carried out, the thread will often return to the original function, in this case by jumping back into public int foo (int). Thus, at least two jumps are required in the execution of public int foo (int).

If a decision is made to produce a compiled version of the section of code including the call to bar, various optimisations may be made to the compilation of the call to bar if an assumption is made that bar is final. Unless it is known that bar is not final, the assumption that it is final is made at compilation. Two examples of optimisation of the call to bar are in-lining and patching.

In the optimisation method of in-lining, the Method bar is moved to be in line with the rest of the code of public int foo (int) from which bar is called.

```
Class X
    public int foo (int)
    {
        :
        // call bar ( )
        {
            // body of bar from class X
            :
        }
        :
    }
```

Optimisation is achieved because the jumps to and from bar are not required and there is no code for frame creation and destruction required. The compiled code of bar is placed sequentially in the Method. This in turn exposes further opportunities for optimisation.

In patching, a direct link (patch) is made between the call to bar and the bar Method. The patch is a piece of code which effects the jump to the bar Method. By using a patch, the execution of the jump to bar can be made faster at mm-time. The formation of patches is described in more detail in Appendix 4 of this specification.

The optimisation has been carried out using the assumption that the Method bar is final. Before the resulting compiled version of the code is made available to the rest of the virtual machine as a potential part of the execution environment, the Method being invoked is marked in its VM data structure as having compiled code which assumes that it is not overridden (that it is a final Method). In the example given above, the mark is made in the data structure associated with the Method bar which indicates that if anything is done to override the Method, something must be done in view of the assumption made.

At some later time, Class Y (a sub-class of Class X) may be introduced which includes a new version of the Method bar.

```
Class Y extends X
    :
    public int bar ( )
    {
        // body of bar from class Y
        :
    }
```

The assumption that bar is final has already been made for the existing compiled code and adjustment of the compiled code is required.

FIG. A7-1 shows a flow diagram in respect of a preferred embodiment in which a class loader checks for instance Methods of a new class being loaded.

The class loader finds a new class for loading into the system at step 4000. The class loader does not load the class until various checks have been carried out. At a first step 4002, the class loader carries out standard checks to see if the class is a valid one for the system in which it is to be loaded. If not, an exception is thrown. If it is, the class loader looks for instance Methods in the class to be loaded at step 4006. In step 4008, the class loader looks at the Method to see whether it is a Method that overrides another Method, for example, whether it overrides a Method of a parent class of the class being loaded. If not, the class loader looks at the next Method. If the Method is found to override a parent Method, the class loader looks at the data structure of the parent Method at step 4012 to see if it has been marked. As described above, the marker would indicate that a compiled call to a compiled version of the Method has been prepared on the assumption that the parent Method is final. If there is no marker, the class loader proceeds to look for another Method in the new class as shown by path 4014. If there is a marker, the class loader calls into the compilation system at step 4016 to indicate that something has to be done about the compiled code that was compiled on the assumption that the parent Method was final. The class loader then proceeds to look for another Method of the class to be loaded as shown by path 4018.

In the following, the optimisation made in the compilation of the code with the assumption that bar was final is a patch. FIG. A7-2 shows a section of compiled code 4020 including a fragment of code including a call 4022 to the Method bar. In the optimisation, a patch is made such that the call 4022 is made to transition directly (path 4027) to the compiled class X form of the Method bar 4028.

Where the assumption is made that the Method bar is final is found to be incorrect, the patch is undone as follows:

The call 4022 is changed to transition (path 4023) to the general call 4024 to the Method. The redirection of the call 4022 is carried out atomically.

The form of the general call 4024 was prepared, as an outlier, at the same time as the compiled Method foo 4020 was created, and the general call 4024 can transition (path 4029 or path 4025) to a number of different implementations of the Method bar (4028 or 4026).

For further details of the redirection and deletion of patches, see Appendix 4 of this specification.

In the following, the optimisation made in the compilation of the code with the assumption that bar as final is in lining. FIG. A7-3 shows sections of compiled code 4030 including a first section 4032, a second section 4034 and a third section 4036. The second section 4034 is a compiled version of code including a call to bar 4038. The Method bar has been in lined so that bar is now contained in the section 4034 as section 4038.

If it is later found that the assumption is incorrect, compiled code section 4034 will be deleted. The dispatch table of the Method including the section 4034 is altered so as not to refer to the compiled version of the code 4034.

On subsequent execution of the compiled code 4030, the section of compiled code 4032 will be executed first, and at the end of section 4032, control passes to glue code. The glue code looks to see whether there is a compiled version of the next section 4034. The compiled section is not found and so preparations are made to transfer control to the interpreter for further execution.

Control may be passed first to an outlier to update states. (See Appendix 2 of this specification).

The glue code tells the interpreter to begin execution of the non-compiled version of the code corresponding to section 4034.

At a later time, the compiled section 4034 will be deleted. Stack walking will be carried out before the section is deleted. (See Appendix 1 of this specification).

Thus, it will be seen that the patch optimisation is more easily undone than inlining if it is subsequently found that the assumption that a Method is final is not correct. However, better optimisation and reduced execution time is available from the use of inlining and in many cases inlining will be preferred if it is thought that the assumptions will be proved incorrect only infrequently.

In summary, as each new class is loaded, the class loader checks to see if any of the Methods of the new class override a Method with the marker set in its data structure. If this is the case, the class loader calls back to the compiled code manager section of the virtual machine and requests that all the affected compiled code is deleted or made inaccessible.

If the compiled version of the calling code is arranged not to make many assumptions about the internal details of the Method it is invoking, a simpler mechanism that can be used in parallel with the above mechanism is to allow patching of the compiled version of the calling code to call directly to the compiled version of the Method being called. This direct patch can be relatively easily undone if a subsequently loaded class is found to override the Method in question using the same detection mechanism as described above. The benefit of the patched version is that it avoids the overheads of making the dynamic decision at the time of the invoke as to which implementation to choose to invoke. Even if there is only one possibility, the overhead is present unless the patched form is used.

FIG. A7-4 shows apparatus for carrying out a preferred embodiment. The apparatus includes a compilation system 4040 including a compiler 4042 and a compiler manager 4044. The compiler 4042 has optimisation devices 4046 and 4048 for creating patches and inlining, respectively. The compiler manager 4044 includes a marking device 4050 for marking a Method to indicate that a call to it has been compiled on the basis of an assumption that it is final.

The apparatus further includes a class loader 4052 for loading new classes. The class loader has a Method checker 4054 for determining if a Method of the class being loaded will override a Method which has been compiled on the assumption that the Method is final. The Method checker 4054 will search for markers in the data structure of the Methods.

If an overridden Method is found, the class loader 4052 notifies the compiler manager 4044 which uses the alteration device 4056 to make necessary alterations to the compiled code. The alteration device 4056 includes an isolation device 4058 to make the relevant section of compiled code unavailable for execution. The alteration device 4056 further includes a patch undoing device 4060, a deletion device 4062 for deleting, for example, sections of unwanted compiled code. The alteration device 4056 also includes a stack walker 4064 for allowing the compiled code safely to be deleted.

The apparatus further includes an execution device 4066 for executing compiled code. Glue code 4068 and outliers 4070 are provided for effecting the transfer to execution by an interpreter 4072, where required. The interpreter 4072 includes an execution history recorder 4074 for recording the execution of blocks of code by the interpreter. That information is used for the compilation of the dominant path (see FIGS. 1–1E and associated text).

In any or all of the aforementioned, certain features of the present invention have been implemented using computer software. However, it will of course be clear to the skilled man that any of these features may be implemented using hardware or a combination of hardware and software. Furthermore, it will be readily understood that the functions performed by the hardware, the computer software, and such like, are performed on or using electrical and like signals.

Features which relate to the storage of information may be implemented by suitable memory locations or stores. Features which relate to the processing of information may be implemented by a suitable processor or control means, either in software or in hardware or in a combination of the two.

In any or all of the aforementioned, the invention may be embodied in any, some, or all of the following forms: it may be embodied in the computer system itself; it may be embodied in a computer system when programmed with or adapted or arranged to execute the method of operating that system; and/or it may be embodied in a computer-readable storage medium having a program recorded thereon which is adapted to operate according to the method of operating the system.

As used herein throughout, the term 'computer system' may be interchanged for 'computer,' 'system,' 'equipment,' 'apparatus,' 'machine,' and like terms. The computer system may be or may include a virtual machine.

In any or all of the aforementioned, different features and aspects described above, including method and apparatus features and aspects, may be combined in any appropriate fashion.

It will be understood that the present invention(s) has been described above purely by way of example, and modifications of detail can be made within the scope of the invention.

Each feature disclosed in the description, and (where appropriate) the claims and drawings may be provided independently or in any appropriate combination.

What is claimed is:

1. A dynamic compiler, comprising:
   an execution history recorder configured to record a fragment of code and the number of times the fragment of code is executed;
   the execution history recorder having an interpreter, a compiler manager coupled thereto and a threshold number of executions for a threshold comparison with a recorded number of times to determine a dominant path having a fragment to be compiled therein;
   a compiler queue of fragments to be compiled for receiving the fragment to be compiled and a successor fragment wherein the successor fragment is determined by the execution history recorder to be the most likely next fragment to be executed after the fragment to be compiled in accordance with a list of successor fragments and a count associated with each successor fragment in the list of successor fragments;
   a compiler coupled to the compiler queue and arranged (i) to receive a received fragment to be compiled and the corresponding successor fragment of the received fragment to be compiled, and (ii) to create a compiled dominant path from the received fragment to be compiled, the corresponding successor fragment being compiled in accordance with its correspondence with the fragment to be compiled and independently of whether the number of executions of the corresponding successor fragment has reached the threshold number of executions;
   the execution history recorder being further configured to record from where a transfer of control into the compiled dominant path came and to where control is transferred out of the compiled dominant path;
   a queue duration determination including (i) a determination whether the length of the compiler queue has exceeded a predetermined length and (ii) a determination whether the predetermined queue length has been exceeded for a predetermined period of time;
   a threshold tuner operable to adjust the threshold number of the execution history recorder in accordance with the queue duration determination to maintain the number of fragments to be compiled within predetermined limits; and
   the compiler manager having a memory manager to make compilation more likely for fragments of code reaching the threshold relatively more times than for fragments of code reaching the threshold relatively fewer times by entering the fragments to be compiled into the same end of the compiler queue from which they are taken.

2. A dynamic compiler as claimed in claim 1, wherein the compiler manager administers the queue of frequently executed fragments of code for compilation.

3. A dynamic compiler as claimed in claim 1, further comprising a deleter coupled to the memory manager.

4. A dynamic compiler as claimed in claim 1 wherein the number of times a fragment of code is executed is recorded when the fragment of code is executed by the interpreter.

5. A dynamic compiler as claimed in claim 1, wherein the dynamic compiler is a multi-threaded system and the compiler runs on a separate thread so the progress of code execution is not blocked.

6. A dynamic compiler as claimed in claim 1, wherein the execution history recorder is further configured to alert the compiler manager when the fragment of code has been executed the threshold number of times.

* * * * *